United States Patent
Mimori et al.

(10) Patent No.: US 7,463,568 B2
(45) Date of Patent: Dec. 9, 2008

(54) OBJECTIVE OPTICAL ELEMENT AND OPTICAL PICKUP APPARATUS

(75) Inventors: Mitsuru Mimori, Kokubunji (JP); Kohei Ota, Hachioji (JP); Shinichiro Saito, Hachioji (JP); Yuichi Atarashi, Hachioji (JP); Katsuya Sakamoto, Hachioji (JP); Hidekazu Totsuka, Hachioji (JP); Kiyono Ikenaka, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 11/717,627

(22) Filed: Mar. 14, 2007

(65) Prior Publication Data

US 2007/0159952 A1 Jul. 12, 2007

Related U.S. Application Data

(63) Continuation of application No. 10/693,935, filed on Oct. 28, 2003, now abandoned.

(30) Foreign Application Priority Data

| Oct. 31, 2002 | (JP) | 2002-318795 |
| Nov. 19, 2002 | (JP) | 2002-335205 |
| Nov. 22, 2002 | (JP) | 2002-339165 |
| Nov. 28, 2002 | (JP) | 2002-345063 |

(51) Int. Cl.
*G11B 7/00* (2006.01)

(52) U.S. Cl. ............ 369/112.07; 369/112.08; 369/112.26; 359/719; 359/566

(58) Field of Classification Search ........... 369/112.07, 369/112.08, 112.24, 112.23, 112.13, 112.01, 369/112.05, 44.23
See application file for complete search history.

(56) References Cited

U.S. PATENT DOCUMENTS

| 5,696,750 | A | | 12/1997 | Katayama | |
| 5,724,335 | A | * | 3/1998 | Kobayashi | 369/112.08 |
| 6,192,021 | B1 | * | 2/2001 | Saito et al. | 369/53.2 |
| 6,366,542 | B1 | * | 4/2002 | Kojima et al. | 369/44.23 |
| 7,072,272 | B2 | | 7/2006 | Yagi et al. | |
| 7,126,904 | B2 | | 10/2006 | Nishiwaki et al. | |
| 2002/0003767 | A1 | * | 1/2002 | Ota et al. | 369/112.09 |
| 2003/0058776 | A1 | * | 3/2003 | Sakamoto | 369/112.07 |
| 2003/0076595 | A1 | | 4/2003 | Ikenaka et al. | |
| 2003/0117931 | A1 | | 6/2003 | Shimozono | |
| 2004/0213136 | A1 | * | 10/2004 | Arai et al. | 369/112.23 |
| 2005/0254397 | A1 | | 11/2005 | Arai et al. | |
| 2005/0281169 | A1 | | 12/2005 | Kimura et al. | |

FOREIGN PATENT DOCUMENTS

| JP | 09-054973 | 2/1997 |
| JP | 09-306018 | 11/1997 |
| JP | 2002-277732 | 9/2002 |

* cited by examiner

*Primary Examiner*—Wayne Young
*Assistant Examiner*—Linh T Nguyen
(74) *Attorney, Agent, or Firm*—Finnegan, Henderson, Farabow, Garrett & Dunner, L.L.P.

(57) ABSTRACT

An objective optical element of an optical pickup apparatus has a magnification m1 satisfying the following formula for a light flux of the wavelength $\lambda 1$: $-1/7 \leq m1 \leq -1/25$ and $|m1| < |M1|$, where M1 is an optical system magnification from the first light source to the first optical information recording medium for a light flux of the wavelength $\lambda 1$. The objective optical element comprises a common region and an exclusive region. The exclusive region includes an exclusive diffractive structure having a function to suppress an increase of spherical aberration due to a raise of atmospheric temperature. A light flux of a wavelength $\lambda 2$. having passed through the exclusive diffractive structure intersects with the optical axis at a position different from the position of the converged light spot formed on the information recording plane of the second optical information recording medium.

38 Claims, 17 Drawing Sheets

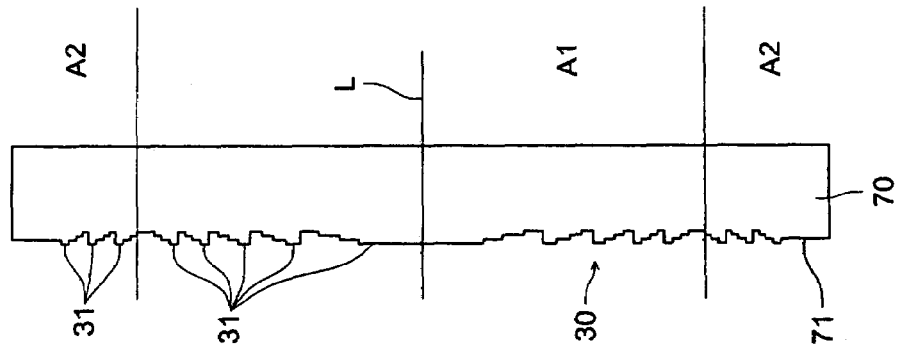
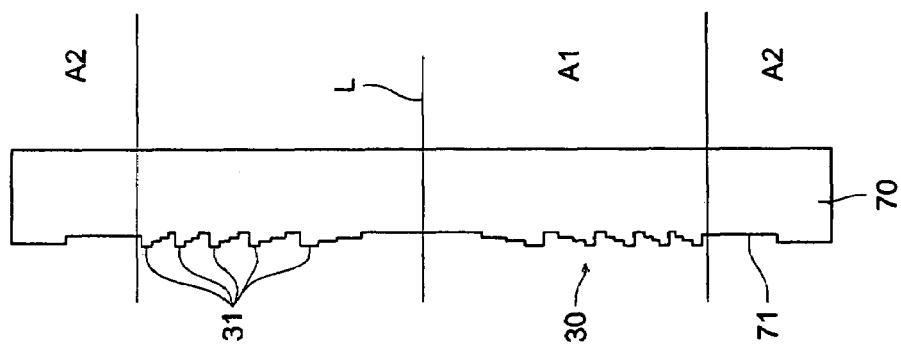
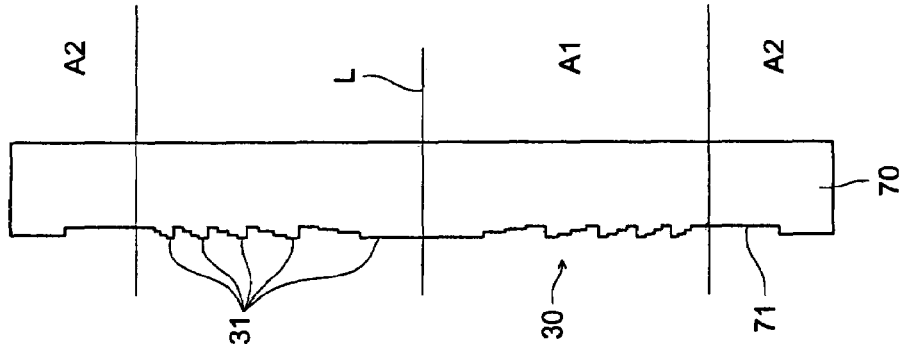

OBJECTIVE OPTICAL ELEMENT AND OPTICAL PICKUP APPARATUS

CROSS-REFERENCE TO RELATED APPLICATIONS

This is a continuation application of U.S. patent application Ser. No. 10/693,935, filed Oct. 28, 2003 now abandoned, the entirety of which is incorporated herein by reference. This application claims priority under 35 U.S.C. §119(a)-(d) to Japanese Patent Application Nos. 2002-318795 filed Oct. 31, 2002, 2002-335205 filed Nov. 19, 2002, 2002-339165 filed Nov. 22, 2002, and 2002-345063 filed Nov. 28, 2002.

BACKGROUND OF THE INVENTION

The present invention relates to an objective optical element that converges a light flux on an information recording surface of an optical information recording medium and to an optical pickup device.

In recent years, with a practical use of a short wavelength red laser, there has been commercialized DVD (digital video disc) representing a high density optical information recording medium (which is also called an optical disc) that is in the same size as that of CD (compact disc) and has greater capacity.

In the recording apparatus for DVD, numerical aperture NA of an objective lens on the optical disc side when a semiconductor laser with a wavelength of 650 nm is used is made to be 0.6-0.65. A track pitch and the shortest pit length of DVD are respectively 0.74 µm and 0.4 µm, which means that DVD has been made to be of higher density to a half or less of CD whose track pitch is 1.6 µm and shortest pit length is 0.83 µm Further, in DVD, a thickness of its protective base board is 0.6 mm that is a half of that of a protective base board of CD, for controlling coma which is caused when an optical disc is inclined to an optical axis to be small.

In addition to the aforementioned CD and DVD, there have been commercialized optical discs in various standards wherein light source wavelengths are different each other and protective base board thickness are different each other such as, for example, CD-R, RW (write-once read multiple compact disc), VD (video disc), MD (mini-disc) and MO (magnet-optic disk).

Further, a technology to make a wavelength of the semiconductor laser to be shorter has been carried forward, and there have been advanced research and development for a high density optical disc with a protective base board having a thickness of about 0.1 mm (hereinafter referred to as "high density DVD") that employs a violet semiconductor laser light source with wavelength of about 400 nm and an objective lens wherein numerical aperture (NA) on the image side has been enhanced to about 0.85 and for high density DVD with a protective base board having a thickness of about 0.6 mm that employs an objective lens wherein numerical aperture (NA) on the image side has been enhanced to about 0.65.

Thus, there have been suggested various types of the so-called optical pickup devices having compatibility for converging two types of light fluxes each having a different wavelength with a single objective lens on information recording surfaces of two types of optical discs.

As an optical pickup device having compatibility, there is known one wherein a steps structure (diffractive structure) composed of a stairway-shaped discontinuous surface is formed on a surface of an objective lens or on a surface of the optical element arranged separately from the objective lens (for example, see Patent Document 1-Patent Document 3).

Patent Document 1 and Patent Document 2 disclose an optical pickup device wherein a flat hologram optical element equipped with a diffractive structure that is composed of stairway-shaped steps and an objective lens of a refraction type are provided separately.

In the disclosed device, recording and reproducing of information are conducted for two types of optical discs with a single objective lens, in the following manner; namely, among two types of wavelengths of parallel light collimated by a collimator lens, a light flux having a wavelength on one side is converged on a prescribed disc by the objective lens after being transmitted through the hologram optical element, while, a ray of light having a wavelength on the other side is diffracted to be diverged when it passes through the hologram optical element, and then,—first order diffracted light among others is converged on a prescribed optical disc by the objective lens.

Further, the aforementioned Patent Document 3 discloses an optical pickup device equipped with an objective lens on which a diffractive structure that is composed of stairway-shaped steps (zone plate) is formed.

This device is one wherein a light flux with wavelength 650 nm is converged on a recording surface of DVD by a convex shape of the objective lens and by aspheric surface shapes on both surfaces of the objective lens, and a light flux with wavelength 780 nm is converged on a recording surface of CD-R, among two wavelength types of 650 nm and 780 nm of parallel light collimated by a collimator lens.

(Patent Document 1)
  TOKKAIHEI No. 9-54973

(Patent Document 2)
  TOKKAIHEI No. 9-306018

(Patent Document 3)
  TOKKAI No. 2002-277732

PROBLEMS TO BE SOLVED BY THE INVENTION

Incidentally, each of the devices disclosed in the Patent Documents 1-3 is the so-called optical pickup device of an infinite system wherein two types of light fluxes each having a different wavelength emitted respectively from light sources are collimated by a collimator into parallel light, and then, are made to enter a hologram optical element equipped with a diffractive structure or an objective lens.

In the optical pickup device of an infinite system, there has been a problem to result in a large-sized device and a high cost of the device, because of necessity to arrange an optical element such as a collimator lens for transforming a light flux into parallel light between a light source and an objective lens.

There has further been a problem, in the so-called optical pickup device of an infinite system wherein divergent light enters an objective lens, that image height characteristics are worsened in the course of tracking to move an objective lens against an optical disk in the case of conducting reproducing or recording for the optical disk, and coma and astigmatism are caused.

Further, there has been a problem, in the optical pickup device of a finite system, that spherical aberration caused by temperature changes is greater than that in the device of an infinite system.

SUMMARY OF THE INVENTION

In view of the problems stated above, an object of the invention is to provide an optical pickup device that is used for conducting reproducing and/or recording of information for two types of optical information recording media each having a different working wavelength, and reduces deterioration of image height characteristics and can correct spherical aberration caused by temperature changes, and to provide an objective optical element.

BRIEF DESCRIPTION OF THE DRAWINGS

FIGS. 11(a) to 11(c) represent side views of primary portions showing the structure of another optical pickup device equipped with a phase modulation means.

FIG. 17 is a sectional view of a diffractive structure A on a common region 241a.

DETAILED DESCRIPTION OF THE PREFERRED EMBODIMENT

Figure 1:
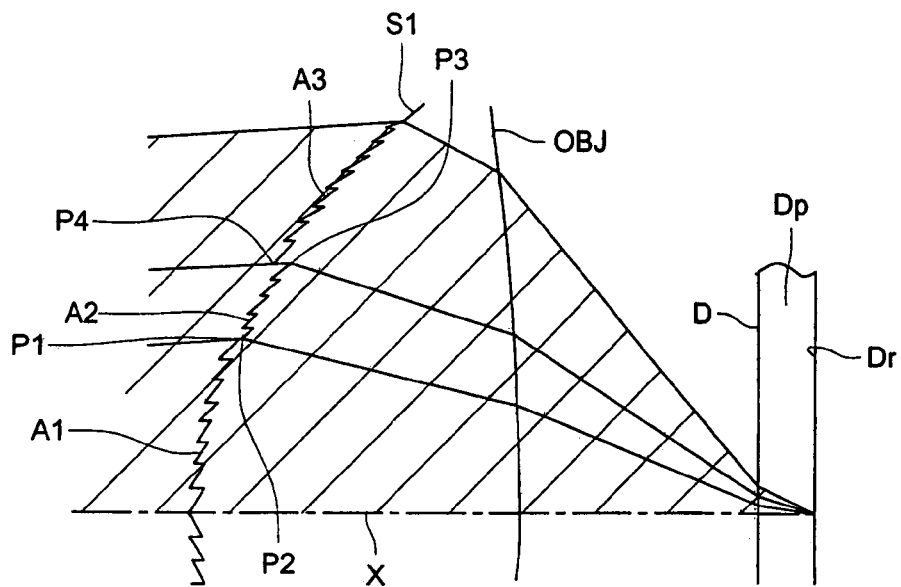
FIGS. 1(a) and 1(b) each is a sectional view of an example of the objective optical element of the first embodiment.
Figure 1:
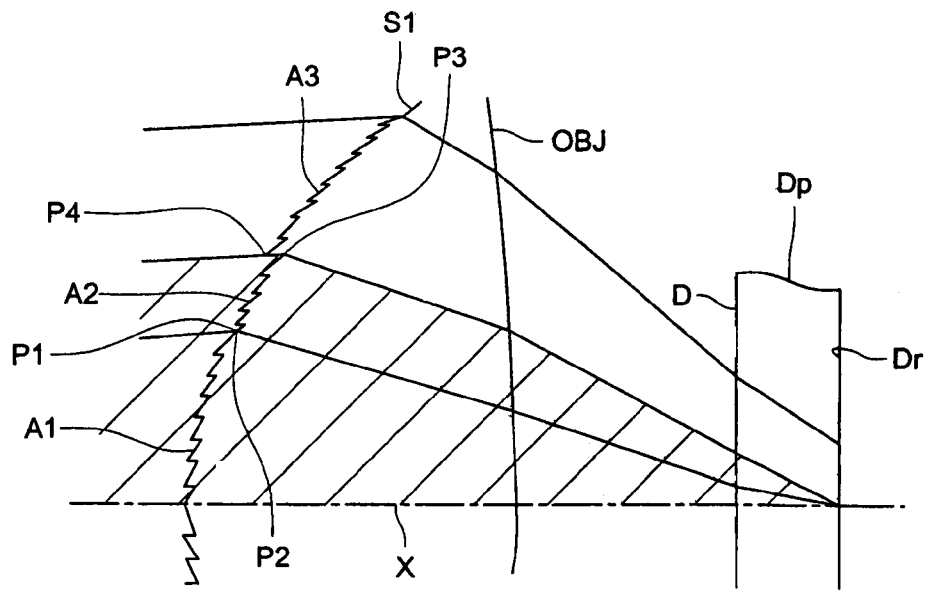

Firstly, the terminology used in this specification is explained hereinafter.

The optical element in the present specification in this case means a member such as, for example, a coupling lens, a beam expander, a beam shaper and a correction plate which constitute an optical system of an optical pickup device.

Further, the optical element is not limited to one that is composed only of a single lens, and it may also be a lens group wherein a plurality of lenses are combined in the direction of an optical axis.

The objective optical element means an objective lens. The objective lens means, in a narrow sense, a lens having a light-converging function that is arranged to face an optical information recording medium at the position closest to the optical information recording medium under the condition that the optical information recording medium is loaded in the optical pickup device, and it means, in a broad sense, a lens that can be moved by an actuator in the direction of an optical axis, together with the aforementioned lens.

The optical information recording medium means an ordinary optical disc that conducts reproducing and/or recording of information by the use of a light flux with a prescribed wavelength such as CD, DVD, CD-R, MD, MO and high density DVD.

Further, reproducing of information means reproducing of information recorded on an information recording surface of the optical information recording medium, and recording of information means recording information on an information recording surface of the optical information recording medium. Incidentally, reproducing mentioned in this case includes simple reading of information.

The optical pickup device may either be one used to conduct only recording of information or only reproducing of information, or be one used to conduct both recording and reproducing.

The discontinuous region means the structure that is composed of continuous stairway-shaped steps portion along the optical axis direction when its section is viewed on a plane (meridional section) including an optical axis, and has a function to diffract the light flux by giving a phase difference to a prescribed light flux entering the discontinuous region.

"The optical system magnification" means the so-called lateral magnification which is a ratio of a size of an object to a size of an image.

"The diffractive structure" means a relief provided on a surface of an optical element such as, for example, an objective lens to have a function to converge or diverge a light flux with diffraction. A form of the relief which is known, for example, is represented by ring-shaped zones which are mostly concentric circles having centers on the optical axis each being in a shape of a saw-tooth when viewed, as a section, on a plane including the optical axis, and the form of this kind is included, and is especially called "diffracting ring-shaped zones".

The second optical information recording medium (which is also called a second optical disk) means optical discs of various CD types such as, for example, CD-R, CD-RW, CD-Video and,CD-ROM, while, the first optical information recording medium (which is also called a first optical disk) includes DVD-ROM and DVD-Video used exclusively for reproducing and includes optical discs of various DVD types such as DVD-RAM, DVD-R and DVD-RW which are used for both reproducing and, recording. Further, thickness t of the transparent base board in the present specification includes t=0.

Further, the protective base board means a parallel flat plate that is transparent optically and is formed on the light flux entering side of the information recording surface for protecting the information recording surface of the optical information recording medium, and a protective base board thickness means a thickness of the parallel flat plate. A light flux emitted from the light source is converged by the objective lens on the information recording surface of the optical information recording medium through the protective base board.

The numerical aperture of the optical element on the image side means the numerical aperture on the lens surface that is positioned to be closest to the optical information recording medium in the optical element.

Further, the numerical aperture is a numerical aperture defined as a result wherein a light flux contributing to formation of a spot at the best image point is restricted by parts or members having stopping functions such as a diaphragm of a filter provided on the optical pickup device and by the diffractive structure provided on the optical element.

When the optical pickup device relating to the invention is used as an optical pickup device having compatibility for CD and DVD, a wavelength of a light flux having the first wavelength $\lambda 1$ is supposed to be within a range of 620 nm-680 nm, and a wavelength of a light flux having the second wavelength $\lambda 2$ is supposed to be within a range of 750 nm-810 nm.

Hereinafter, the embodiments to attain the above object of the present invention will be explained.

First Embodiment

An objective optical element of the optical pickups device described in Item (1-1) is an objective optical element that has therein the first light source with wavelength $\lambda 1$, the second light source with wavelength $\lambda 2$ ($\lambda 1 < \lambda 2$) and a light-converging optical system including a magnification converting element and an objective optical element, and can conduct recording and/or reproducing of information when the light-converging optical system converges a light flux emitted from the first light source on an information recording surface of the first optical information recording medium through a protective layer with thickness t1, and can conduct recording and/or reproducing of information by converging a light flux emitted from the second light source on an information recording surface of the second optic al information recording medium through a protective layer with thickness t2 ($t1 \leq t2$), wherein optical system magnification m1 of the objective optical element for the light flux with wavelength $\lambda 1$ satisfies the following expression, $$-1/7 \leq m1 \leq -1/25 \qquad (1)$$

optical system magnification M1 from the first light source to the first optical information recording medium for the light flux with wavelength $\lambda 1$ in the optical pickup device satisfies the following expression, $$|m1| < |M1| \qquad (2)$$

and on at least one surface of the objective optical element, there are provided a common area through which the light flux, emitted from the first light source and the light flux emitted from the second light source pass and form light-converged spots respectively on information recording surfaces of the first optical information recording medium and the second optical information recording medium and an exclusive area through which the light flux emitted from the first light source passes and forms a light-converged spot on the information recording surface of the first optical information recording medium, and,the light flux emitted from the second light source passes, but does not form a light-converged spot on the information recording surface of the second optical information recording medium, and on the common area, there is provided a common diffractive structure that has a function to correct to reduce a difference between spherical aberration caused when the light flux with wavelength $\lambda 1$ that has passed through the-common diffractive structure is converged on the information recording surface of the first optical information recording medium through the protective layer with thickness t1 and spherical aberration caused when the light flux with wavelength $\lambda 2$ that has passed through the common diffractive structure is converged on the information recording surface of the second optical information recording medium through the protective layer with thickness t2, and on the exclusive area, there is provided an exclusive diffractive structure that has a function to control, in accordance with changes of wavelength $\lambda 1$, spherical aberration that increases, in accordance with a rise of ambient temperature, when the light flux with wavelength $\lambda 1$ that has passed through the exclusive diffractive structure is converged on the information recording surface of the first optical information recording medium, and the light flux with wavelength $\lambda 2$ that has passed through the exclusive diffractive structure intersects the optical axis at the point that is different from the light-converged spot formed on the information recording surface of the second optical information recording medium in the direction of the optical axis.

In the objective optical element of the optical pickup device described in Item (1-1), downsizing of an optical pickup device is made to be compatible with security of aberration characteristics by irradiating a light flux having a small angle of divergence on the objective optical element. To be more concrete, it is possible to control deterioration of aberration characteristics even when a light flux emitted from a light source enters with its center deviated from or inclined to the optical axis of the objective optical element, for example, because optical system magnification m1 is not less than the lower limit in the aforementioned expression (1). On the other hand, it is possible to secure a sufficient distance between the objective optical element and the optical information recording medium because optical system magnification m1 is not more than the upper limit. Further, in the invention, deterioration of spherical aberration caused by a thickness difference between a protective layer of the first optical information recording medium and that of the second optical information recording medium is controlled by the diffractive structure provided on the common area, and deterioration of spherical aberration caused by changes of refractive index of the objective optical element in accordance with a rise of ambient temperature is controlled by the diffractive structure provided on the exclusive area, thus, recording and/or reproducing of information can be conducted properly for optical information recording media each being of a different type. Incidentally, "to correct to reduce a difference of spherical aberration" means that the spherical aberration, is corrected to become smaller compared with an occasion where the common diffractive structure is not provided and a refracting interface exists alone.

In the objective optical element of the optical pickup device described in Item (1-2), when an optical system magnification of the objective optical element for the light flux with wavelength $\lambda 2$ is represented by m2, the following expression is satisfied.

$$|m1 - m2| < 0.5 \qquad (3)$$

In the objective optical element of the optical pickup device described in 1-3, there are provided the first ring-shaped zonal area and the second ring-shaped zonal area which are divided by the step in the direction of an optical axis and have respectively centers on the optical axis, on the aforementioned common area, and the common diffractive structure is provided on the second ring-shaped zonal area that is farther from the optical axis and the refracting interface is provided on the first ring-shaped zonal area that is closer to the optical axis.

In the objective optical element of the optical pickup device described in Item (1-4), an edge portion adjoining the second ring-shaped zonal area in the first ring-shaped zonal area is positioned to be closer to the light source in the direction of an optical axis than an edge portion adjoining the first ring-shaped zonal area in the second ring-shaped zonal area is.

In the objective optical element of the optical pickup device described in Item (1-5), the third ring-shaped zonal area having a refracting interface on the side farther form the optical axis is provided to adjoin the second ring-shaped zonal area, and an edge portion adjoining the third ring-shaped zonal area in the second ring-shaped zonal area is positioned to be closer to the optical information recording medium in the direction of an optical axis than an edge portion adjoining the second ring-shaped zonal area in the third ring-shaped zonal area is.

In the objective optical element of the optical pickup device described in Item (1-6), the common diffractive structure has optical characteristics which make spherical aberration to be under in the light flux that has passed through the common diffractive structure when a wavelength of the light source is changed to be longer.

Now, an example of the objective optical element relating to the aforementioned invention will be explained as follows, referring to the drawings. FIG. 1 is a sectional view of objective optical element OBJ of the invention. On optical surface S1 of the objective optical,element. OBJ closer to the light source, central first ring-shaped zonal, area A1 including optical axis X, second ring-shaped zonal area A2 surrounding the first ring-shaped zonal area and third ring-shaped zonal area A3 surrounding the second-ring-shaped zonal area are divided by steps in the direction of an optical axis, in FIG. 1. The common area mentioned in the invention corresponds to the first ring-shaped zonal area A1 and the second ring-shaped zonal area A2, while, the exclusive area mentioned in the invention corresponds to the third ring-shaped zonal area A3.

Namely, when conducting recording and/or reproducing of information for the first optical information recording medium D, the light flux passing through the first ring-shaped zonal area A1, the second ring-shaped zonal area A2 and the third ring-shaped zonal area A3 forms a light-converged spot on information recording surface Dr through protective layer Dp, as shown in FIG. 1(a). On the other hand, when conducting recording and/or reproducing of information for the second optical information recording medium D, the light flux passing through the first ring-shaped zonal area A1 and the second ring-shaped zonal area A2 forms a light-converged spot on information recording surface Dr through protective layer Dp, as shown in FIG. 1(b). In this case, the light flux passing through the third ring-shaped zonal area A3 becomes a flare without forming a light-converged spot on information recording surface Dr.

Each of the areas A1-A3 is composed of the refracting interface and is provided with a diffractive structure (however, the area A1 may also be provided with only refracting interface), and the second ring-shaped zonal area A2 is in a shape to be displaced to be closer to the optical information recording medium D than the first ring-shaped zonal area A1 and the third ring-shaped zonal area A3 are. To be more concrete, edge portion P1 adjoining the second ring-shaped zonal area A2 in the first ring-shaped zonal area A1 is positioned to be closer to the light source in the direction of an optical axis than edge portion P2 adjoining the first ring-shaped zonal area A1 in the second ring-shaped zonal area A2 is. Further, edge portion P3 adjoining the third ring-shaped zonal area A3 in the second ring-shaped zonal area A2 is positioned to be closer to the optical information recording medium D in the direction of an optical axis than edge portion P4 adjoining the second ring-shaped zonal area A2 in the third ring-shaped zonal area A3 is. Owing to this structure, effects to change a phase difference as those described in the following Item (1-6) or (1-7) can be obtained.

In the objective optical element of the optical pickup device described in Item (1-7), a phase of the light flux with wavelength $\lambda 1$ that has passed through the first ring-shaped zonal area is different by $2\pi \times i$ (i: Integer) from that of the light flux with wavelength $\lambda 1$ that has passed through the second ring-shaped zonal area, at the position of the best image plane.

In the objective optical element of the optical pickup device described in Item (1-7), a phase of the light flux with wavelength $\lambda 1$ that has passed through the first ring-shaped zonal area is different by $2\pi \times i$ (i: Integer) from that of the light flux with wavelength $\lambda 1$ that has passed through the third ring-shaped zonal area, at the position of the best image plane.

In the objective optical element of the optical pickup device described in Item (1-9), all of the common areas are provided with a diffractive structure.

The objective optical element of the optical pickup device described in Item (1-10) is an objective optical element used in the optical pickup device that has therein the first light source with wavelength $\lambda 1$, the second light source with wavelength $\lambda 2$ ($\lambda 1 < \lambda 2$) and a light-converging optical system including a magnification converting element and an objective optical element, and is capable of conducting recording and/or reproducing of information when the light flux emitted from the first light source is converged on an information recording surface of the first optical information recording medium through a protective layer with thickness t1 by the capable of conducting recording and/or reproducing of information when the light flux emitted from the second light source is converged on an information recording surface of the second optical information recording medium through a protective layer with thickness t2 (t1≦t2) by the light-converging optical system, wherein optical system magnification m1 of the objective optical element for the light flux with wavelength X1 satisfies the following expression, $$-1/7m1 \leq -1/25 \tag{1}$$

optical system magnification M1 for the light flux with wavelength $\lambda 1$ from the first light source to the first optical information recording medium in the optical pickup device satisfies the following expression, $$|m1| < |M1| \tag{2}$$

and on at least one surface on the objective optical element, there are provided a common area through which the light flux, emitted from the first light source and the light flux emitted from the second light source pass to form light-converged spots respectively on an information recording surface of the first optical information recording medium and an information recording surface of the second optical information recording medium and an exclusive area through which the light flux emitted from the first light source and the light flux emitted from the second light source pass, and a light-converged spot is formed on an information recording surface of the first optical information recording medium but a light-converged spot is not formed on an information recording surface of the second optical information recording medium, and the common area is divided into plural ring-shaped refracting interfaces having steps in the direction of an optical axis to be the first, second . . . $k^{th}$ (k is a natural number of 2 or more) surfaces in this order from the optical axis, and an edge portion of at least $n^{th}$ (n is a natural number of 2 or more, $n \leq k$) ring-shaped refracting interface is positioned to be closer to the optical information recording medium in the direction of the optical axis than an edge portion on $(n-1)^{th}$ ring-shaped refracting interface farther from the optical axis is, and an edge portion of the $n^{th}$ ring-shaped refracting interface farther from the optical axis is positioned to be closer to the optical information recording medium in the direction of the optical axis than an edge portion on $(n+1)^{th}$ (surface of the exclusive area in the case of n=k) ring-shaped refracting interface closer to the optical axis is, while the light flux with wavelength $\lambda 1$ that has passed through the $n^{th}$ surface is converged at the position that is different from the position of the best image plane in the direction of an optical axis, the light flux with wavelength $\lambda 1$ that has passed through the exclusive area forms the first light-converged spot on the information recording surface of the first optical information recording medium, while the light flux with wavelength $\lambda 2$ that has passed through the exclusive area does not form the second light-converged spot on the information recording surface of the second optical information recording medium, and a diffractive structure for temperature correction is formed on the exclusive area, and there is provided the function which controls, in accordance with changes in wavelength of the light flux with wavelength $\lambda 1$, spherical aberration that increases, in accordance with a rise of an ambient temperature, when the light flux with wavelength $\lambda 1$ that has passed through the diffractive structure for temperature correction is converged on the information recording surface of the first optical information recording medium, and further, the light flux with wavelength $\lambda 2$ that has passed through the diffractive structure for temperature correction intersects the optical axis at the position that is different from the second light-converged spot in the direction of the optical axis.

In the objective optical element of the optical pickup device described in Item (1-10), downsizing of an optical pickup device is made to be compatible with security of aberration characteristics by irradiating a light flux having a small angle of divergence on the objective optical element. To be more concrete, it is possible to control deterioration of aberration characteristics even when a light flux emitted from a light source enters with its center deviated from or inclined to the optical axis of the objective optical element, for example, because optical system magnification m1 is not less than the lower limit in the aforementioned expression (1). On the other hand, it is possible to secure a sufficient distance between the objective optical element and the optical information recording medium because optical system magnification m1 is not more than the upper limit.

Further, in the explanation of the invention with a reference of an example shown in FIG. 1, the first ring-shaped zonal area A1 is the first surface, the second ring-shaped zonal area A2 is the second surface and the third ring-shaped zonal area A3 is the third surface, and therefore, in the case of n=2, edge portion P2 closer to the optical axis on the ring-shaped zonal refracting interface on the second surface is positioned to be closer to the optical information recording medium D in the direction of the optical axis than edge portion P1 that is farther from the optical axis on the ring-shaped zonal refracting interface on the first surface, and edge portion P3 farther from the optical axis on the ring-shaped zonal refracting interface on the second surface is positioned to be closer to the optical information recording medium D in the direction of the optical axis than edge portion P4 that is closer to the optical axis on the ring-shaped zonal refracting interface on the third surface, thus, it is possible to obtain effects to change a phase difference like those described in the following Item (1-10).

In the objective optical element of the optical pickup device described in Item (1-11), the following expression is satisfied when m2 represents an optical system magnification of the objective optical element for the light flux with wavelength $\lambda 2$.

$$|m1-m2|<0.5 \quad (3)$$

In the objective optical element of the optical pickup device described in Item (1-12), a phase of the light flux with wavelength $\lambda 1$ that has passed through the $n^{th}$ surface is different by $2\pi \times i$ (i: Integer) from that of the light flux with wavelength $\lambda 1$ that has passed through the $(n-1)^{th}$ surface at the position of the best image plane.

The objective optical element of the optical pickup device described in Item (1-13) is an objective optical element used in the optical pickup device that has therein the first light source with wavelength $\lambda 1$, the second light source with wavelength $\lambda 2$ ($\lambda 1 < \lambda 2$) and a light-converging optical system including a magnification converting element and an objective optical element, and is capable of conducting recording and/or reproducing of information when the light flux emitted from the first light source is converged on an information recording surface of the first optical information recording medium through a protective layer with thickness t1 by the capable of conducting recording and/or reproducing of information when the light flux emitted from the second light source is converged on an information recording surface of the second optical information recording medium through a protective layer with thickness t2 (t1$\leq$t2) by the light-converging optical system, wherein optical system magnification m1 of the objective optical element for the light flux with wavelength $\lambda 1$ satisfies the following expression, $$-1/7 \leq m1 \leq -1/25 \quad (1)$$

optical system magnification M1 for the light flux with wavelength $\lambda 1$ from the first light source to the first optical information recording medium in the optical pickup device satisfies the following expression, $$|m1|<|M1| \quad (2)$$

and on at least one surface on the objective optical element, there are provided a common area through which the light flux emitted from the first light source and the light flux emitted from the second light source pass to form light-converged spots respectively on an information recording surface of the first optical information recording medium and an information recording surface of the second optical information recording medium and an exclusive area through which the light flux emitted from the first light source and the light flux emitted from the second light source pass, and a light-converged spot is formed on an information recording surface of the first optical information recording medium but a light-converged spot is not formed on an information recording surface of the second optical information recording medium, and at least a part of the common area has a function to correct, in accordance with a wavelength difference between the wavelength $\lambda 1$ and the wavelength $\lambda 2$, to reduce a difference between spherical aberration caused when the light flux with wavelength $\lambda 1$ that has passed through the common area is converged on the information recording surface of the first optical information recording medium through the protective layer with thickness t1 and spherical aberration caused when the light flux with wavelength $\lambda 2$ that has passed through the common diffractive structure is converged on the information recording surface of the second optical information recording medium through the protective layer with thickness t2, then, at least a part of the exclusive has a function to control, in accordance with changes in a wavelength of the light flux with wavelength λ1, to control spherical aberration that increases, in accordance with a rise of ambient temperature, when the light flux with wavelength λ1 that has passed through the exclusive diffractive structure is converged on the information recording surface of the first optical information recording medium, and the light flux with wavelength λ2 that has passed through the exclusive area intersects the optical axis at the position that is different from the light-converged spot formed on the information recording surface of the second optical information recording medium, in the direction of the optical axis. Functions and effects of the invention are the same as those described in Item (1-1) or Item (1-9).

In the objective optical element of the optical pickup device described in Item (1-14), the following expression is satisfied when m2 represents an optical system magnification of the objective optical element for the light flux with wavelength λ2.

$$|m1-m2|<0.5 \quad (3)$$

In the objective optical element of the optical pickup device described in Item (1-15), the magnification converting optical element is a coupling lens.

In the objective optical element of the optical pickup device described in Item (1-16), the objective optical element is an objective lens.

In the objective optical element of the optical pickup device described in Item (1-17), the objective optical element is made of plastic.

In the objective optical element of the optical pickup device described in Item (1-18), the first light source and the second light source are arranged on the same base board, as in a two-laser one-package unit.

In the objective optical element of the optical pickup device described in Item (1-19), the first light source and the second light source are arranged to be the same in terms of a distance from the magnification converting element in the direction of the optical axis.

The optical pickup device described in Item (1-20) is an optical pickup device that has therein the first light source with wavelength λ1, the second light source with wavelength λ2 (λ1<λ2) and a light-converging optical system including a magnification converting element and an objective optical element, and can conduct recording and/or reproducing of information when the light-converging optical system converges a light flux emitted from the first light source on an information recording surface of the first optical information recording medium through a protective layer with thickness t1, and can conduct recording and/or reproducing of information by converging a light flux emitted from the second light source on an information recording surface of the second optical information recording medium through a protective layer with thickness t2 (t1<t2), wherein optical system magnification m1 of the objective optical element for the light flux with wavelength λ1 satisfies the following: expression, $$-1/7 \leq m1 \leq -1/25 \quad (1)$$

optical system magnification M1 from the first light source to the first optical information recording medium for the light flux with wavelength λ1 in the optical pickup device satisfies the following expression, $$|m1|<|M1| \quad (2)$$

and on at least one surface of the objective optical element, there are provided a common area through which the light flux emitted from the first light source and the light flux emitted from the second light source pass and form light-converged spots respectively on information recording surfaces of the first optical information recording medium and the second optical information recording medium and an exclusive area through which the light flux emitted from the first light source passes and forms a light-converged spot on the information recording surface of the first optical information recording medium, and the light flux emitted from the second light source passes, but does not form a light-converged spot on the information recording surface of the second optical information recording medium, and on the common area, there is provided a common diffractive structure that has a function to correct to reduce a difference between spherical aberration caused when the light flux with wavelength λ1 that has passed through the common diffractive structure is converged on the information recording surface of the first optical information recording medium through the protective layer with thickness t1 and spherical aberration caused when the light flux with wavelength λ2 that has passed through the common diffractive structure is converged on the information recording surface of the second optical information recording medium through the protective layer with thickness t2, and on the exclusive area, there is provided an exclusive diffractive structure that has a function to control, in accordance with changes of wavelength λ1, spherical aberration that increases, in accordance with a rise of ambient temperature, when the light flux with wavelength λ1 that has passed through the exclusive diffractive structure is converged on the information recording surface of the first optical information recording medium, and the light flux with wavelength λ2 that has passed through the exclusive diffractive structure intersects the optical axis at the point that is different from the light-converged spot formed on the information recording surface of the second optical information recording medium in the direction of the optical axis. Functions and effects of the invention are the same as those described in Item (1-1).

In the optical pickup device described in Item (1-21), the following expression is satisfied when m2 represents an optical system magnification of the objective optical element for the light flux with wavelength λ2.

$$|m1-m2|<0.5 \quad (3)$$

In the optical pickup device described in Item (1-22), the first ring-shaped zonal area and the second ring-shaped zonal area which are divided by steps in the direction of an optical axis and have respectively centers on the optical axis are provided on the common area, and the common diffractive structure is provided on the first ring-shaped zonal area positioned to be farther from the optical axis, and the second ring-shaped zonal area positioned to be closer to the optical axis has a refracting interface.

In the optical pickup device described in Item (1-23), an edge portion that adjoins the first ring-shaped zonal area in the second ring-shaped zonal area is positioned to be closer to the light source in the direction of an optical axis than an edge portion that adjoins the second ring-shaped zonal area in the first ring-shaped zonal area is.

In the optical pickup device described in Item (1-24), the third ring-shaped zonal area having a refracting interface on the side farther from the optical axis is provided to adjoin the first ring-shaped zonal area and an edge portion that adjoins the third ring-shaped zonal area in the first ring-shaped zonal area is positioned to be closer to the optical information recording medium in the direction of an optical axis than an edge portion that adjoins the first ring-shaped zonal area in the third ring-shaped zonal area is.

In the optical pickup device described in Item (1-25), the common diffractive structure has optical characteristics which make spherical aberration to be under on the light flux that has passed through the common diffractive structure when a wavelength of the light source is changed to be longer.

In the optical pickup device described in Item (1-26), a phase of the light flux with wavelength $\lambda 1$ that has passed through the first ring-shaped zonal area is different by $2\pi \times i$ (i: Integer) from that of the light flux with wavelength $\lambda 1$ that has passed through the second ring-shaped zonal area, at the position of the best image plane.

In the optical pickup device described in Item (1-27), a phase of the light flux with wavelength $\lambda 1$ that has passed through the first ring-shaped zonal area is different by $2\pi \times i$ (i: Integer) from that of the light flux with wavelength $\lambda 1$ that has passed through the third ring-shaped zonal area, at the position of the best image plane.

In the objective optical element of the optical pickup device described in Item (1-28), all of the common areas are provided with a diffractive structure.

The optical pickup device described in Item (1-29) is an optical pickup device that has therein the first light source with wavelength $\lambda 1$ the second light source with wavelength $\lambda 2$ ($\lambda 1 < \lambda 2$) and a light-converging optical system including a magnification converting element and an objective optical element, and can conduct recording and/or reproducing of information when the light-converging optical system converges a light flux emitted from the first light source on an information recording surface of the first optical information recording medium through a protective layer with thickness t1, and can conduct recording and/or reproducing of information by converging a light flux emitted from the second light source on an information recording surface of the second optical information recording medium through a protective layer with thickness t2 (t1≦t2), wherein optical system magnification m1 of the objective optical element for the light flux with wavelength $\lambda 1$ satisfies the following expression, $$-1/7 m1 \leq -1/25 \tag{1}$$

optical system magnification M1 from the first light source to the first optical information recording medium for the light flux with wavelength $\lambda 1$ in the optical pickup device satisfies the following expression, $$|m1| < |M1| \tag{2}$$

and on at least one surface of the objective optical element, there are provided a common area through which the light flux emitted from the first light source and the light flux emitted from the second light source pass and form light-converged spots respectively on information recording surfaces of the first optical information recording medium and the second optical information recording medium and an exclusive area through which the light flux emitted from the first light source passes and forms a light-converged spot on the information recording surface of the first optical information recording medium, and the light flux emitted from the second light source passes, but does not form a light-converged spot on the information recording surface of the second optical information recording medium, and on the common area, there is provided a common diffractive structure, and the common area is divided into plural ring-shaped refracting interfaces having steps in the direction of an optical axis to be the first, second . . . $k^{th}$ (k is a natural number of 2 or more) surfaces in this order from the optical axis, and an edge portion of at least $n^{th}$ (n is a natural number of 2 or more, n≦k) ring-shaped refracting interface is positioned to be closer to the optical information recording medium in the direction of the optical axis than an edge portion on $(n-1)^{th}$ ring-shaped refracting interface farther from the optical axis is, and an edge portion of the $n^{th}$ ring-shaped refracting interface farther from the optical axis is positioned to be closer to the optical information recording medium in the direction of the optical axis than an edge portion on $(n+1)^{th}$ (surface of the exclusive area in the case of n=k) ring-shaped refracting interface closer to the optical axis is, while the light flux with wavelength $\lambda 1$ that has passed through the $n^{th}$ surface is converged at the position that is different from the position of the best image plane in the direction of an optical axis, the light flux with wavelength $\lambda 1$ that has passed through the exclusive area forms the first light-converged spot on the information recording surface of the first optical information recording medium, while the light flux with wavelength $\lambda 2$ that has passed through the exclusive area does not form the second light-converged spot on the information recording surface of the second optical information recording medium, and a diffractive structure for temperature correction is formed on the exclusive area, and there is provided the function which controls, in accordance with changes in wavelength of the light flux with wavelength $\lambda 1$, spherical aberration that increases, in accordance with a rise of an ambient temperature, when the light flux with wavelength $\lambda 1$ that has passed through the diffractive structure for temperature correction is converged on the information recording surface of the first optical information recording medium, and further, the light flux with wavelength $\lambda 2$ that has passed through the diffractive structure for temperature correction intersects the optical axis at the position that is different from the second light-converged spot in the direction of the optical axis. Functions and effects of the invention are the same as those described in Item (1-10).

In the optical pickup device described in Item (1-30), the following expression is satisfied when m2 represents an optical system magnification of the objective optical element for the light flux with wavelength $\lambda 2$.

$$|m1-m2| < 0.5 \tag{3}$$

In the optical pickup device described in Item (1-31), a phase of the light flux with wavelength $\lambda 1$ that has passed through the $n^{th}$ surface is different by $2\pi \times i$ (i: Integer) from that of the $(n-1)^{th}$ surface at the position of the best image plane.

The optical pickup device described in Item (1-32) is an optical pickup device that has therein the first light source with wavelength $\lambda 1$, the second light source with wavelength $\lambda 2$ ($\lambda 1 < \lambda 2$) and a light-converging optical system including a magnification converting element and an objective optical element, and can conduct recording and/or reproducing of information when the light-converging optical system converges a light flux emitted from the first light source on an information recording surface of the first optical information recording medium through a protective layer with thickness t1, and can conduct recording and/or reproducing of information by converging a light flux emitted from the second light source on an information recording surface of the second optical information recording medium through a protective layer with thickness t2 (t1≦t2), wherein optical system magnification m1 of the objective optical element for the light flux with wavelength $\lambda 1$ satisfies the following expression, $$-1/7 \leq m1 \leq -1/25 \tag{1}$$

optical system magnification M1 from the first light source to the first optical information recording medium for the light flux with wavelength λ1 in the optical pickup device satisfies the following expression, $$|m1| < |M1| \qquad (2)$$

and on at least one surface of the objective optical element, there are provided a common area through which the light flux emitted from the first light source and the light flux emitted from the second light source pass and form light-converged spots respectively on information recording surfaces of the first optical information recording medium and the second optical information recording medium and an exclusive area through which the light flux emitted from the first light source passes and forms a light-converged spot on the information recording surface of the first optical information recording medium, and the light flux emitted from the second light source passes, but does not form a light-converged spot on the information recording surface of the second optical information recording medium, and at least a part of the common area has a function to correct, in accordance with a wavelength difference between the wavelength λ1 and the wavelength λ2, to reduce a difference between spherical aberration caused when the light flux with wavelength λ1 that has passed through the common area is converged on the information recording surface of the first optical information recording medium through the protective layer with thickness t1 and spherical aberration caused when the light flux with wavelength λ2 that has passed through the common diffractive structure is converged on the information recording surface of the second optical information recording medium through the protective layer with thickness t2 then, at least a part of the exclusive has a function to control, in accordance with changes in a wavelength of the light flux with wavelength λ1, to control spherical aberration that increases, in accordance with a rise of ambient temperature, when the light flux with wavelength λ1 that has passed through the exclusive diffractive structure is converged on the information recording surface of the first optical information recording medium, and the light flux with wavelength λ2 that has passed through the exclusive area intersects the optical axis at the position that is different from the light-converged spot formed on the information recording surface of the second optical information recording medium, in the direction of the optical axis. Functions and effects of the invention are the same as those described in Item (1-1) or Item (1-10).

In the optical pickup device described in Item (1-33), the following expression is satisfied when m2 represents an optical system magnification of the objective optical element for the light flux with wavelength λ2.

$$|m1 - m2| < 0.5 \qquad (3)$$

In the optical pickup device described in Item (1-34), the magnification converting optical element is a coupling lens.

In the optical pickup device described in Item (1-35), the objective optical element is an objective lens.

In the optical pickup device described in Item (1-36), the objective optical element is made of plastic.

In the optical pickup device described in Item (1-37), the first light source and the second light source are arranged on the same base board.

In the optical pickup device described in Item (1-38), the first light source and the second light source are arranged to be the same in terms of a distance from the magnification converting element in the direction of the optical axis.

Figure 2:
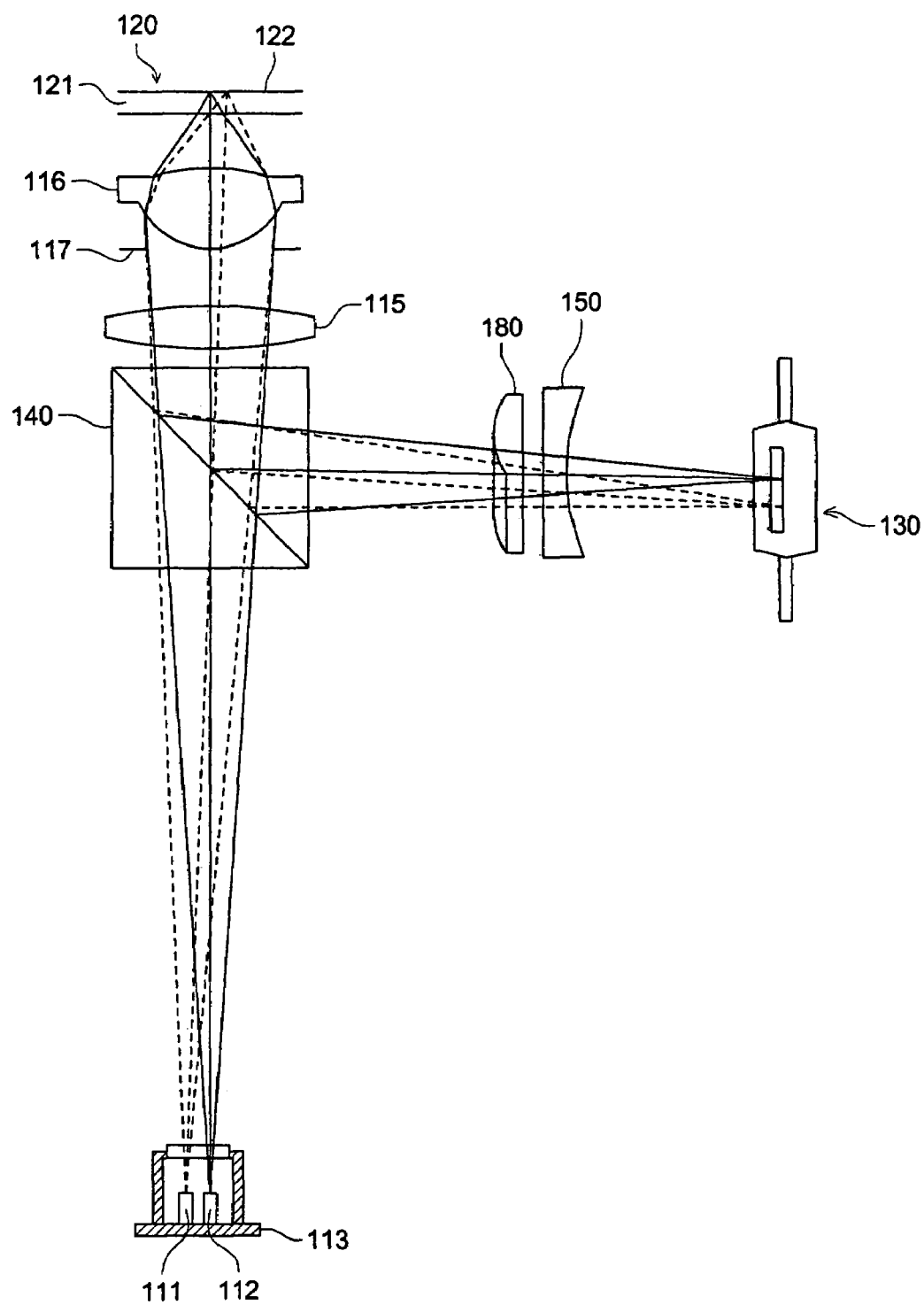
FIG. 2 is a schematic structure diagram of the optical pickup device relating to the present embodiment.

The first embodiment of the invention will be explained as follows, referring to the drawings. FIG. 2 is a schematic structure diagram of an optical pickup device relating to the example of the invention. In the optical pickup device shown in FIG. 2, first semiconductor laser 111 representing the first light source used for conducting recording and/or reproducing of information for the first optical disc (for example, DVD) and second semiconductor laser 212 representing the second light source used for conducting recording and/or reproducing of information for the second optical disc (for example, CD) are arranged on the same base board 113.

First, when conducting recording and/or reproducing of information for the first optical disk, a laser light flux is emitted from the first semiconductor laser 111. The light flux thus emitted passes through polarizing beam splitter 120 and coupling lens 115 representing a magnification converting element to become a divergent light flux that is close to a parallel light flux. This light flux is stopped down by diaphragm 117, and is converged by objective lens 116 representing an objective optical element on information recording surface 122 through transparent base board 121 of the first optical disc, 120. The light flux modulated by information pits and reflected on information recording surface 122 is transmitted again through objective lens 116, diaphragm 117 and coupling lens 115 to enter the polarizing beam splitter 120 to be reflected there and is given astigmatism by cylindrical lens 180, and enters a light receiving surface of photodetector 130 through concave lens 150. It is possible to obtain signals of recording or reproducing of information recorded on the first optical disc 120 by using output signals from the photodetector 130, On the other hand, when reproducing the second optical disc, a laser light flux is emitted from the second semiconductor laser 212. The light flux thus emitted passes through polarizing beam splitter 120, coupling lens 115, diaphragm 117 and objective lens 116 to be converged on information recording surface 122 through transparent base board 121 of the second optical disc 120, in the same way as in the light flux emitted from the aforementioned first semiconductor laser 111.

The light flux modulated by information pits and reflected on information recording surface 122 is transmitted again through objective lens 116, diaphragm 117, coupling lens 115, polarizing beam splitter 120, cylindrical lens 180 and concave lens 150, and enters a light receiving surface of photodetector 130. In the same way, it is possible to obtain signals of recording or reproducing of information recorded on the second optical disc 120 by using output signals from the photodetector 130.

A preferable example for the aforementioned embodiment will be explained as follows.

Both surfaces of the objective lens are represented by an aspheric surface shown by the following "Numeral 1" wherein Z represents an axis in the direction of an optical axis, h represents a height from the optical axis, r represents a paraxial radius of curvature, K represents a constant of the cone and $A_{2i}$ represents a coefficient of aspheric surface.

$$Z = \frac{(h^2/r)}{1 + \sqrt{1 - (1+\kappa)(h/r)^2}} + \sum_{i=1}^{9} A_i h^{P_i} \qquad \text{(Numeral 1)}$$

Further, a diffractive structure is formed on a surface of an aspheric surface of the objective lens on the light source side. This diffractive structure is expressed in a unit of mm by "Numeral 2" representing optical path difference function Φ for blazed wavelength λB. This second-order coefficient expresses the paraxial power of the diffracting portion. Further, spherical aberration can be controlled by the coefficient other than the second-order coefficient, such as, for example, the $4^{th}$ order coefficient or the $6^{th}$ order coefficient. "Can be controlled" in this case means that the spherical aberration is corrected totally by applying spherical aberration in the opposite characteristic to spherical aberration owned by a refraction portion, in the diffraction portion, or the spherical aberration is corrected by an incident wavelength or a flare is caused by utilizing wavelength-dependence of the diffracting portion. In this case, spherical aberration caused by temperature changes can also be considered as the total of the spherical aberration of the refraction portion caused by temperature changes and spherical aberration changes of the diffraction portion.

$$\Phi = \sum_{i=1}^{\infty} c_{2i} h^{2i} \text{ (mm)} \quad \text{(Numeral 2)}$$

EXAMPLE 1-1

Example 1-1 described below is one relating to the objective lens that can be applied to the embodiment stated above. Table 1-1 shows lens data relating to the objective lens of Example 1-1. Incidentally, from now on (including lens data in the Table), an exponent of 10 (for example, $2.5 \times 10^{-3}$) is expressed by using E (for example, 2.5×E −3).

TABLE 1-1

| $f_1$ = 2.22 mm | $f_2$ = 2.23 mm | $M_1$ = −0.1667 | $M_2$ = −0.1648 |
| NA1: 0.60 | NA2: 0.47 | $m_1$ = −0.1000 | $m_2$ = −0.0990 |

| $i^{th}$ surface | Ri | di (670 mm) | ni (670 nm) | di (789 nm) | ni (789 nm) |
|---|---|---|---|---|---|
| 0 |  | 8.29100 |  | 8.29100 |  |
| 1 | −4.26577 | 0.80000 | 1.53921 | 0.80000 | 1.53587 |
| 2 | −3.48388 | 8.52546 | 1.0 | 8.89806 | 1.0 |
| 3 | 1.49581 | 1.50000 | 1.53921 | 1.50000 | 1.53587 |
| 3' | 1.75416 | 1.51419 | 1.53921 | 1.51419 | 1.53587 |
| 4 | −3.88785 | 1.28150 | 1.0 | 0.90895 | 1.0 |
| 5 | ∞ | 0.6 | 1.57653 | 1.2 | 1.57047 |
| 6 | ∞ |  |  |  |  |

Aspheric surface data

Second surface

| Aspheric surface coefficient | $\kappa$ = −1.0865 × E−1 | | |
|---|---|---|---|
| Third surface 63 ($0 \leq h \leq 1.160$ mm: DVD/CD common area) | | | |
| Aspheric surface coefficient | $\kappa$ = −5.0435 × E−1 | | |
| | A1 = −1.3149 × E−2 | P1 | 4.0 |
| | A2 = −1.3416 × E−3 | P2 | 6.0 |
| | A3 = −6.5969 × E−4 | P3 | 8.0 |
| | A4 = −8.3527 × E−4 | P4 | 10.0 |
| | A5 = +5.6237 × E−4 | P5 | 12.0 |
| | A6 = −1.4458 × E−4 | P6 | 14.0 |
| Optical path difference function (Coefficient of optical path difference function: Standard wavelength 1.0 mm) | C4 = −7.9254 × E−0 | | |
| | A6 = +5.0701 × E−1 | | |
| | A8 = −7.6729 × E−1 | | |
| | A10 = +1.7882 × E−1 | | |

TABLE 1-1-continued

| ($3'$)$^{th}$ surface (1.160 mm < h: DVD exclusive area) | | | |
|---|---|---|---|
| Aspheric surface coefficient | $\kappa$ = −4.8398 × E−1 | | |
| | A1 = +3.8936 × E−2 | P1 | 4.0 |
| | A2 = −1.3304 × E−2 | P2 | 6.0 |
| | A3 = −1.8461 × E−3 | P3 | 8.0 |
| | A4 = +5.5374 × E−4 | P4 | 10.0 |
| | A5 = +6.3164 × E−4 | P5 | 12.0 |
| | A6 = −2.1371 × E−4 | P6 | 14.0 |
| Optical path difference function (Coefficient of optical path difference function: Standard wavelength 1.0 mm) | C2 = −3.4110 × E+0 | | |
| | C4 = +9.5563 × E−1 | | |
| | A6 = −8.9185 × E−1 | | |
| | A8 = −2.0852 × E−2 | | |
| | A10 = +5.0103 × E−2 | | |

Fourth surface

| Aspheric surface coefficient | $\kappa$ = −1.6446 × E+1 | | |
|---|---|---|---|
| | A1 = +1.9964 × E−2 | P1 | 4.0 |
| | A2 = −1.2869 × E−2 | P2 | 6.0 |
| | A3 = +5.2796 × E−3 | P3 | 8.0 |
| | A4 = −1.2551 × E−3 | P4 | 10.0 |
| | A5 = −1.6610 × E−4 | P5 | 12.0 |
| | A6 = +6.1668 × E−5 | P6 | 14.0 |

EXAMPLE 1-2

Example 1-2 described below is also one relating to the objective lens that can be applied to the embodiment stated above. Table 1-2 shows lens data relating to the objective lens of Example 1-2.

TABLE 1-2

| $f_1$ = 1.65 mm | $f_2$ = 1.66 mm | $M_1$ = −0.1665 | $M_2$ = −0.1684 |
| NA1: 0.65 | NA2: 0.50 | $m_1$ = −0.05 | $m_2$ = −0.05 |

| $i^{th}$ surface | Ri | di (660 mm) | ni (660 nm) | di (785 nm) | ni (785 nm) |
|---|---|---|---|---|---|
| 0 |  | 7.67878 |  | 7.67878 |  |
| 1 | −20.64788 | 1.50000 | 1.54076 | 1.50000 | 1.53716 |
| 2 | −5.31143 | 5.00000 | 1.0 | 4.77290 | 1.0 |
| 3 | 1.12823 | 1.07000 | 1.53938 | 1.07000 | 1.53596 |
| 3' | 1.07437 | 1.07136 | 1.53938 | 1.07136 | 1.53716 |
| 4 | −3.37604 | 0.77652 | 1.0 | 0.40360 | 1.0 |
| 5 | ∞ | 0.6 | 1.57718 | 1.2 | 1.57063 |
| 6 | ∞ |  |  |  |  |

Aspheric surface data

Second surface

| Aspheric surface coefficient | $\kappa$ = −2.21766 × E−1 | | |
|---|---|---|---|
| Third surface ($0 \leq h \leq 0.8774$ mm: DVD/CD common area) | | | |
| Aspheric surface coefficient | $\kappa$ = −7.1436 × E−1 | | |
| | A1 = −1.3733 × E−2 | P1 | 4.0 |
| | A2 = −1.1346 × E−3 | P2 | 6.0 |
| | A3 = −9.9466 × E−3 | P3 | 8.0 |
| | A4 = −3.3590 × E−3 | P4 | 10.0 |
| | A5 = +1.2870 × E−2 | P5 | 12.0 |
| | A6 = −7.5424 × E−3 | P6 | 14.0 |
| Optical path difference function (Coefficient of optical path difference function: Standard wavelength 1.0 mm) | C4 = −2.5175 × E+1 | | |
| | A6 = −3.2573 × E+0 | | |
| | A8 = −5.1432 × E+0 | | |
| | A10 = +2.3869 × E+0 | | |

TABLE 1-2-continued (3')th surface (0.8774 mm < h: DVD exclusive area)

| | | |
|---|---|---|
| Aspheric surface coefficient | κ = −5.8942 × E−1 | |
| | A1 = +4.4167 × E−3 | P1 4.0 |
| | A2 = +1.9906 × E−3 | P2 6.0 |
| | A3 = −6.9650 × E−3 | P3 8.0 |
| | A4 = −7.4018 × E−4 | P4 10.0 |
| | A5 = +6.1321 × E−3 | P5 12.0 |
| | A6 = −4.2362 × E−3 | P6 14.0 |
| Optical path difference function (Coefficient of optical path difference function: Standard wavelength 1.0 mm) | C2 = −1.9480 × E+1 | |
| | C4 = +9.3550 × E+0 | |
| | A6 = +1.4926 × E+1 | |
| | A8 = −1.6118 × E+1 | |
| | A10 = +4.5614 × E+0 | |

Fourth surface

| | | |
|---|---|---|
| Aspheric surface coefficient | κ = +4.6282 × E+0 | |
| | A1 = +1.4280 × E−1 | P1 4.0 |
| | A2 = −1.2458 × E−1 | P2 6.0 |
| | A3 = +1.4186 × E−1 | P3 8.0 |
| | A4 = −1.2095 × E−1 | P4 10.0 |
| | A5 = +5.7591 × E−2 | P5 12.0 |
| | A6 = −1.1354 × E−2 | P6 14.0 |

According to the first embodiment, it is possible to provide an optical pickup device which has a compact construction and can conduct recording and/or reproducing of information properly for different optical information recording media, by using light sources each having a different wavelength, and to provide an objective optical element.

Second Embodiment

The optical pickup device described in Item (2-1) in the second embodiment is represented by optical pickup device 10 having therein a plurality of optical elements including an objective optical element (objective lens 40), and is capable of conducting reproducing and/or recording of various pieces of information by converging a first light flux with wavelength λ1 emitted from the first light source 11 by the use of an objective optical element on first optical information recording medium 20 with protective base board thickness t1 and by converging a second light flux with wavelength λ2 (λ1>λ2) emitted from the second light source 12 (t2≦t1) on second optical information recording medium 21 with protective base board thickness t2 (t2≧t1), wherein at least one of the optical elements is provided with at least two areas including central area A1 having its center on optical axis L and peripheral area A2 positioned around the central area on at least one optical surface 41, stairway-shaped discontinuous region 31 having the number of steps determined in advance is formed periodically on the central area, each stairway-shaped step portion 31a forms concentric circles having their centers on the optical axis, and there is provided phase modulation means 30 which converges, by giving a phase difference to at least either one of the first light flux with wavelength λ1 and the second light flux with wavelength λ2, the light flux on a prescribed optical information recording medium under the condition that spherical aberration and/or wave-front aberration is corrected by cooperation with the objective optical element, and the first light flux with wavelength λ1 and the second light flux with wavelength λ2 enter the objective optical element as divergent light.

The discontinuous region means the structure that is composed of continuous stairway-shaped steps portion along the optical axis direction when its section is viewed on a plane (meridional section) including an optical axis, and has a function to diffract the light flux by giving a phase difference to a prescribed light flux entering the discontinuous region.

A phase modulation means has only to be provided on at least one of plural optical elements constituting an optical system of the optical pickup device.

The phase modulation means has only to be provided on at least one of one or plural optical surfaces provided on one optical element.

Therefore, for example, the phase modulation means may either be formed on an optical surface on the light source side or on an optical surface on the optical information recording medium side of the objective lens representing an optical element, or be formed further on plural optical surfaces of the optical element constituting the optical pickup device, such as forming the phase modulation means on both optical surfaces.

It is assumed that phase difference φ in the present specification is in a range of $0 \leq \phi < 2\pi$ or in a range of $-\pi < \phi \leq \pi$.

From the optical surface on which the phase modulation means is formed, there are generated diffracted rays of light in innumerable order numbers including $0^{th}$ diffracted light, ± primary order diffracted light, ± secondary order diffracted light, . . . , and by changing a shape of the discontinuous region, it is possible to make diffraction efficiency of the specific order number to be higher than that of the other order number, or in some cases, to make diffraction efficiency of the specific order number (for example, + primary diffracted light) to be 100% substantially.

Incidentally, the diffraction efficiency is one to indicate a ratio of an amount of light of the diffracted light generated on the discontinuous region, and the sum of diffraction efficiency of total order numbers is 1.

In the optical pickup device described in Item (2-1), even when the light flux with first wavelength λ1 and the light flux with the second wavelength λ2 enter the objective optical element as divergent light, the phase modulation means equipped with the stairway-shaped discontinuous region gives a phase difference to at least either one of the light flux with the first wavelength λ1 and the light flux with the second wavelength λ2, and this light flux is converged on a prescribed optical information recording medium by the cooperation with the objective optical element, under the condition that spherical aberration and/or wave-front aberration is corrected.

Therefore, an optical element such as a collimator lens which has been used in a conventional infinite type optical pickup device to collimate a light flux emitted from the light source into parallel light so that the light flux may enter the objective optical element, turns out to be unnecessary, and downsizing and low cost of the device can be attained.

At least one optical surface of at least one optical element is divided into at least two areas including a central area whose center is on an optical axis and a peripheral area positioned around the central area, and at least one of the two types of light fluxes having respectively wavelength λ1 and wavelength λ2 each passing through the divided each area is given a phase difference by the phase modulation means as occasion demands, thus, the light flux emerges to a prescribed information recording medium as diffracted light, under the condition that aberration is corrected.

It is therefore possible to increase the degree of freedom of aberration correction. It is further possible to control occurrence of coma and astigmatism in the course of tracking and to control occurrence of spherical aberration caused by temperature changes.

The optical pickup device described in Item (2-2) is an optical pickup device described in Item (2-1) wherein a cycle that forms the discontinuous region is expressed by an integer portion of $\phi$ (h)/$2\pi$ when it is expressed by phase function $\phi$ (h) defined by $\phi$ (h)=$(B_2h^2+B_4h^4+B_6h^6+\ldots B_nh^n)\times 2\pi$ by using h representing a height from an optical axis and Bn representing a coefficient of an optical path difference function of $n^{th}$ order (n is an even number), and $0\leq|\phi(h_{in})/2\pi-B_2(h_{in})^2|\leq 10$ holds when $B_2$ represents a coefficient of secondary optical path difference function and $h_{in}$ represents a height of the position farthest from the optical axis of the central area.

In the optical pickup device described in Item (2-2), the same effects as those in Item (2-1) can be obtained, and it is possible to restrict the number of discontinuous regions provided on the phase modulation means to be a certain number or less, and therefore, an amount of divergent light entering from the portion other than a surface (optical functional surface) of the step portion among divergent light entering the discontinuous regions can be controlled, which prevents a decline of an amount of light.

The optical pickup device described in Item (2-3) is the optical pickup device described in Item (2-2) wherein $|B_2(h_{in})^2|\leq 18$ holds.

In the optical pickup device described in Item (2-3), the same effects as those in Item (2-2) can be obtained.

The optical pickup device described in Item (2-4) is the optical pickup device described in either one of Items (2-1)-(2-3) wherein a light flux passing through the central area among the second light flux with wavelength $\lambda 2$ is converged on an information recording surface of the second optical information recording medium, and a light flux passing through the peripheral area is converged on an information recording surface of the second optical information recording medium.

In the optical pickup device described in Item (2-4), the same effects as those in either one of Items (2-1)-(2-3) can be obtained, and a second light flux with wavelength $\lambda 2$ passing through the peripheral area can be converged on a portion outside the information recording surface of the second optical information recording medium, and for example, a numerical aperture can be regulated without using a member such as an aperture regulating filter when conducting, reproducing and/or recording of information for CD as an information recording medium, thus, the number of parts of the optical pickup device can be reduced.

The optical pickup device described in Item (2-5) is the optical pickup device described in either one of Item (2-1)-(2-4) wherein a refracting structure 60 that refracts a light flux into the peripheral area is provided.

In the optical pickup device described in Item (2-5), the same effects as those in either one of Items (2-1)-(2-4) can be obtained, and an optical element equipped with a phase modulation means can be manufactured more easily, compared with one that is totally a stairway-shaped discontinuous surface or one that is in a diffraction blazed shape, because the peripheral area is provided with a refracting structure whose construction is relatively simple.

The optical pickup device described in Item (2-6) is the optical pickup device described in either one of Items (2-1)-(2-4) wherein a phase modulation means that is the same as the phase modulation means formed on the central area is provided on the peripheral area.

In the optical pickup device described in Item (2-6), the same effects as those in either one of Items (2-1)-(2-4) can be obtained, and it is possible to correct more properly spherical aberration that is caused by wavelength changes using diffracted light and by temperature changes compared with one wherein a phase modulation means is provided only on the central area, because the phase modulation is formed on both of the peripheral area and the central area.

The optical pickup device described in Item (2-7) is the optical pickup device described in Item (2-6) wherein the number of steps of discontinuous regions provided on the phase modulation means on the peripheral area is less than that of discontinuous regions on the central area In the optical pickup device described in Item (2-7), the same effects as those in Item (2-6) can be obtained, and the total number of steps formed on the optical element can be reduced by reducing the number of steps of discontinuous regions provided on the phase modulation means on the peripheral area as far as possible, which makes manufacturing easy.

The optical pickup device described in Item (2-8) is the optical pickup device described in either one of Items (2-1)-(2-4) wherein serrated ring-shaped zones 50 are provided on the peripheral area.

The optical pickup device described in Item (2-9) is the optical pickup device described in either one of Items (2-1)-(2-4) wherein the peripheral area is provided with discontinuous surfaces which are formed by moving a prescribed aspheric surface shape in a form of stairs in parallel with the direction of an optical axis.

The optical pickup device described in Item (2-10) is the optical pickup device described in either one of Items (2-1)-(2-9) wherein the number of steps of at least one discontinuous region among discontinuous regions provided on the phase modulation means on the central area is 4.

The optical pickup device described in Item (2-11) is the optical pickup device described in either one of Items (2-1)-(2-10) wherein the number of steps of at least one discontinuous region among discontinuous regions provided on the phase modulation means on the central area is 5.

The optical pickup device described in Item (2-12) is the optical pickup device described in either one of Items (2-1)-(2-11) wherein the first $\lambda 1$ satisfies 620 nm$\leq\lambda 1\leq$680 nm and the second $\lambda 2$ satisfies 750 nm$\leq\lambda\leq$810 nm.

The optical pickup device described in Item (2-13) is the optical pickup device described in either one of Items (2-1)-(2-12) wherein the phase modulation means is formed on the optical element other than the objective optical element mentioned above.

The optical pickup device described in Item (2-14) is the optical pickup device described in either one of Items (2-1)-(2-12) wherein the phase modulation means is formed on the objective optical element mentioned above.

The optical pickup device described in Item (2-15) is the optical pickup device described in either one of Items (2-1)-(2-14) wherein image forming magnification m of the optical system satisfies $-0.149\leq m\leq -0.049$.

In the optical pickup device described in Item (2-16), the same effects as those in either one of Items (2-1)-(2-14) can be obtained, and a coupling lens turns out to be unnecessary, resulting in reduction of the number of parts of the optical pickup device.

Incidentally, it is more preferable to make the image forming magnification m to be within a range of $-0.147\leq m\leq -0.099$.

The optical pickup device described in Item (2-16) is the optical pickup device described in either one of Items (2-1)-(2-15) wherein the phase modulation means on the central area does not give a phase difference to the light flux with first wavelength $\lambda 1$, or an absolute value of a phase difference given by a depth equivalent to one step of each step of the discontinuous regions is made to be within a range smaller than $0.2\pi$ radian.

In the optical pickup device described in Item (2-16), the same effects as those in either one of Items (2-1)-(2-15) can be obtained, and diffraction efficiency of each of light flux with wavelength λ1 and light flux with wavelength λ2 can be changed by giving a phase difference within a range smaller than 0.2π radian, and a more preferable amount of light can be used for conducting recording and/or reproducing of each information for each optical information recording medium.

The optical pickup device described in Item (2-17) is the optical pickup device described in either one of Items (2-1)-(2-16) wherein the phase modulation means on the central area does not give a phase difference to the light flux with second wavelength λ2, or an absolute value of a phase difference given by a depth equivalent to one step of each step of the discontinuous regions is made to be within a range smaller than 0.2π radian.

In the optical pickup device described in Item (2-17), the same effects as those in either one of Items. (2-1)-(2-16) can be obtained.

The optical pickup device described in Item (2-18) is the optical pickup device described in either one of Items (2-1)-(2-17) wherein the number of discontinuous regions provided on the phase modulation means on the central area is within a range of 3-18.

The optical pickup device described in Item (2-19) is the optical pickup device described in either one of Items (2-1)-(2-18) wherein phase modulation means are formed on a plurality of optical surfaces of one optical element.

The optical pickup device described in Item (2-20) is the optical pickup device described in either one of Items (2-1)-(2-19) wherein $-3.2 < R2/R1 < -1.9$ holds when R1 represents a paraxial radius of curvature of the optical surface of the objective optical element closer to the light source and R2 represents a paraxial radius of curvature on the optical information recording medium side.

The objeive optical element described in Item (2-21) is represented by an objective optical element of the optical pickup device which has therein a plurality of optical elements and conducts reproducing and/or recording of various pieces of information by converging a light flux with first wavelength λ1 emitted from the first light source on a first optical information recording medium of protective base board t1 thickness and by converging a light flux with second wavelength λ2 (λ2>λ1) emitted from the second light source on a second optical information recording medium of protective base board thickness t2 (t2≧t1), wherein at least one of the optical elements is provided with at least two areas including central area having its center on optical axis and peripheral area positioned around the central area are provided on at least one optical surface, stairway-shaped discontinuous regions having the number of steps determined in advance are formed periodically on the central area, and each stairway-shaped step portion forms concentric circles having their centers on the optical axis, thus, there is provided a phase modulation means which converges the aforesaid light flux on a prescribed optical information recording medium under the condition that spherical aberration and/or wave-front aberration is corrected by cooperation with the objective optical element by giving a phase difference to at least either one of the first light flux with wavelength λ1 and the second light flux with wavelength λ2, and the first light flux with wavelength λ1 and the second light flux with wavelength λ2 enter as divergent light.

In the objective optical element described in Item (2-21), even when the light flux with first wavelength λ1 and the light flux with second wavelength λ2 enter the objective optical element as divergent light, the phase modulation means equipped with stairway-shaped discontinuous regions gives a phase difference to either one of the light flux with first wavelength λ1 and the light flux with second wavelength λ2 to converge the light flux on the prescribed optical information recording medium under the condition that spherical aberration and/or wave-front aberration is corrected by cooperation with the objective optical element.

Therefore, an optical element such as a collimator lens which has been used in a conventional infinite type optical pickup device to collimate a light flux emitted from the light source into parallel light so that the light flux may enter the objective optical element, turns out to be unnecessary, and downsizing and low cost of the device can be attained.

At least one optical surface of, the objective optical element is divided into at least two areas including a central area whose center is on an optical axis and a peripheral area positioned around the central area, and at least one of the two types of light fluxes having respectively wavelength λ1 and wavelength λ2 each passing through the divided each area is given a phase difference by the phase modulation means as occasion demands, thus, the light flux emerges to a prescribed information recording medium as diffracted light, under the condition that aberration is corrected.

It is therefore possible to increase the degree of freedom of aberration correction. It is further possible to control occurrence of coma and astigmatism in the course of tracking and to control occurrence of spherical aberration caused by temperature changes.

The second embodiment of the objective optical element and the optical pickup device of the invention will be explained as follows, referring to the drawings.

Figure 3:
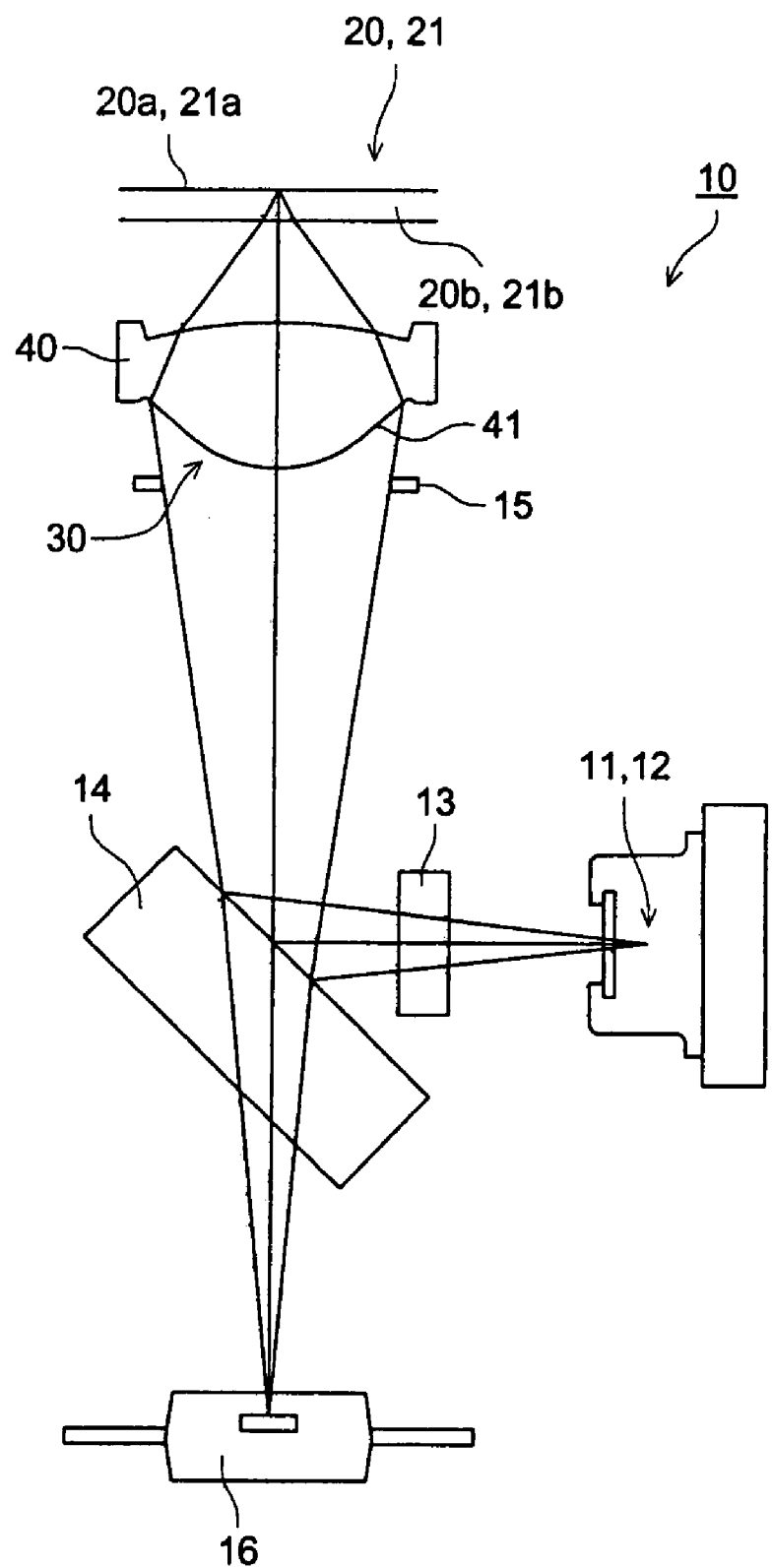
FIG. 3 is a schematic diagram showing an example of an optical pickup device relating to the second embodiment.

As shown in FIG. 3, optical pickup device 10 emits a light flux with wavelength λ1 (=650 nm) to the first optical information recording medium 20 (DVD in the present embodiment) from first semiconductor laser 11 (light source) and emits a light flux with wavelength λ2 (=780 nm) to the second optical information recording medium 21 (CD in the present embodiment) from second semiconductor laser 12 (light source). Then, the optical pickup device 10 makes these light fluxes to enter objective lens 40 (objective optical element) representing an optical element provided with phase modulation means 30 as divergent light to converge them respectively on information recording surfaces 20a and 21a on the prescribed optical information recording media, and thereby to conduct recording of various pieces of information and reading of recorded information.

Figure 4:
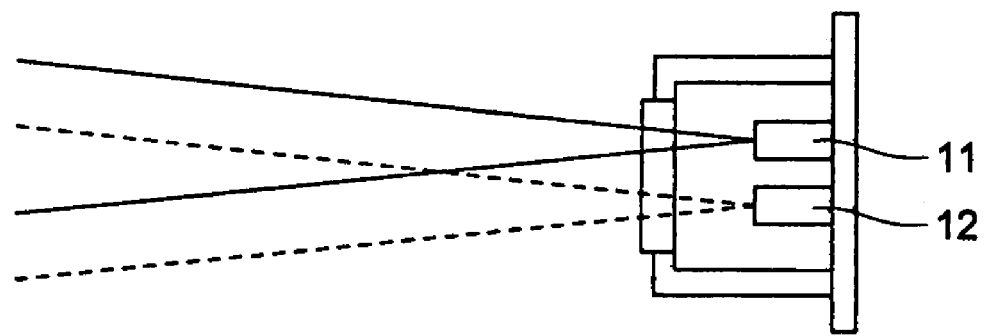
FIG. 4 is an enlarged view of a primary portion showing the structure of a light source.

Incidentally, since the first semiconductor laser 11 and the second semiconductor laser 12 are unitized as a light source as shown in FIG. 4, a light flux with wavelength λ1 and a light flux with wavelength λ2 emitted respectively from respective semiconductor lasers are shown with solid lines collectively in FIG. 3.

When recording or reproducing information for DVD, a light flux with wavelength λ1 emitted from the first semiconductor laser 11 passes through diffraction grating 13 and is reflected by half mirror 14. Further, it is stopped down by diaphragm 15 and is converged on information recording surface 20a through protective base board 20b of DVD by objective lens 40.

Actions of the objective lens 40 on the light flux with wavelength λ1 in this case will be described later.

Then, the light flux modulated by information pits and reflected on the information recording surface 20a passes through objective lens 40, diaphragm 15, half mirror 14 and diffraction grating (not shown) to enter photodetector 16, and signals outputted from the photodetector 16 are used to obtain signals to read information recorded on DVD.

Even when recording or reproducing information for CD, a light flux with wavelength λ2 emitted from the second semiconductor laser 12 passes through diffraction grating 13 and is reflected by half mirror 14. Further, it is stopped down by diaphragm 15 and is converged on information recording surface 21a through protective base board 21b of CD by objective lens 40. Incidentally, protective base board 21b of CD and protective base board 20b of DVD are shown with the same diagram for convenience in FIG. 3.

Actions of the objective lens 40 on the light flux with wavelength λ2 in this case will be described later.

Then, the light flux modulated by information pits and reflected on the information recording surface 21a passes through objective lens 40, diaphragm 15, half mirror 14 and diffraction grating (not shown) to enter photodetector 16, and signals outputted from the photodetector 16 are used to obtain signals to read information recorded on CD.

Further, changes in an amount of light caused by changes of a form and changes of a position of a spot on photodetector 16 are detected for focusing detection and, track detection. Based on results of the detection, an unillustrated two-dimensional actuator moves objective lens, 40 so that a light flux emitted from the first semiconductor laser 11 or a light flux emitted from the second semiconductor laser may form an image on information recording surface 20a of DVD or on information recording surface 21a of CD, and moves objective lens 40 so that an image may be formed on a prescribed track.

Figure 5:
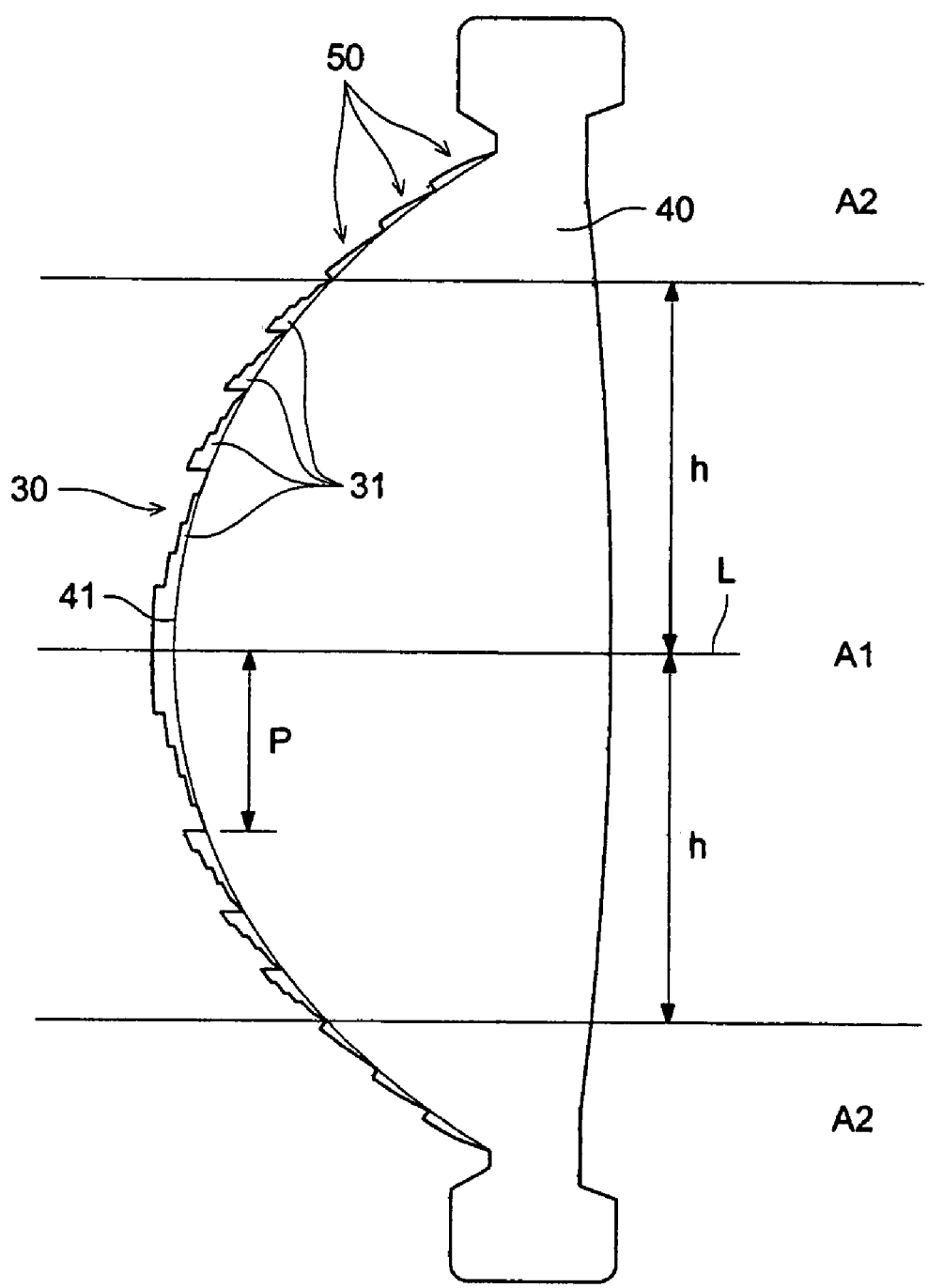
FIG. 5 is a side view of a primary portion showing the structure of an objective lens.

As shown in FIG. 5, objective lens 40 representing an objective optical element is a two-sided aspheric surface single lens constituting an optical system of optical pickup device 10. On optical surface 41 on one side (closer to the light source) of the objective lens 40, phase modulation means 30 is provided in a range of a certain height h or less whose center is on optical axis L (hereinafter referred to as "central area A1") and serrated diffracting ring-shaped zones 50 are provided in a range other than the central area A1 (hereinafter referred to as "peripheral area A2").

To be concrete, discontinuous regions 31 composed of stairway-shaped step portions 31a which are in parallel with, direction of optical axis L are formed in a shape of concentric circles having centers on optical axis L at prescribed cycle P, as phase modulation means 30 on the central area A1.

Figure 6A:
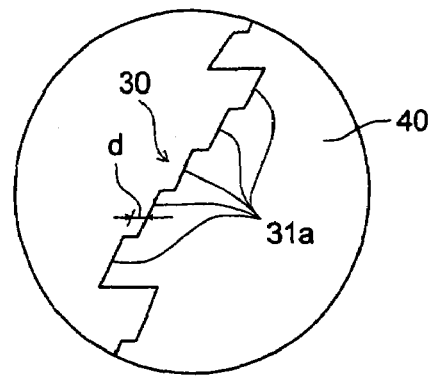
FIGS. 6(a) to 6(c) each shows enlarged views of primary portions showing discontinuous regions.

As shown in FIG. 6(A), each discontinuous region 31, is composed of five stairway-shaped step portions 31a which are in parallel with the direction of optical axis. Incidentally, it is preferable that the number of step portions 31a constituting one discontinuous region 31 is 5 or 6 (the number of steps of the discontinuous region is 4 or 5), but it may be within a range from 4 to 7. Further, each discontinuous region 31 may also be composed of step portions 31a having different number of steps within the aforementioned range (from 4 to 7).

In the present embodiment, four discontinuous regions 31 of phase modulation means 30 are formed at prescribed cycle P in a form of concentric circles each having a center on optical axis L, as shown in FIG. 5.

The prescribed cycle P is expressed by an integer portion of φ (h)/2π which is a value obtained by dividing phase function φ (h) expressed by Numeral 3 by the use of h representing a height from optical axis L and Bn representing a coefficient of an optical path difference function of $n^{th}$ order (n is an even number) with 2π.

$$\phi(h) = \left( \sum_{i=0}^{n} B_{2i} h^{2i} \right) \times 2\pi \quad \text{(Numeral 3)}$$

In this case, it is preferable that the following condition is satisfied when $B_2$ represents a coefficient of the secondary optical path difference function and $h_{in}$ represents a height of a position of the central area A1 farthest from optical axis L.

$$0 \leq |\phi(h_{in})/2\pi - B_2(h_{in})^2| \leq 10$$

Further, it is preferable to satisfy the condition of $|B_2(h_{in})^2| \leq 18$.

By prescribing the prescribed cycle P of discontinuous regions 31 so that the aforementioned conditions are satisfied, it is possible to control the number of the discontinuous regions 31 within a certain limit and thereby to make processing of objective lens 40 to be easy, and it is possible to prevent a decline of an amount of light by controlling a rate of an amount of divergent light entering from a portion (for example, a side) other than a surface (optical functional surface) of stairway-shaped step portion 31a among divergent light entering discontinuous regions 31 to the total amount of light.

Further, each discontinuous region 31 is provided with a shape that does not give a phase difference to a light flux with first wavelength λ1 passing through central area A1 but gives a phase difference only to a light flux with wavelength λ2 passing through central area A1.

Incidentally, it is possible to adjust an amount of phase difference to be given for the first wavelength λ1 and the second wavelength λ2 by adjusting a distance between stairway-shaped step portions 31a constituting discontinuous region 31, namely, by adjusting depth d (see FIG. 6(a)) for one step of stairway-shaped step portion 31a. Therefore, depth d for one step of step portion 31a may also be adjusted so that an absolute value of a phase difference given to the light flux with first wavelength λ1 may become smaller than 0.2πradian.

Incidentally, a method to design discontinuous region 31 satisfying the aforementioned conditions has been known, and an explanation of the method will be omitted accordingly.

On the peripheral area A2, there are formed a plurality of serrated diffracting ring-shaped zones 50 each having a center on optical axis L.

This diffracting ring-shaped zone 50 is also equipped with a form that does not diffract a light flux with first wavelength λ1 that passes through peripheral area A2, but diffracts only a light flux with wavelength λ2 that passes through peripheral area A2.

Next, actions of the objective lens 40 for the light flux with wavelength λ1 and the light flux with wavelength λ2 will be explained.

First, when divergent light with wavelength λ1 enters peripheral area A2 and central area A1 of the objective lens 40, the light flux with wavelength λ1 passing through peripheral area A2 is not diffracted by diffracting ring-shaped zones 50, but is refracted by a shape of aspheric surface of the objective lens 40. The light flux with wavelength λ1 passing through central area A1 is refracted by a shape of aspheric surface of the objective lens 40 because it is not given a phase difference by phase modulation means 30 as in the foregoing. Then, the light flux with wavelength λ1 that has entered peripheral area A2 and the light flux with wavelength λ1 that has entered central area A1 are converged respectively on image recording surface 20a of DVD.

On the other hand, when divergent light with wavelength λ2 enters peripheral area A2 and central area A1 of objective lens 40, a light flux with wavelength λ2 passing through peripheral area A2 is diffracted by diffracting ring-shaped zones 50, and a light flux with wavelength λ2 passing through central area A1 is diffracted when a prescribed phase difference is given by phase modulation means 30.

Then, a light flux with wavelength λ2 passing through peripheral area A2 is converged by diffracting ring-shaped zones 50 on a portion outside information recording surface 21a of CD, and a light flux with wavelength λ2 passing through central area A1 only is converged on information recording surface 21a of CD under the condition that spherical aberration is corrected by cooperation of diffracting actions of phase modulation means 30 and refracting actions of objective lens 40.

Incidentally, in the explanation stated above, phase modulation means 30 does not give a phase difference to a light flux with wavelength λ1 but gives a phase difference to a light flux with wavelength λ2. However, the invention is not limited to this, and it can also employ one wherein a phase difference is not given to a light flux with wavelength λ2 but phase difference is given to a light flux with wavelength λ1.

The structure of peripheral area A2 on objective lens 40 has only to be one wherein divergent light with wavelength λ1 is converged correctly on information recording surface 20a of DVD and divergent light with wavelength λ2 is converged on the outside of information recording surface 21a of CD.

Therefore, for example, phase modulation means 30 that is the same as one formed in central area A1 may be formed on peripheral area A2. In this case, it is assumed that the phase modulation means 30 formed on peripheral area A2 does not give a phase difference to divergent light with wavelength λ1 but it gives a phase difference to divergent light with wavelength λ2 to be diffracted.

In this case, it is preferable that the number of step portions 31a of discontinuous region 31 provided on phase modulation means 30 of peripheral area A2 is smaller than the number of step portions 31a of discontinuous region 31 provided on phase modulation means 30 of central area A1. It is further preferable that the number of discontinuous regions 31 provided on phase modulation means 30 of central area A1 is within a range from 3 to 18.

In general, when the number of discontinuous regions 31 is increased, the number of step portions 31a is increased and diffraction efficiency is improved. However, it is not necessary to improve diffraction efficiency because a light flux with wavelength λ2 passing through peripheral area A2 is not used for reproducing and/or recording of information, and it is possible to control manufacturing cost of objective lens 40 by limiting the number of step portions 31a of discontinuous region 31 to the aforementioned range.

Further, the structure of peripheral area A2 may be a structure which is composed of discontinuous surface obtained by moving a prescribed aspheric surface shape in parallel along the direction of optical axis L in a form of stairway, and diffracts a light flux by giving a prescribed optical path difference to the light flux passing through the discontinuous surface.

Further, the structure of peripheral area A2 may also be one having a refracting function achieved by an aspheric surface shape of objective lens 40.

EXAMPLE 2-1

Next, the first example of optical pickup device 10 shown in the aforesaid embodiment will be explained.

In the present example, phase modulation means 30 is provided on central area A1 whose height from optical axis L is not more than 1.38 mm on an optical surface on one side (closer to the light source) of objective lens 40 representing a two-sided aspheric surface single lens shown in FIG. 5, and serrated diffracting ring-shaped zones 50 are provided in a peripheral area A2.

To be concrete, plural discontinuous regions 31 composed of stairway-shaped step portions 31a which are in parallel with direction of optical axis L are formed in a shape of concentric circles having centers on optical axis L at prescribed cycle P, as phase modulation means 30 on the central area A1.

Incidentally, FIG. 5 is a schematic diagram of objective lens 40 used in the present example. Therefore, on objective lens 40 in FIG. 5, four discontinuous regions 31 are formed on central area A1, but twelve discontinuous regions 31a re formed on the objective lens used actually in the present example.

Further, each of discontinuous regions 31 is composed of five step portions 31a, and as shown in FIG. 6(A), the step portions 31a are arranged so that each of the step portions 31a is projected forward as it approaches the optical axis L.

Further, phase modulation means 30 is provided with the structure that converges a light flux with wavelength λ1 on image recording surface 20a of DVD by giving a phase difference of about 0.1π radian per one step of a discontinuous region to the light flux with wavelength λ1, and converges a light flux with wavelength λ2 on image recording surface 21a of CD by giving a prescribed phase difference to the light flux with wavelength λ2 and thereby by diffracting it.

Diffracting ring-shaped zone 50 has the structure that diffracts a light flux with wavelength λ1 and thereby converges it on image recording surface 20a of DVD and diffracts a light flux with wavelength λ2 and thereby converges it on image recording surface 21 of CD.

Lens data of objective lens 40 are shown on Table 2-1 and Table 2-2.

TABLE 2-1

| Example (2-1) | | | | |
|---|---|---|---|---|
| Focal length | $f_1$ = 2.45 mm | | $f_2$ = 2.52 mm | |
| Numerical aperture | NA1 = 0.60 | | NA2 = 0.47 | |
| Image forming magnification | m = −1/6.8 | | m = −1/6.7 | |

| $i^{th}$ surface | Ri | di (655 nm) | ni (655 nm) | di (785 nm) | ni (785 nm) |
|---|---|---|---|---|---|
| 0 | | 10.0 | | 10.0 | |
| 1 | ∞ | 1.25 | 1.51436 | 1.25 | 1.51108 |
| 2 | ∞ | 7.86011 | 1.0 | 8.12781 | 1.0 |
| 3 | 1.67496 | 1.75 | 1.52915 | 1.75 | 1.52541 |
| 3' | 1.70255 | 0.00294 | 1.52915 | 0.00294 | 1.52541 |
| 4 | −3.64079 | 1.53989 | 1.0 | 1.26219 | 1.0 |
| 5 | ∞ | 0.60 | 1.57752 | 1.20 | 1.57063 |
| 6 | ∞ | | | | |

* "di" shows a displacement from $i^{th}$ surface to $(i + 1)^{th}$ surface.
* "d3'" shows a displacement from a third surface to a $(3')^{th}$ surface.

As shown in Table 2-1, the objective lens 40 of the present example is established to have focal length $f_1$ of 2.45 mm, image side numerical aperture NA1 of 0.60 and image forming magnification m of −1/6.8 when the first wavelength λ1 emitted from the first light source 11 is 655 nm, and to have focal length $f_2$ of 2.52 mm, image side numerical aperture NA2 of 0.47 and image forming magnification m of −1/6.7 when the second wavelength λ2 emitted from the second light source 21 is 785 nm.

Surface numbers 1 and 2 in Table 2-1 show respectively a surface closer to a light source on diffraction grating 13 and a surface of the diffraction grating 13 closer to the optical information recording medium, surface numbers 3, 3' and 4 are respectively central area A1 having height h from optical axis L among optical surfaces of objective lens 40 on the light source side, peripheral area A2 having a height from optical axis L of 1.38 mm or more and on optical surface of the objective lens 40 on the optical information recording medium side, and surface numbers 5 and 6 are respectively surfaces of protective base boards 20b and 21b of the optical information recording media and information recording surfaces 20a and 21a. Further, Ri represents a radius of curvature, di represents an amount of displacement in the direction of optical axis L from $i^{th}$ surface to $(i+1)^{th}$ surface, and ni represents a refractive index of each surface.

Each of surface numbers 3, 3' and 4 of the objective lens is formed to be an aspheric surface which is prescribed by the expression wherein coefficients shown in Table 2-1 and Table 2-2 are substituted in the following expression (Numeral 4) and is on an axial symmetry basis on optical axis L.

$$X(h) = \frac{(h^2/R_i)}{1+\sqrt{1-(1+\kappa)(h/R_1)^2}} + \sum_{i=0}^{B} A_{2i}h^{2i} \quad \text{(Numeral 4)}$$

In the expression above, X (h) represents an axis in the direction of optical axis L (direction of advancement of light is positive in terms of a sign), κ represents a constant of the cone and $A_{2i}$ represents a coefficient of aspheric surface.

TABLE 2-2

Aspheric surface data

| Third surface (0 ≦ h < 1.38 mm) | |
|---|---|
| Coefficient of aspheric surface | κ = −8.1403E−01 |
| | A4 = +3.2437E−03 |
| | A6 = −3.4518E−03 |
| | A8 = +5.1774E−03 |
| | A10 = −3.7006E−03 |
| | A12 = +1.3482E−03 |
| | A14 = −2.0334E−04 |
| Coefficient of optical path difference function | B2 = +7.5508E+00 |
| | B4 = −7.1441E−01 |
| | B6 = +7.9208E−02 |
| | B8 = −7.1571E−02 |
| | B10 = +1.8106E−02 |
| (3')$^{th}$ surface (1.38 mm ≦ h) | |
| Coefficient of aspheric surface | κ = −8.1000E−01 |
| | A4 = +4.4764E−03 |
| | A6 = −2.7908E−04 |
| | A8 = +2.0702E−04 |
| | A10 = −1.7861E−04 |
| | A12 = +7.4388E−05 |
| | A14 = −2.4519E−05 |
| Coefficient of optical path difference function | B2 = −8.4641E−03 |
| | B4 = −6.6051E−01 |
| | B6 = +3.4445E−01 |
| | B8 = +2.5278E−02 |
| | B10 = +4.7696E−02 |
| Fourth surface | |
| Coefficient of aspheric surface | κ = −1.1984E+01 |
| | A4 = +5.6688E−03 |
| | A6 = +4.3010E−04 |
| | A8 = −3.2242E−04 |
| | A10 = −3.1994E−04 |
| | A12 = +7.6388E−05 |
| | A14 = −5.4308E−06 |

As stated above, prescribed cycle P of discontinuous region 31 is expressed by an integer portion of the value φ (h)/2π that is obtained by dividing optical path difference function φ (h) shown in Numeral 1 in which coefficients shown in Table 2 are substituted with λ.

In the optical pickup device and the objective lens shown in the present example, there is provided the structure wherein the phase modulation means gives a phase difference of about 0.1π per one step to the light flux with wavelength λ1, and gives a prescribed phase difference to the light flux with wavelength λ2. Therefore, with respect to light fluxes respectively having wavelength λ1 and wavelength λ2 which pass through the central area, it was possible to converge them at diffraction efficiency of about 85% respectively for DVD and CD.

Further, in the structure, the diffracting ring-shaped zones formed on the peripheral area were blazed for the light flux with wavelength λ1. Therefore, with respect to light flux with wavelength λ1, it was possible to converge it at diffraction efficiency of almost 100% for DVD.

Further, it has become possible to converge for DVD and CD under the condition that spherical aberration caused by wavelength changes has been corrected properly, because diffracted light of a light flux with wavelength λ1 and a light flux with wavelength λ2 passing through the central area and the peripheral area can be utilized.

EXAMPLE 2-2

Figure 7:
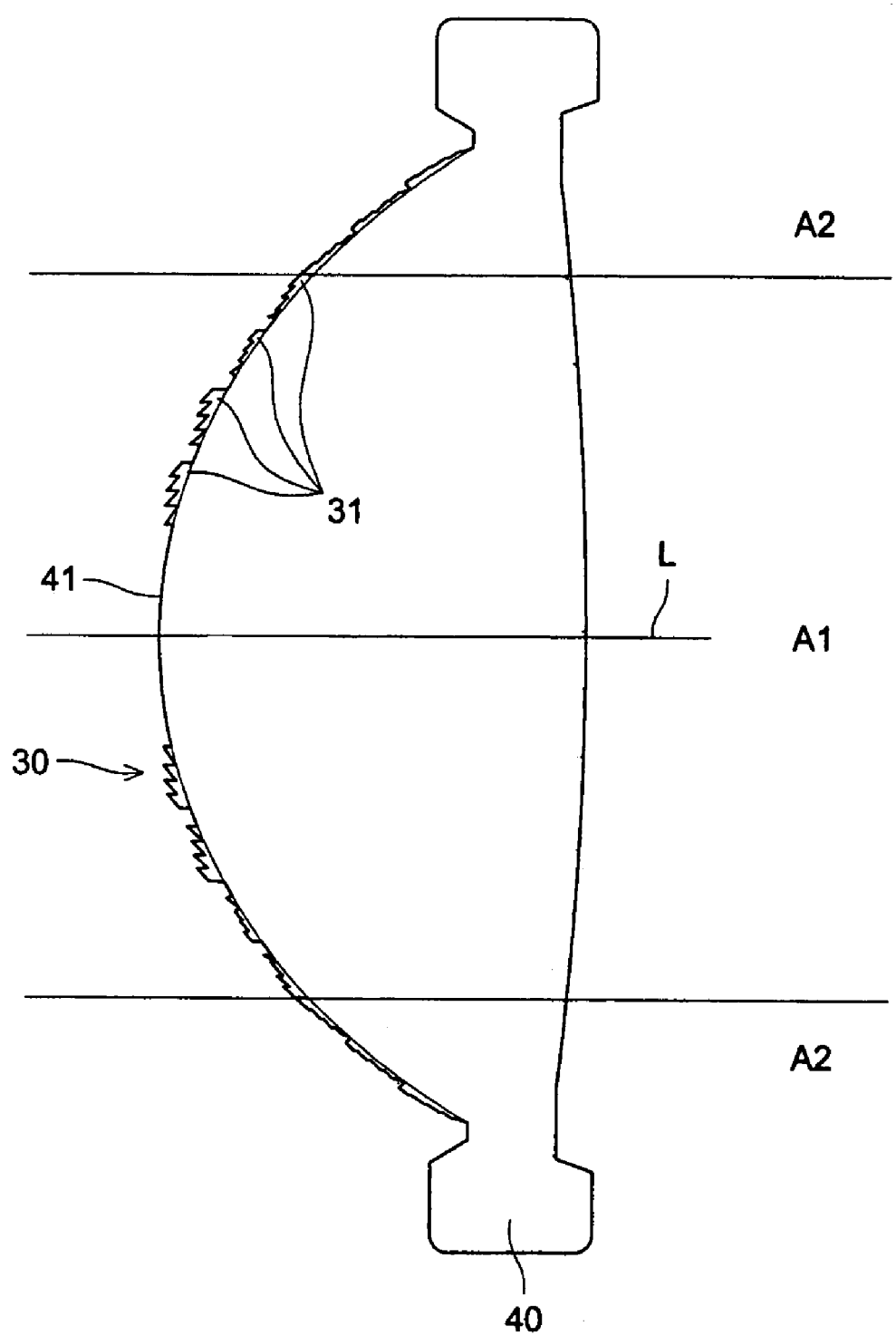
FIG. 7 is a side view of a primary portion showing the structure of an objective lens.

In the present example, as shown in FIG. 7, phase modulation means 30 is provided on central area A1 whose height from optical axis L is 1.38 mm or less and on peripheral area A2 both being on optical surface 41 on one side (light source side) of objective lens 40 representing a two-sided aspheric surface single lens.

To be concrete, plural discontinuous regions 31 composed of stairway-shaped step portions 31a which are in parallel with direction of optical axis L are formed in a shape of concentric circles having centers on optical axis L at prescribed cycle P, as phase modulation means 30 on the central area A1.

Incidentally, FIG. 7 is a schematic diagram of objective lens 40 used in the present example. Therefore, on objective lens 40 in FIG. 7, four discontinuous regions 31 are formed on central area A1, but four discontinuous regions 31 are formed on the objective lens used actually in the present example.

Figure 6B:
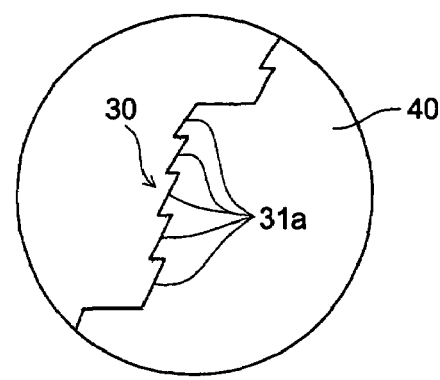

Further, each discontinuous region 31 is composed of five step portions 31a, and as shown in FIG. 6(B), they are arranged so that step portions 31a are projected forward as they become more distant from the optical axis L.

Further, even on the peripheral area A2, there are formed three discontinuous regions 31 composed of stairway-shaped step portions 31a which are in parallel with the direction of optical axis L, in a form of concentric circles having their centers on optical axis L at prescribed cycle P, as phase modulation means 30. Each discontinuous region 31 is composed of five step portions 31a, and as shown in FIG. 6(A), they are arranged so that step portions 31a are projected forward as they become closer to the optical axis L.

Phase modulation means 30 on the central area A1 is provided with the structure wherein a light flux with wavelength λ2 is converged on information recording surface 21a of CD without being given a phase difference, while, a light flux with wavelength λ1 is given a phase difference and thereby is converged on information recording surface 20a of DVD.

Further, phase modulation means 30 on the peripheral area A2 is provided with the structure wherein a light flux with wavelength λ2 is not diffracted and is converged on the outside of information recording surface 21a of CD and a light flux with wavelength $\lambda 1$ is given a phase difference and thereby is diffracted and converged on information recording surface 20a of DVD.

Lens data of the objective lens 40 are shown in Table 3 and Table 4.

TABLE 2-3

Example (2-2)

| Focal length | $f_1$ = 2.36 mm | | $f_2$ = 2.38 mm | |
|---|---|---|---|---|
| Numerical aperture | NA1 = 0.60 | | NA2 = 0.51 | |
| Image forming magnification | m = −1/8.0 | | m = −1/8.1 | |

| $i^{th}$ surface | Ri | di (655 nm) | ni (655 nm) | di (785 nm) | ni (785 nm) |
|---|---|---|---|---|---|
| 0 | | 10.0 | | 10.0 | |
| 1 | ∞ | 1.25 | 1.51436 | 1.25 | 1.51108 |
| 2 | ∞ | 9.97544 | 1.0 | 10.34470 | 1.0 |
| 3 | 1.61368 | 1.80135 | 1.52915 | 1.80135 | 1.52541 |
| 3' | 1.59522 | 0.00403 | 1.51915 | 0.00403 | 1.52541 |
| 4 | −3.40195 | 1.36321 | 1.0 | 0.99395 | 1.0 |
| 5 | ∞ | 0.60 | 1.57752 | 1.20 | 1.57063 |
| 6 | ∞ | | | | |

\* "di" shows a displacement from $i^{th}$ surface to $(i + 1)^{th}$ surface.
\* "d3'" shows a displacement from a third surface to a $(3')^{th}$ surface.

TABLE 2-4

Aspheric surface data

Third surface (0 ≦ h < 1.38 mm)

| Coefficient of aspheric surface | κ = −7.6977E−01 |
|---|---|
| | A4 = +1.0250E−02 |
| | A6 = −1.8158E−03 |
| | A8 = −1.3917E−03 |
| | A10 = +1.9019E−03 |
| | A12 = −7.1677E−04 |
| | A14 = +1.1697E−04 |
| Coefficient of optical path difference function | B2 = −2.7871E−01 |
| | B4 = +1.0355E+00 |
| | B6 = −4.2129E−03 |
| | B8 = +4.6111E−02 |
| | B10 = −1.1018E−02 |

$(3')^{th}$ surface (1.38 mm ≦ h)

| Coefficient of aspheric surface | κ = −8.6858E−01 |
|---|---|
| | A4 = +8.3450E−03 |
| | A6 = −1.5112E−03 |
| | A8 = +8.5363E−04 |
| | A10 = −4.0799E−04 |
| | A12 = +2.5325E−04 |
| | A14 = −3.9800E−05 |
| Coefficient of optical path difference function | B2 = +6.4315E+00 |
| | B4 = −3.6471E+00 |
| | B6 = +2.6586E−01 |
| | B8 = +2.2288E−01 |
| | B10 = −6.7202E−02 |

Fourth surface

| Coefficient of aspheric surface | κ = −3.0329E+01 |
|---|---|
| | A4 = −8.3902E−03 |
| | A6 = +3.5649E−03 |
| | A8 = +2.5562E−03 |
| | A10 = −2.4827E−04 |
| | A12 = −3.8271E−04 |
| | A14 = +3.3834E−05 |
| | A16 = +1.4882E−05 |

As shown in Table 2-3, the objective lens 40 of the present example is established to have focal length $f_1$ of 2.36 mm, image side numerical aperture NA1 of 0.60 and image forming magnification m of −1/8.0 when the first wavelength $\lambda 1$ emitted from the first light source 11 is 655 nm, and to have focal length $f_2$ of 2.38 mm, image side numerical aperture NA2 of 0.51 and image forming magnification m of −1/8.1 when the second wavelength $\lambda 2$ emitted from the second light source 21 is 785 nm.

Each of surface numbers 3, 3' and 4 of the objective lens 40 is formed to be an aspheric surface which is prescribed by the expression wherein coefficients shown in Table 2-3 and Table 2-4 are substituted in the Numeral 4 and is on an axial symmetry basis on optical axis L.

As stated above, prescribed cycle P of discontinuous region 31 is expressed by an integer portion of the value $\phi(h)/2\pi$ that is obtained by dividing optical path difference function $\phi(h)$ shown in Numeral 1 in which coefficients shown in Table 2-4 are substituted with $\lambda$.

In the optical pickup device and the objective lens shown in the present example, there is provided the structure wherein the phase modulation means formed on the central area does not give a phase difference to the light flux with wavelength $\lambda 2$. Therefore, with respect to a light flux with wavelength $\lambda 2$ passing through the central area, it was possible to converge it at diffraction efficiency of almost 100% for CD. Further, with respect to a light flux with wavelength $\lambda 1$ passing through the central area, it was possible to converge it at diffraction efficiency of about 87% for DVD.

Further, excellent correction of aberration is possible because diffracted light of a light flux with wavelength $\lambda 1$ passing through the central area and the peripheral area is converged on DVD. It was further possible to obtain sufficient amount of light for recording of information because refracted light of a light flux with wavelength $\lambda 2$ is converged on CD.

It was confirmed by the foregoing that compatibility for DVD and CD is sufficient.

EXAMPLE 2-3

Figure 8:
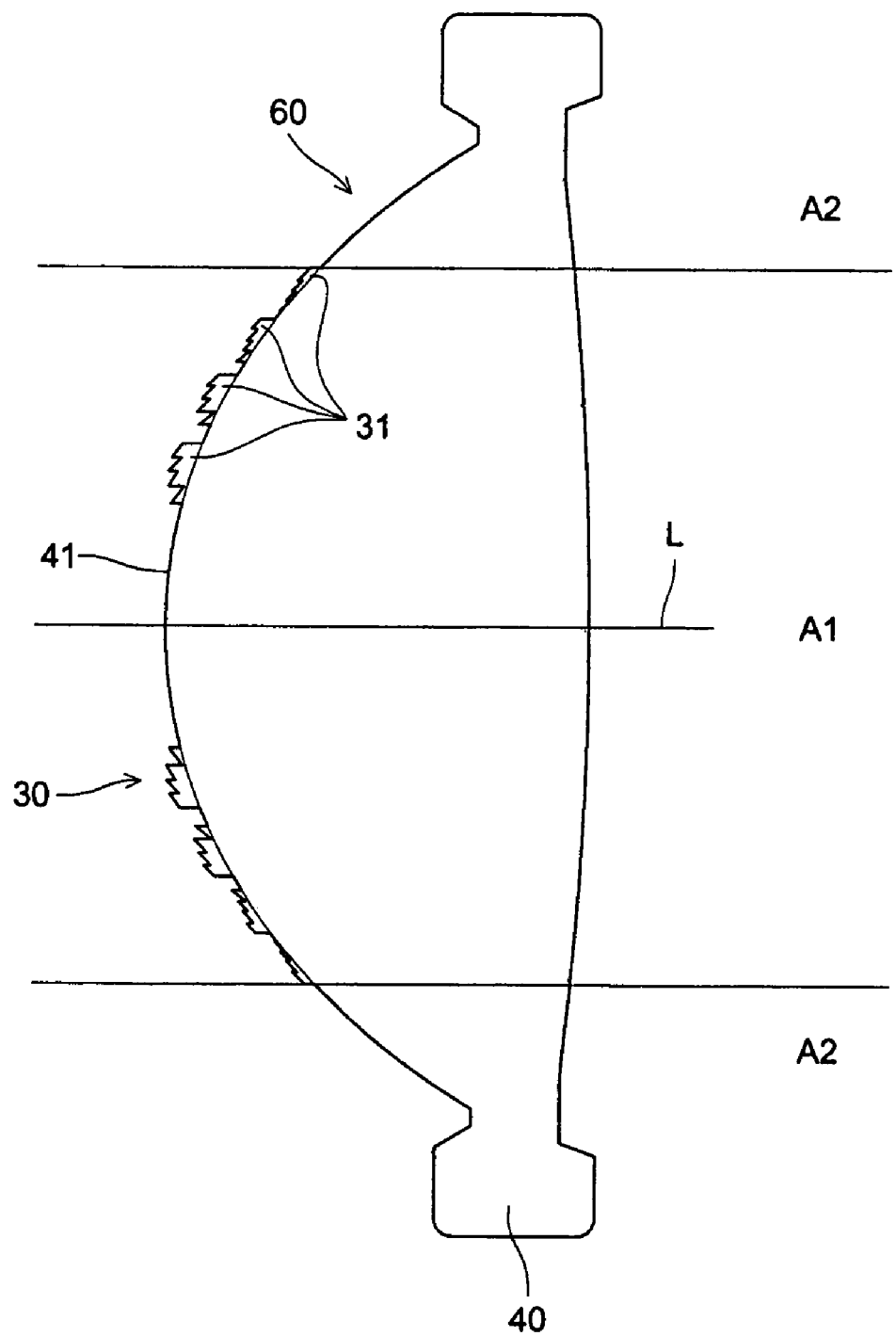
FIG. 8 is a side view of a primary portion showing the structure of an objective lens.

In the present example, as shown in FIG. 8, phase modulation means 30 is provided on central area A1 whose height from optical axis L is 1.25 mm or less and on optical surface 41 on one side (light source side) of objective lens 40 representing a two-sided aspheric surface single lens, and refracting structure 60 that functions as a refracting lens is provided on peripheral area A2.

To be concrete, plural discontinuous regions 31 composed of stairway-shaped step portions 31a which are in parallel with a direction of optical axis L are formed in a shape of concentric circles having centers on optical axis L at prescribed cycle P, as phase modulation means 30, on the central area A1.

Incidentally, FIG. 8 is a schematic diagram of objective lens 40 used in the present example. Therefore, on objective lens 40 in FIG. 8, four discontinuous regions 31 are formed on central area A1, but three discontinuous regions 31a are formed on the objective lens used actually in the present example.

Further, each discontinuous region 31 is composed of five step portions 31a, and as shown in FIG. 6(B), they are arranged so that step portions 31a are projected forward as they become more distant from the optical axis L.

Phase modulation means 30 is provided with the structure wherein a light flux with wavelength $\lambda 2$ is converged on information recording surface 21a of CD without being given a phase difference, while, a light flux with wavelength $\lambda 1$ is given a phase difference and thereby is diffracted and converged on information recording surface 20a of DVD.

Lens data of the objective lens 40 are shown in Table 2-5 Table 2-6.

TABLE 2-5

Example (2-3)

| | | | | |
|---|---|---|---|---|
| Focal length | $f_1$ = 2.39 mm | | $f_2$ = 2.40 mm | |
| Numerical aperture | NA1 = 0.60 | | NA2 = 0.47 | |
| Image forming magnification | m = −1/10.0 | | m = −1/10.1 | |

| $i^{th}$ surface | Ri | di (655 nm) | ni (655 nm) | di (785 nm) | ni (785 nm) |
|---|---|---|---|---|---|
| 0 | | 10.0 | | 10.0 | |
| 1 | ∞ | 1.25 | 1.51436 | 1.25 | 1.51108 |
| 2 | ∞ | 15.03953 | 1.0 | 15.41078 | 1.0 |
| 3 | 1.61123 | 1.75 | 1.52915 | 1.75 | 1.52541 |
| 3' | 1.60874 | −0.00045 | 1.52915 | −0.00045 | 1.52541 |
| 4 | −3.66417 | 1.35047 | 1.0 | 0.97922 | 1.0 |
| 5 | ∞ | 0.60 | 1.57752 | 1.20 | 1.57063 |
| 6 | ∞ | | | | |

\* "di" shows a displacement from $i^{th}$ surface to $(i + 1)^{th}$ surface.
\* "d3'" shows a displacement from a third surface to a $(3')^{th}$ surface.

TABLE 2-6

Aspheric surface data

Third surface (0 ≦ h < 1.25 mm)

| | |
|---|---|
| Coefficient of aspheric surface | κ = −8.3747E−01 |
| | A4 = +4.5312E−03 |
| | A6 = +2.1482E−03 |
| | A8 = −1.4416E−03 |
| | A10 = +1.3269E−03 |
| | A12 = −5.3392E−04 |
| | A14 = +5.8100E−05 |
| Coefficient of optical path difference function | B2 = −2.2474E−02 |
| | B4 = +1.3947E+00 |
| | B6 = −2.9624E−01 |
| | B8 = +1.9503E−01 |
| | B10 = −5.1181E−02 |

$(3')^{th}$ surface (1.25 mm ≦ h)

| | |
|---|---|
| Coefficient of aspheric surface | κ = −8.4706E−01 |
| | A4 = +3.2551E−03 |
| | A6 = +1.1222E−03 |
| | A8 = +3.1848E−04 |
| | A10 = −2.9650E−05 |
| | A12 = −4.3419E−05 |
| | A14 = −8.9795E−05 |
| Coefficient of optical path difference function | B2 |
| | B4 |
| | B6 |
| | B8 |
| | B10 |

Fourth surface

| | |
|---|---|
| Coefficient of aspheric surface | κ = −6.7689E+00 |
| | A4 = +1.9274E−02 |
| | A6 = +4.2139E−04 |
| | A8 = −2.6460E−03 |
| | A10 = −5.6909E−04 |
| | A12 = +5.6178E−04 |
| | A14 = −9.1534E−05 |

As shown in Table 2-5, the objective lens 40 of the present example is established to have focal length $f_1$ of 2.39 mm, image side numerical aperture NA1 of 0.60 and image forming magnification m of −1/10.0 when the first wavelength λ1 emitted from the first light source 11 is 655 nm, and to have focal length $f_2$ of 2.40 mm, image side numerical aperture NA2 of 0.47 and image forming magnification m of −1/10.1 when the second wavelength λ2 emitted from the second light source 21 is 785 nm.

Each of surface numbers 3, 3' and 4 of the objective lens 40 is formed to be an aspheric surface which is prescribed by the expression wherein coefficients shown in Table 2-5 and Table 2-6 are substituted in the Numeral 4 and is on an axial symmetry basis on optical axis L.

As stated above, prescribed cycle P of discontinuous region 31 is expressed by an integer portion of the value φ (h)/2π that is obtained by dividing optical path difference function φ (h) shown in Numeral 1 in which coefficients shown in Table 6 are substituted with λ.

In the optical pickup device and the objective lens shown in the present example, there is provided the structure wherein the phase modulation means formed on the central area does not give a phase difference to the light flux with wavelength λ2. Therefore, with respect to a light flux with wavelength λ2 passing through the central area, it was possible to converge it at diffraction efficiency of almost 100% for CD. Further, with respect to a light flux with wavelength λ1 passing through the central area, it was possible to converge it at high diffraction efficiency for DVD.

Further, excellent correction of aberration is possible because diffracted light of a light flux with wavelength λ1 passing through the central area and the peripheral area is converged on DVD. It was further possible to obtain sufficient amount of light for recording of information because refracted light of a light flux with wavelength λ1 and a light flux with wavelength λ2 are converged respectively on DVD and CD on the peripheral area.

It was confirmed by the foregoing that compatibility for DVD and CD is sufficient.

EXAMPLE 2-4

Figure 9:
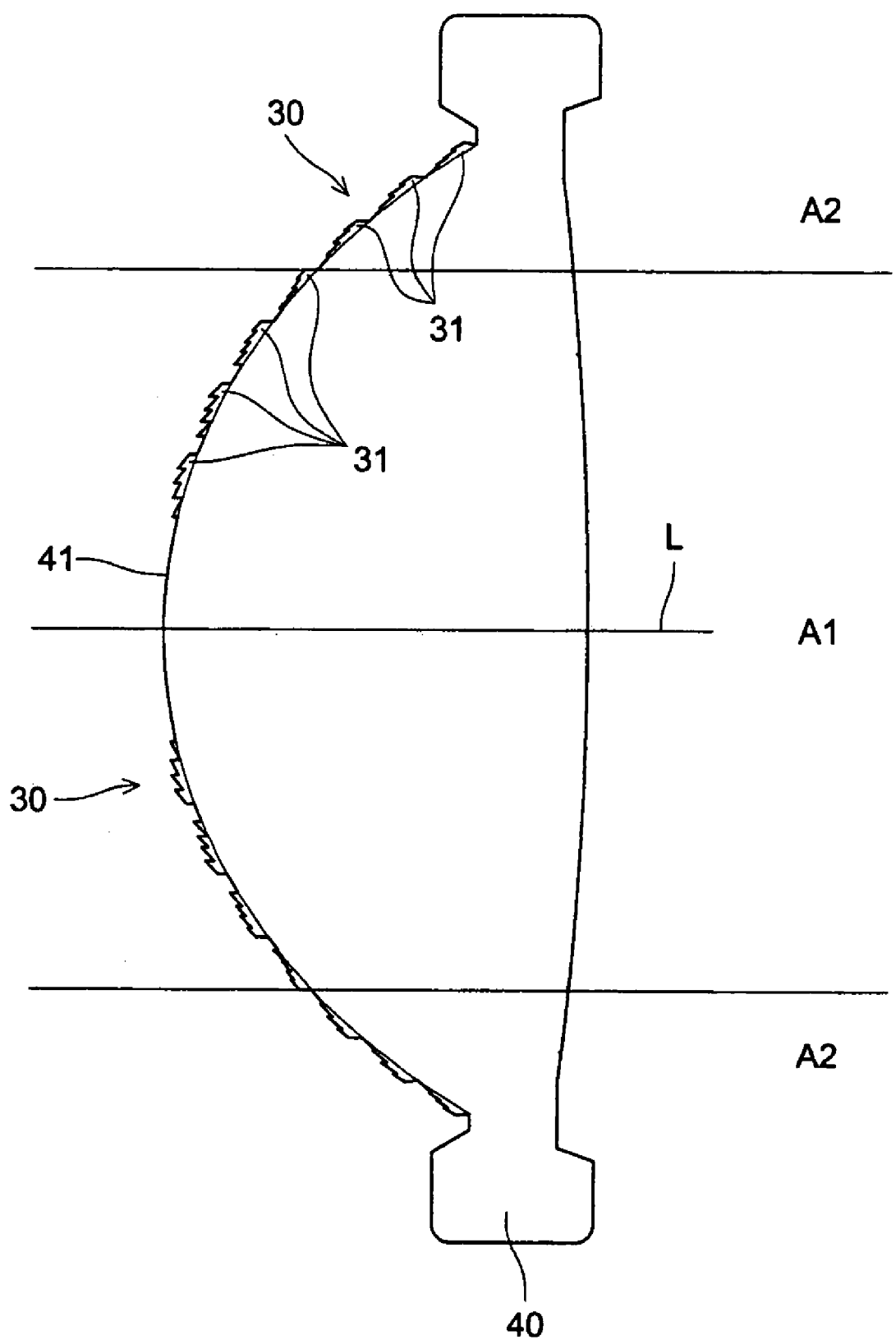
FIG. 9 is an enlarged view of a primary portion showing the structure of an objective lens.

In the present example, as shown in FIG. 9, phase modulation means 30 is provided on central area A1 whose height from optical axis L is 1.42 mm or less and peripheral area A2 and on optical surface 41 on one side (light source side) of objective lens 40 representing a two-sided aspheric surface single lens.

To be concrete, plural discontinuous regions 31 composed of stairway-shaped step portions 31a which are in parallel with a direction of optical axis L are formed in a shape of concentric circles having centers on optical axis L at prescribed cycle P, as phase modulation means 30, on the central area A1.

Incidentally, FIG. 9 is a schematic diagram of objective lens 40 used in the present example. Therefore, on objective lens 40 in FIG. 9, four discontinuous regions 31 are formed on central area A1, but three discontinuous regions 31 are formed on the objective lens used actually in the present example.

Further, each discontinuous region 31 is composed of five step portions 31a, and as shown in FIG. 6(B), they are arranged so that step portions 31a are projected forward as they become more distant from the optical axis L.

Further, three discontinuous regions 31 composed of stairway-shaped step portions 31a which are in parallel with a direction of optical axis L are formed even on peripheral area A2 as phase modulation means 30 in a shape of concentric circles having centers on optical axis L at prescribed cycle P. Each discontinuous region 31 is composed of five step portions 31a, and as shown in FIG. 6(B), they are arranged so that step portions 31a are projected forward as they become more distant from optical axis L.

Phase modulation means 30 on central area A1 is provided with the structure wherein a light flux with wavelength λ2 is diffracted and converged on information recording surface 21a of CD by being given a phase difference, while, a light flux with wavelength λ1 is converged on information recording surface 20a of DVD without being given a phase difference.

Further, phase modulation means 30 on peripheral area A2 is provided with the structure wherein a light flux with wavelength λ2 is given a phase difference and thereby is diffracted to be converged on information recording surface 21a of CD, while, a light flux with wavelength λ1 is not given a phase difference and is converged on information recording surface 20a of DVD.

Lens data of the objective lens 40 are shown in Table 2-7 and Table 2-8.

TABLE 2-7

Example (2-4)

| Focal length | $f_1$ = 2.80 mm | | $f_2$ = 2.81 mm | |
|---|---|---|---|---|
| Numerical aperture | NA1 = 0.60 | | NA2 = 0.47 | |
| Image forming magnification | m = −1/15.0 | | m = −1/15.1 | |

| $i^{th}$ surface | Ri | di (655 nm) | ni (655 nm) | di (785 nm) | ni (785 nm) |
|---|---|---|---|---|---|
| 0 | | 10.0 | | 10.0 | |
| 1 | ∞ | 1.25 | 1.51436 | 1.25 | 1.51108 |
| 2 | ∞ | 33.63106 | 1.0 | 34.01354 | 1.0 |
| 3 | 1.84007 | 1.90 | 1.52915 | 1.90 | 1.52541 |
| 3' | 1.84007 | 0.0 | 1.52915 | 0.0 | 1.52541 |
| 4 | −4.92462 | 1.60894 | 1.0 | 1.22646 | 1.0 |
| 5 | ∞ | 0.60 | 1.57752 | 1.20 | 1.57063 |
| 6 | ∞ | | | | |

\* "di" shows a displacement from $i^{th}$ surface to $(i+1)^{th}$ surface.
\* "d3'" shows a displacement from a third surface to a $(3')^{th}$ surface.

TABLE 2-8

Aspheric surface data

Third surface (0 ≦ h < 1.42 mm)

| Coefficient of aspheric surface | κ = −8.0672E−01 |
| | A4 = +4.9515E−03 |
| | A6 = +1.3804E−04 |
| | A8 = +1.1130E−04 |
| | A10 = −4.4350E−05 |
| | A12 = +1.9589E−05 |
| | A14 = −4.9821E−06 |
| Coefficient of optical path difference function | B2 = −1.1116E+00 |
| | B4 = −7.3368E−01 |
| | B6 = −2.9250E−01 |
| | B8 = −2.0187E−01 |
| | B10 = +4.3038E−02 |

$(3')^{th}$ surface (1.425 mm ≦ h)

| Coefficient of aspheric surface | κ = −8.0672E−01 |
| | A4 = +4.9515E−03 |
| | A6 = +1.3804E−04 |
| | A8 = +1.1130E−04 |
| | A10 = −4.4350E−05 |
| | A12 = +1.9589E−05 |
| | A14 = −4.9821E−06 |
| Coefficient of optical path difference function | B2 = +5.7606E+00 |
| | B4 = −3.8733E+00 |
| | B6 = +3.8208E−01 |

Fourth surface

| Coefficient of aspheric surface | κ = −2.6508E+01 |
| | A4 = +3.4985E−03 |
| | A6 = +2.4350E−04 |
| | A8 = −1.8017E−04 |
| | A10 = −8.7274E−05 |
| | A12 = +5.7455E−06 |
| | A14 = +3.2581E−06 |

As shown in Table 2-7, the objective lens 40 of the present example is established to have focal length $f_1$ of 2.80 mm, image side numerical aperture NA1 of 0.60 and image forming magnification m of −1/15.0 when the first wavelength λ1 emitted from the first light source 11 is 655 nm, and to have focal length $f_2$ of 2.81 mm, image side numerical aperture NA2 of 0.47 and image forming magnification m of −1/15.1 when the second wavelength λ2 emitted from the second light source 21 is 785 nm.

Each of surface numbers 3, 3' and 4 of the objective lens 40 is formed to be an aspheric surface which is prescribed by the expression wherein coefficients shown in Table 2-7 and Table 2-8 are substituted in the Numeral 4 and is on an axial symmetry basis on optical axis L.

As stated above, prescribed cycle P of discontinuous region 31 is expressed by an integer portion of the value φ (h)/2π that is obtained by dividing optical path difference function φ (h) shown in Numeral 1 in which coefficients shown in Table 2-8 are substituted with λ.

In the optical pickup device and the objective lens shown in the present example, there is provided the structure. wherein the phase modulation means each being formed on the central area and the peripheral area gives a phase difference to the light flux with wavelength λ2. Accordingly, the diffracted light of a light flux with wavelength λ2 passing through the central area and the peripheral area can be utilized, and therefore, it has become possible to converge the light flux on DVD under the condition that spherical aberration caused by the wavelength changes is properly corrected.

It was further possible to obtain sufficient amount of light for recording of information because refracted light of a light flux with wavelength λ1 passing through the central area and the peripheral area is converged on DVD.

It was confirmed by the foregoing that compatibility for DVD and CD is sufficient.

Phase modulation means 30 on the central area A1 is provided with the structure wherein a light flux with wavelength λ2 is given a phase difference and thereby is diffracted to be converged on information recording surface 21a of CD, and a light flux with wavelength λ1 is not given a phase difference to be converged on information recording surface 20a of DVD.

Further, phase modulation means 30 on the peripheral area A2 is provided with the structure wherein a light flux with wavelength λ2 is given a phase difference and thereby is diffracted to be converged on information recording surface 21a of CD, and a light flux with wavelength λ1 is not given a phase difference to be converged on information recording surface 20a of DVD.

Figure 10:
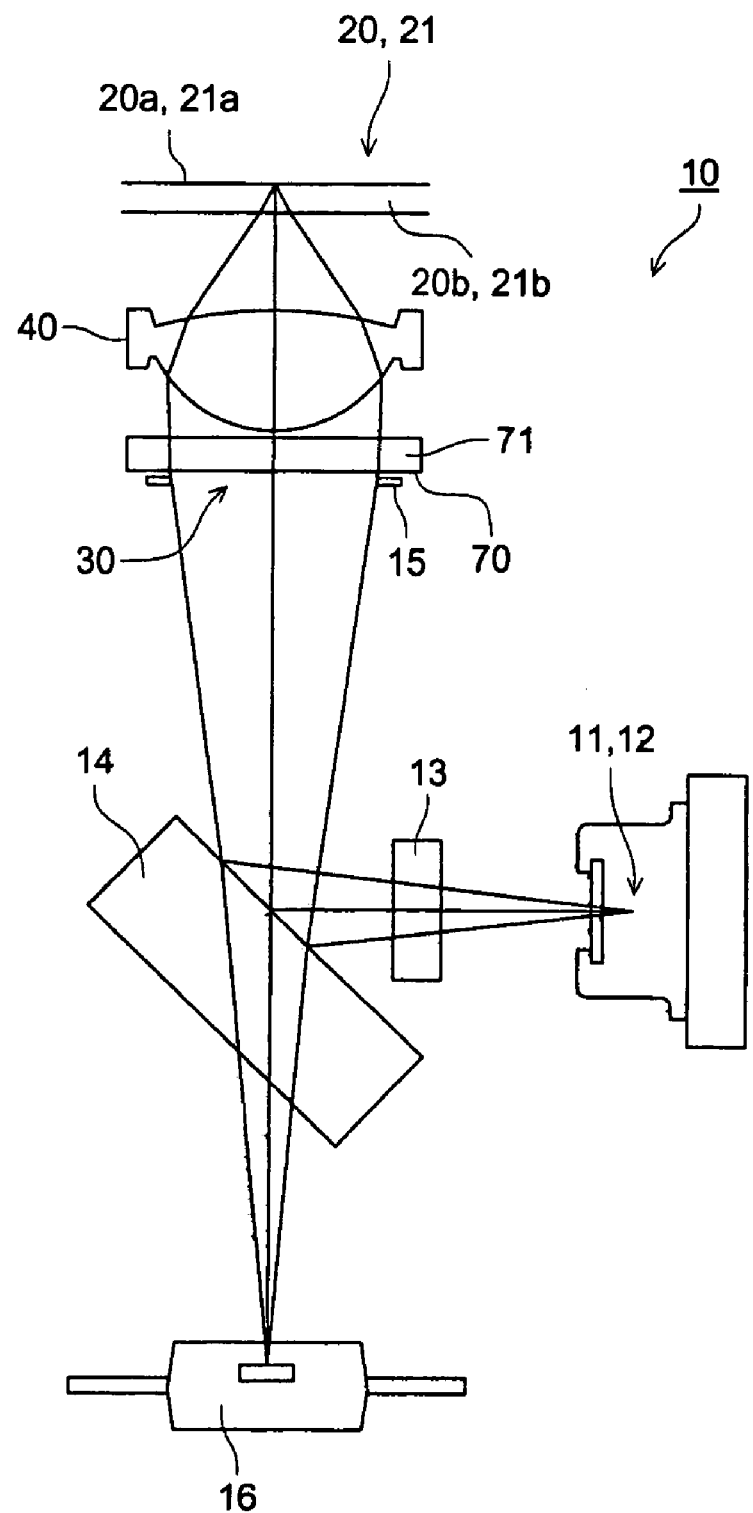
FIG. 10 is a schematic diagram showing an example of another optical pickup device.

Incidentally, an optical element on which phase modulation means 30 is formed is not limited to the objective optical element (objective lens 40) stated above, and, for example as shown in FIG. 10, the phase modulation means 30 may also be formed on optical element 70. (see FIGS. 11A)-11(C)) in a form of a flat plate that is arranged to be close to objective lens 40.

Figure 6C:
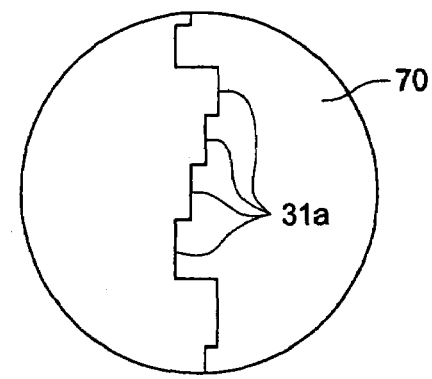

To be concrete, five discontinuous regions 31 composed of stairway-shaped step portions 31a which are in parallel with a direction of optical axis L are formed, on central area A1 of optical surface 71 on one side (light source side) of flat-plate-shaped optical element 70, in a shape of concentric circles having centers on optical axis L at a prescribed cycle, as phase modulation means 30. Each discontinuous region 31 is composed of four step portions 31a, and discontinuous region 31 shown in FIG. 11(A) is provided with the structure wherein each of step portions 31a is projected forward as it approaches the optical axis L as shown in FIG. 6(C), and discontinuous region 31 shown in FIG. 11(B) is provided with the structure wherein each step portion 31a is projected forward as it becomes more distant from the optical axis L approaches the optical axis L, and as shown in FIG. 11(B).

It is further possible to provide phase modulation means 30 on central area A1 and peripheral area A2, and the central area A1 may be provided with the structure wherein step portion 31a is projected forward as it approaches optical axis L, and peripheral area A2 may be provided with the structure wherein step portion 31a is projected forward as it becomes more distant from optical axis L, as in the case of flat-plate-shaped optical element 70 shown in FIG. 11(C).

Figure 12:
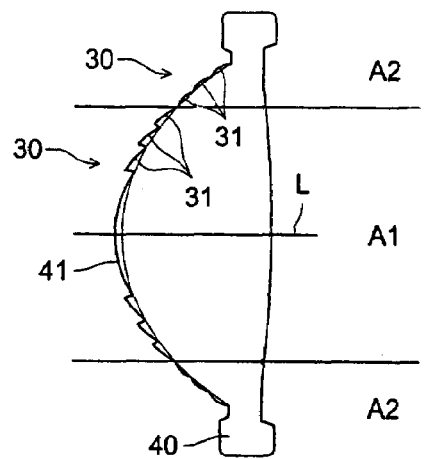
FIGS. 12(a) to 12(c) represent side views of primary portions each showing the structure of another objective lens.
Figure 12:
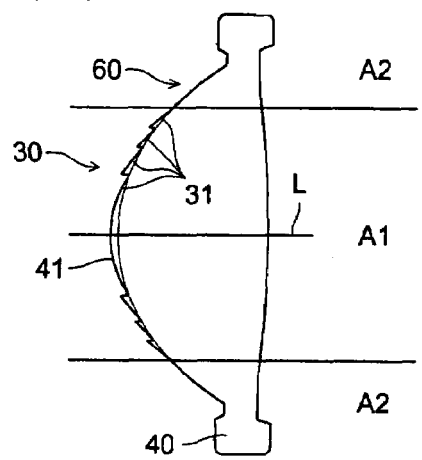
Figure 12:
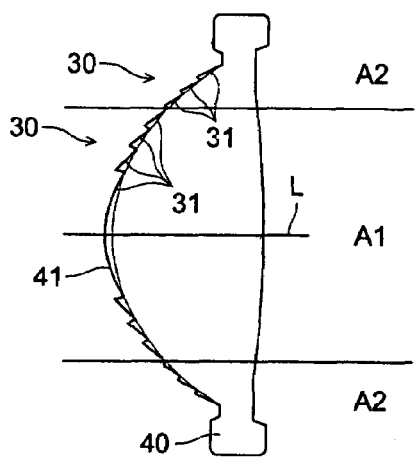

As shown in FIG. 12(A), it is also possible to arrange discontinuous region 31 of central area A1 so that step portion 31a is projected forward as it approaches optical axis L, and to arrange discontinuous region 31 of peripheral area A2 so that step portion 31a is projected forward as it becomes more distant from optical axis L.

It is further possible to employ those wherein discontinuous region 31 of central area A1 is arranged so that step portion 31a is projected forward as it approaches optical axis L, and refracting structure 60 is provided on peripheral area A2, as shown in FIG. 12(B).

It is also possible to arrange discontinuous regions 31 of central area A1 and peripheral area A2 so that step portion 31a may be projected forward as it approaches optical axis L, as shown in FIG. 12(C).

Further, phase modulation means 30 may be formed on plural optical surfaces of one objective lens, for example, on each of two optical surfaces on the light source side and the optical information recording medium side, for which, however, illustration will be omitted.

Further, it is preferable to make image forming magnification m to be within a range of $-0.149$--$0.049$.

It is preferable that the following expression holds when R1 represents a paraxial radius of curvature of an optical surface of objective optical lens on the light source side, and R2 represents a paraxial radius of curvature of an optical surface on the optical surface on the optical information recording medium side.

$$-3.2 < R2/R1 < -1.9$$

According to the second embodiment, even when the light flux with the first wavelength $\lambda 1$ and the light flux with second wavelength $\lambda 2$ enter the objective optical element as divergent light, the phase modulation means equipped with discontinuous regions gives a phase difference to at least either one of the light flux with the first wavelength $\lambda 1$ and the light flux with the second wavelength $\lambda 2$, and this light flux is converged on a prescribed optical information recording medium by the cooperation with the objective optical element, under the condition that spherical aberration is corrected. Therefore, an optical element such as a collimator lens which has been used in a conventional infinite type optical pickup device to collimate a light flux emitted from the light source into parallel light so that the light flux may enter the objective optical element, turns out to be unnecessary, and downsizing and low cost of the device can be attained.

Third Embodiment

The light converging optical system described in Item (3-1) is a light-converging optical system in which an optical element portion that includes at least an objective optical element and is composed of one or plural optical elements is provided, a light flux with first wavelength $\lambda 1$ (630 nm$\leq \lambda 1 \leq$680 nm) is converged on an information recording surface of the first optical information recording medium with protective base board thickness t1 and a light flux with second wavelength $\lambda 2$ (760 nm$\leq \lambda 2 \leq$680 nm) is converged on an information recording surface of the second optical information recording medium with protective base board thickness t2 (t1<t2) wherein optical system magnifications m1 and m2 respectively for the light flux with the first wavelength $\lambda 1$ and the light flux with the second wavelength $\lambda 2$ satisfy respectively m1$\neq$0 and m2$\neq$0, and on at least one optical surface of the optical element portion, there is provided a common area where the light flux with the first wavelength $\lambda 1$ passes through and the light flux with the first wavelength $\lambda 1$ is converged on an information recording surface of the first optical information recording medium and the light flux with the second wavelength $\lambda 2$ passes through and the light flux with the second wavelength $\lambda 2$ is converged on an information recording surface of the second optical information recording medium, a plurality of ring-shaped zonal optical functional surfaces having their centers on the optical axis are formed continuously through step surfaces, and distance x that is in parallel with an optical axis of the step surfaces satisfies 5.5 $\mu$m$\leq$x$\leq$7 $\mu$m.

In the light converging optical system described in Item (3-1), there is provided, in the light-converging optical system, the common area where the light flux with the first wavelength $\lambda 1$ passes through at least one optical surface of the optical element portion and the light flux immediately after the passing is converged on an information recording surface of the first optical information recording medium and the light flux with the second wavelength $\lambda 2$ passes and the light flux immediately after the passing is converged on an information recording surface of the second optical information recording medium, and the common area is provided with ring-shaped zonal optical functional surfaces and step surfaces each having distance x that is in parallel with an optical axis satisfying 5.5 $\mu$m$\leq$x$\leq$7 $\mu$m.

When the distance x that is parallel to the optical axis is smaller than 5.5 $\mu$m, a deviation from the distance that is essentially five times the light flux with wavelength $\lambda 1$ grows greater, which lowers a light utilization efficiency for each of the light fluxes respectively with wavelength $\lambda 1$ and wavelength $\lambda 2$ which are converged on information recording surfaces respectively of the first and second optical information recording media. Even when the distance x that is parallel to the optical axis is greater than 7 $\mu$m, a deviation from the distance that is essentially five times the light flux with wavelength $\lambda 1$ grows greater, which lowers a light utilization efficiency for each of the light fluxes respectively with wavelength $\lambda 1$ and wavelength $\lambda 2$ which are converged on information recording surfaces respectively of the first and second optical information recording media. The light utilization efficiency is a rate of an amount of light of light-converged spot to an amount of incident light into an objective optical element of the light-converging optical system.

Therefore, the light flux with the first wavelength $\lambda 1$ that has passed through adjoining ring-shaped zonal optical functional surfaces has an optical path difference of about $5 \times \lambda 1$, but it is possible to enhance the light utilization efficiency, because phases are in accord with each other on the light-converged spot on the first optical information recording medium. Further, the light flux with the second wavelength $\lambda 2$ that has passed through adjoining ring-shaped zonal optical functional surfaces has an optical path difference of about $4 \times \lambda 2$, but it is possible to enhance the light utilization efficiency, because phases are in accord with each other on the light-converged spot on the second optical information recording medium.

Further, optical system magnifications m1 and m2 respectively for the light flux with the first wavelength λ1 and the light flux with the second wavelength λ2 satisfy respectively m1≠0 and m2≠0. Accordingly, the light flux of the finite system is used to be converged on the first or second optical information recording medium, thus, it is not necessary to provide an optical element for collimating a light flux such as a collimator lens, and it is possible to reduce the number of parts, and to downsize an equipment such as an optical pickup device having a light-converging optical system and to lower its cost.

The light converging optical system described in Item (3-2) is the light-converging optical system described in Item (3-1), wherein the number of ring-shaped zonal optical functional surfaces is either one of 4-60.

In the light converging optical system described in Item (3-2), the number of ring-shaped zonal optical functional surfaces is either one of 4-60. It is therefore possible to make the number of ring-shaped zonal optical functional surfaces to be an appropriate value for protective base board thickness t1 and t2, and therefore, sufficient light utilization efficiency can be obtained, and manufacture of ring-shaped zonal optical functional surfaces can be made easy. When the number of ring-shaped zonal optical functional surfaces is smaller than 4, it is difficult to realize sufficient optical function of the ring-shaped zonal optical functional surfaces for the optical information recording medium having a thin protective base board. When the number of ring-shaped zonal optical functional surfaces is greater than 60, a distance in the direction perpendicular to the optical axis of the ring-shaped zonal optical functional surface is smaller, which makes it difficult to manufacture ring-shaped zonal optical functional surfaces. When the number of ring-shaped zonal optical functional surfaces is further greater than 60, a rate of area of the step surface through which the light flux does not pass grows greater, and the light utilization efficiency is lowered.

The invention described in Item (3-3) is the light-converging optical system described in Item (3-1) or (3-2), wherein the optical element provided with the common area is a coupling lens.

In the light converging optical system described in Item (3-3), the optical element provided with the common area is a coupling lens. Therefore, it is possible to offer other correcting effects by providing, on the objective optical element, ring-shaped zonal optical functional surfaces and step surfaces which are different from those described in Item (3-1) or (3-2). It is also possible to use a general and inexpensive objective optical element which has neither ring-shaped zonal optical functional surfaces nor step surfaces.

The light converging optical system described in Item (3-4) is the light-converging optical system described in either one of Items (3-1)-(3-3), wherein the optical element provided with the common area is the objective optical element stated above.

In the light converging optical system described in Item (3-4), the optical element provided with the common area is an objective optical element. Therefore, it is possible to reduce the number of parts of the light-converging optical system and to achieve downsizing and low cost.

The light converging optical system described in Item (3-5) is the light-converging optical system described in either one of Items (3-1)-(3-4), wherein the optical system magnification m1 satisfies $-1/3 \leq m1 \leq 0$.

In the light converging optical system described in Item (3-5), the optical system magnification m1 satisfies $-1/3 \leq m1 \leq 0$. Therefore, it is possible to prevent a large-sized light-converging optical,system that is caused by the optical system magnification m1 which is positive. It is further possible to prevent that wavefront aberration of the light flux converged on each of the first and second optical information recording media is made to be greater by error characteristics which are caused when the optical system magnification m1 is smaller than −1/3 and when the light source is deviated from the optical axis.

The light converging optical system described in Item (3-6) is the light-converging optical system described in either one of Items (3-1)-(3-5), wherein the optical system magnification m2 satisfies $-1/3 \leq m2 < 0$.

In the light converging optical system described in Item (3-6), the optical system magnification m2 satisfies $-1/3 \leq m2 \leq 0$. Therefore, it is possible to prevent a large-sized equipment employing a light-converging optical system that is caused by the optical system magnification m2 which is positive. It is further possible to prevent that wavefront aberration of the light flux converged on each of the first and second optical information recording media is made to be greater by error characteristics which are caused when the optical system magnification m2 is smaller than −1/3 and when the light source is deviated from the optical axis. 0024)

The light converging optical system described in Item (3-7) is the light-converging optical system described in either one of Items (3-1)-(3-6), wherein focal length f1 for the light flux with the first wavelength λ1 satisfies f1≦4 mm.

In the light converging optical system described in Item (3-7), focal length f1 for the light flux with the first wavelength λ1 satisfies f1≦4 mm. It is therefore possible to make the focal length f1 to be small, and to downsize an equipment such as an optical pickup device equipped with a light-converging optical system.

The light converging optical system described in Item (3-8) is the light-converging optical system described in either one of Items (3-1)-(3-7), wherein focal length f2 for the light flux with the second wavelength λ2 satisfies f2≦4 mm.

In the light converging optical system described in Item (3-8), focal length f2 for the light flux with the second wavelength λ2 satisfies f2≦4 mm. It is therefore possible to make the focal length f2 to be small, and to downsize an equipment such as an optical pickup device equipped with a light-converging optical system.

The light converging optical system described in Item (3-9) is the light-converging optical system described in either one of Items (3-1)-(3-8), wherein numerical aperture NA1 on the image side for the light flux with the first wavelength λ1 satisfies 0.55≦NA1≦0.67.

The numerical aperture on the image side is a numerical aperture on the image side that is defined as a result of the restriction of the light flux contributing to forming of a light-converged spot on a best image point of the optical information recording medium. When a plurality of optical elements are present, the numerical aperture on the image side means a numerical aperture on the image side of the optical element closest to the optical information recording medium in the light-converging optical system.

In the light converging optical system described in Item (3-9), numerical aperture NA1 on the image side for the light flux with the first wavelength λ1 satisfies 0.55≦NA1≦0.67. Therefore, the light flux can be converged properly, in accordance with recording density of the first optical information recording medium for information.

The light converging optical system described in Item (3-10) is the light-converging optical system described in either one of Items (3-1)-(3-9), wherein numerical aperture NA2 on the image side for the light flux with the second wavelength λ2 satisfies 0.44≦NA2≦0.55.

In the light converging optical system described in Item (3-10), numerical aperture NA2 on the image side for the light flux with the second wavelength $\lambda 2$ satisfies $0.44 \leq NA2 \leq 0.55$. Therefore, the light flux can be converged properly, in accordance with recording density of the second optical information recording medium for information.

The light converging optical system described in Item (3-11) is the light-converging optical system described in either one of Items (3-1)-(3-10), wherein the common area is equipped with a diffractive structure portion wherein incident light is diffracted by the ring-shaped zonal optical functional surfaces.

In the light converging optical system described in Item (3-11), the common area is equipped with a diffractive structure portion wherein incident light is diffracted by the ring-shaped zonal optical functional surfaces. It is therefore possible to reduce beam aberration of the light flux converged on each of the first and second optical information recording media by diffraction of the diffractive structure portion, and thereby to narrow down the positions of focal points on the optical axis substantially to one point.

The light converging optical system described in Item (3-12) is the light-converging optical system described in Item (3-11), wherein diffraction order K1 of the diffracted light having the maximum diffraction efficiency among the diffracted light with the first wavelength $\lambda 1$ diffracted by the diffractive structure portion is 5, and diffraction order K2 of the diffracted light having the maximum diffraction efficiency among the diffracted light with the first wavelength $\lambda 2$ diffracted by the diffractive structure portion is 4.

In the light converging optical system described in Item (3-12), diffraction order K1 of the diffracted light having the maximum diffraction efficiency among the diffracted light with the first wavelength $\lambda 1$ diffracted by the diffractive structure portion is 5, and diffraction order K2 of the diffracted light having the maximum diffraction efficiency among the diffracted light with the second wavelength $\lambda 2$ diffracted is 4. It is therefore possible to enhance the light utilization efficiency of the light flux converged on the first optical information recording medium because the diffraction efficiency is made to be maximum by the fifth order diffracted light with the first wavelength $\lambda 1$. Together with this, the light utilization efficiency of the light flux converged on the second optical information recording medium can be enhanced because the diffraction efficiency is made to be maximum by the fourth order diffracted light with the second wavelength $\lambda 2$.

The light converging optical system described in Item (3-13) is the light-converging optical system described in either one of Items (3-1)-(3-10), wherein each of the first wavelength $\lambda 1$ and the second wavelength $\lambda 2$ passing through the ring-shaped zonal optical functional surface emerges in the direction refracted by the ring-shaped zonal optical functional surfaces.

In the light converging optical system described in Item (3-13), each of the first wavelength $\lambda 1$ and the second wavelength $\lambda 2$ passing through the ring-shaped zonal optical functional surfaces emerges in the direction refracted by the ring-shaped zonal optical functional surfaces. Therefore, the refracted light flux with the first wavelength $\lambda 1$ that has passed through adjoining ring-shaped zonal optical functional surfaces has an optical path difference of about $5 \times \lambda 1$, but it is possible to enhance the light utilization efficiency, because phases are in accord with each other on the light-converged spot on the first optical information recording medium. Further, the light flux with the second wavelength $\lambda 2$ that has passed through adjoining ring-shaped zonal optical functional surfaces has an optical path difference of about $4 \times \lambda 2$, but it is possible to enhance the light utilization efficiency, because phases are in accord with each other on the light-converged spot on the second optical information recording medium. Further, compared with an occasion for providing the diffractive structure portion, the number of the ring-shaped zonal optical functional surfaces can be reduced, and manufacture of the light-converging optical system can be made easy.

The optical pickup device described in Item (3-14) is an optical pickup device having therein the first light source emitting a light flux with the wavelength $\lambda 1$, the second light source emitting a light flux with the wavelength $\lambda 2$ and the light-converging optical system described in either one of Items (3-1)-(3-13), wherein the light flux with the wavelength $\lambda 1$ emitted from the first light source is converged by the light-converging optical system on an information recording surface of the first optical information recording medium to conduct at least one of recording and reproducing of information, and the light flux with the wavelength $\lambda 2$ emitted from the second light source is converged by the light-converging optical system on an information recording surface of the second optical information recording medium to conduct at least one of recording and reproducing of information.

The recording of information is to converge a light flux emitted by the light-converging optical system on an information recording surface through a protective base board of the optical information recording medium and to record information on the information recording surface.

The reproducing of information is to converge a light flux emitted by the light-converging optical system on an information recording surface through a protective base board of the optical information recording medium and to reproduce information recorded on the information recording surface.

The optical pickup device described in Item (3-14), the optical pickup device has therein the first light source emitting a light flux with the first wavelength $\lambda 1$, the second light source emitting a light flux with the second wavelength $\lambda 2$ and the light-converging optical system described in either one of Items (3-1)-(3-13), and converges a light flux on an image recording surface of each of the first optical information recording medium and the second optical information recording medium to conduct at least one of recording and reproducing of information. Therefore, the optical pickup device has an effect described in either one of Items (3-1)-(3-13), and converges a light flux with first wavelength $\lambda 1$ on an information recording surface of the first optical information recording medium by the light-converging optical system to conduct at least one of recording and reproducing of information, and converges a light flux,with second wavelength $\lambda 2$ on an information recording surface of the second optical information recording medium by the light-converging optical system to conduct at least one of recording and reproducing of information.

The optical pickup device described in Item (3-15) is the optical pickup device described in Item (3-14) wherein the first light source and the second light source are integrated solidly.

In the optical pickup device described in Item (3-15), the first light source and the second light source are integrated solidly. Due to this, the first light source and the second light source are united solidly, which makes the optical pickup device to be small in size.

The third embodiment will be explained as follows, referring to the drawings attached.

Figure 13:
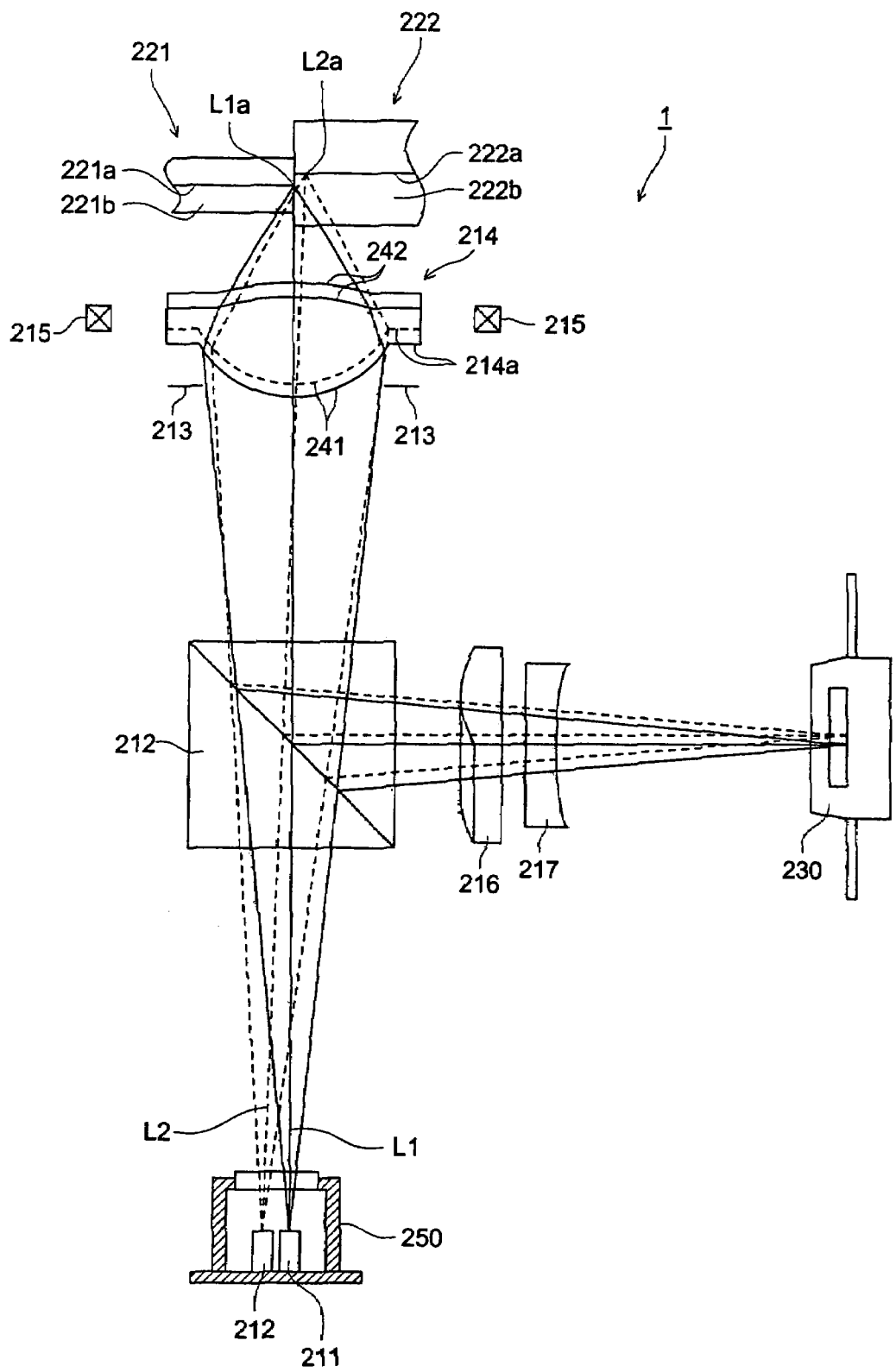
FIG. 13 is an outlined structural view of an optical pickup apparatus equipped with an objective lens 16 of the third embodiment.

First, optical pickup device 1 of the present embodiment will be explained referring to FIG. 13. FIG. 13 is a schematic structure diagram of optical pickup device 1 provided with objective lens 214 relating to the present embodiment.

Optical pickup device 1 of the present embodiment is a device that converges light flux L emitted from semiconductor laser light source 211 on CD 221 or DVD 220 representing an example of an optical information recording medium to conduct recording or reproducing of information.

As shown in FIG. 13, the optical pickup device 1 is composed of semiconductor laser light source 250 that emits a light flux, beam splitter 221 that transmits a light flux emitted form the semiconductor laser light source 250 and makes a light flux reflected on DVD 221 or CD 222 to branch, diaphragm 213 for the light flux that has passed through the beam splitter 212, objective lens 214 representing a light-converging optical system (optical element portion, objective optical element) that converges the light flux which has passed through the diaphragm 213 on DVD 221 or on CD 222, two-dimensional actuator 215 that moves the objective lens 214 in the direction of the optical axis and in the direction that is in parallel with an information recording surface of DVD 221 or CD 222 and is perpendicular to the circumference, cylindrical lens 216 that gives astigmatism to the light flux that has branched on the beam splitter 212, convex lens 217 and photodetector 230 that detects reflected light coming from DVD 221 or CD 222. Further, it is possible to set DVD 221 or CD 222 in the optical pickup device 1.

The objective lens 214 is a single lens with two-sided aspheric surfaces, and it is composed of surface of incidence 241 where a light flux emitted from semiconductor laser light source 250 enters, surface of emerging 242 from which emerging light emerges to DVD 221 or CD 222 and flange portion 214a provided on an outer circumference. The flange portion 214a makes it possible to mount the objective lens 214 on the optical pickup device 1 easily. Further, the flange portion 214a can enhance a precision of mounting easily because it has a surface extending in the direction that is substantially perpendicular to optical axis L of the objective lens 214. An optical axis of the objective lens 214 in FIG. 13 is assumed to be optical axis L (not shown), separately from optical axis L1 of the light flux corresponding to DVD 221 and optical axis L2 of the light flux corresponding to CD 222. As a material of the objective lens 214, plastic that: is optically transparent such as resin of an olefin type, for example, is used. By using plastic, it is possible to realize a light weight and a low cost of objective lens 214 and to prepare easily diffractive structure portion S which will be described later.

Further, in the semiconductor laser light source 250, light source portion 211 such as LD (Laser Diode) that emits a light flux having a working standard wavelength $\lambda_{01}$ of 655 nm to be converged on DVD 221 and light source portion 221 such as LD that emits a light flux having a working standard wavelength $\lambda_{02}$ of 785 nm to be converged on CD 222 are provided to be integrated solidly (one package). The working standard wavelengths $\lambda_{01}$ and $\lambda_{02}$ are standard wavelengths in the standards respectively of DVD and CD. Wavelengths of light fluxes emitted respectively from light source portions 211 and 221 actually are made to be working wavelengths $\lambda_{11}$ and $\lambda_{12}$. The working wavelengths $\lambda_{11}$ and $\lambda_{12}$ are those having a possibility of having errors respectively from the working standard wavelengths $\lambda_{01}$ and $\lambda_{02}$ because of temperature changes in the light source portions 211 and 221 and of mode hop.

DVD 221 is provided with information recording surface 221a on which information is recorded and protective base board 221b that is formed on the information recording surface 221a to protect it. CD 222 is provided with information recording surface 222a on which information is recorded and protective base board 222b that is formed on the information recording surface 222a to protect it. As a material of each of the protective base board 221b and the protective base board 222b, a material that is optically transparent such as polycarbonate resin (PC), for example, is used.

The objective lens 214 is of the structure for converging a light flux of a finite type. In the case of the structure wherein a light flux of a finite type is used, optical system magnification m1 in the case of converging a light flux with working wavelength $\lambda_{11}$ satisfies m1≠0, and optical system magnification m2 in the case of converging a light flux with working wavelength $\lambda_{12}$ satisfies m2≠0.

Figure 14:
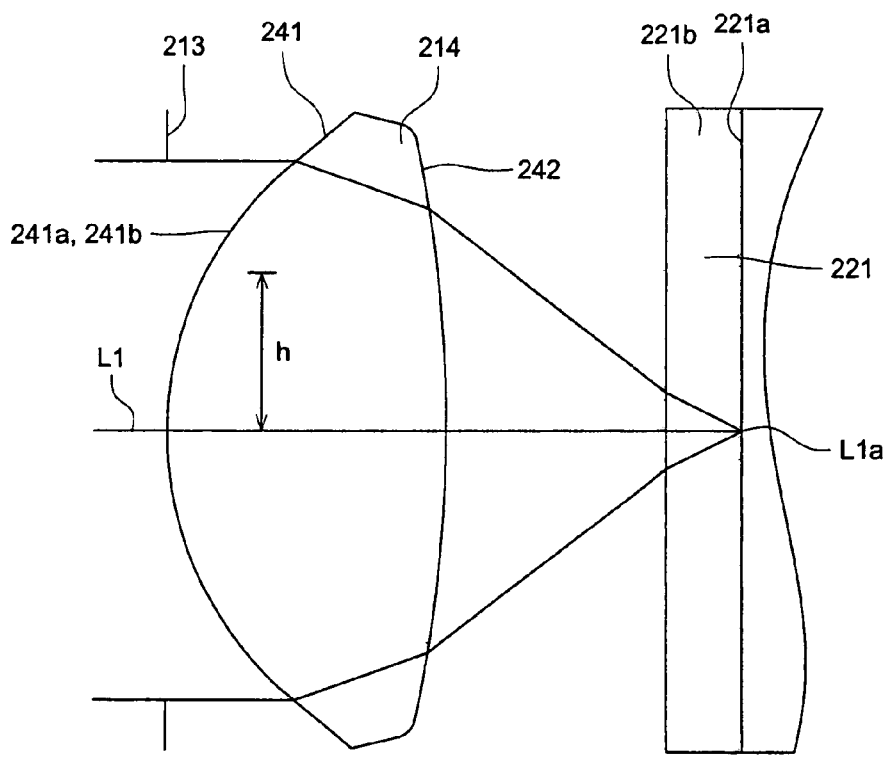
FIG. 14 is a sectional view of an objective lens 14; at the time of converging a light flux on DVD21.
Figure 15:
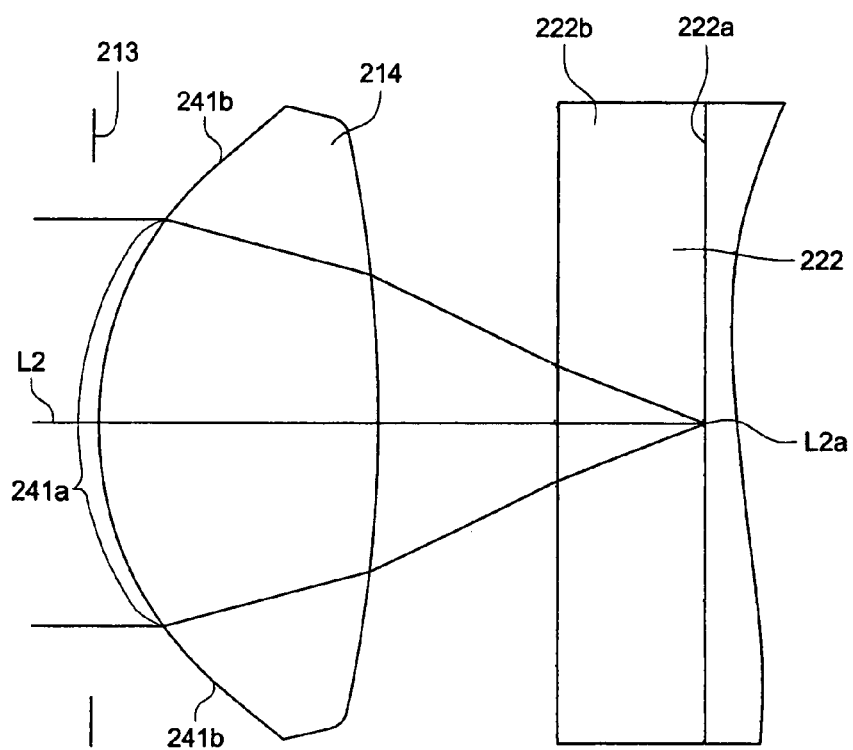
FIG. 15 is a sectional view of an objective lens 14 at the time of converging a light flux on CD22.

Now, operations of optical pickup device 1 will be explained as follows, referring to FIGS. 13, 14 and 15. FIG. 14 is a sectional view of objective lens 214 in the case of converging light on DVD 221. FIG. 15 is a sectional view of objective lens 214 in the case of converging light on CD 222. In FIGS. 14 and 15, flange portion 214a of the objective lens 214 is omitted. First, an occasion for recording or reproducing information for DVD 221 will be explained.

First, a light flux with working wavelength $\lambda_{11}$ is emitted from light source portion 211 of semiconductor laser light source 250. Then, the light flux passes through beam splitter 221 arranged between the semiconductor laser light source 250 and objective lens 214 and it is stopped down by diaphragm 213 to advance to the objective lens 214.

Then, the light flux enters surface of incidence 241 of the objective lens 214 and emerges from surface of emerging 242 to be converged on information recording surface 221a of DVD 221 as focal point L1a. In both cases of recording and reproducing information for DVD 221, the light flux is converged on information recording surface 222 as focal point L1a. Intensity of a light flux emitted from semiconductor laser light source 250 is established so that the intensity in the case of recording information is higher than that in the case of reproducing information.

When reproducing information recorded on DVD 221, a light flux that has emerged from objective lens 216 is further modulated by information pits and reflected on information recording surface 221a. The reflected light flux passes again through objective lens 216 and diaphragm 213 in succession, and is reflected and branched by beam splitter 221 serving as an optical path changing means. The branched light flux is given astigmatism by cylindrical lens 216, and passes through concave lens 217 to enter photodetector 230. The photodetector 230 detects the incident light coming from the concave lens 217 to output signals, and thus, signals for reading information recorded on DVD 221 are obtained by the use of the outputted signals.

Further, changes in an amount of light caused by changes in a form and changes in a position of a spot on the photodetector 230 are detected, and detection for focusing and detection for track are conducted. Based on results of the detection, two-dimensional actuator 215 moves objective lens 214 in the direction of optical axis L1 so that a light flux emitted from the light source portion 211 may form an image on information recording surface 221a of DVD 221 as focal point L1a. Together with this, objective lens 216 is moved in the direction that is parallel to information recording surface 221a and is perpendicular to a circumference of the track so that a light flux emitted from semiconductor laser light source 250 may form an image on a prescribed track on the information recording surface 221a.

The foregoing is also applied to an occasion for recording or reproducing information for CD 222. When recording or reproducing information for CD 222, a light flux emitted from light source portion 212 passes through beam splitter 212 and diaphragm 213, then, enters surface of incidence 241 of objective lens 214 and emerges from surface of emerging 242 to be converged on information recording surface 222a of CD 222 as focal point L2a. When reproducing information of CD 222, a light flux reflected on the information recording surface 222a passes through objective lens 214 and diaphragm 213 to be reflected and branched on beam splitter 212, and enters photodetector 230 through cylindrical lens 216 and concave lens 217.

Numerical aperture NA1 on the image side (on the side of an optical information recording medium) in the case of applying a light flux on DVD 221 in accordance with recording density of DVD 221 needs to be great. In contrast to this, numerical aperture NA2 on the image side in the case of applying a light flux on CD 222 in accordance with recording density of CD 222 needs to be small. As shown in FIG. 14 and FIG. 15, therefore, when applying a light flux on DVD 221, a light flux having a large diameter whose center is on optical axis L1 is caused to enter objective lens 214. When a light flux is caused to enter CD 222, a light flux having a relatively small diameter whose center is on optical axis L2 is caused to enter objective lens 214.

Figure 16:
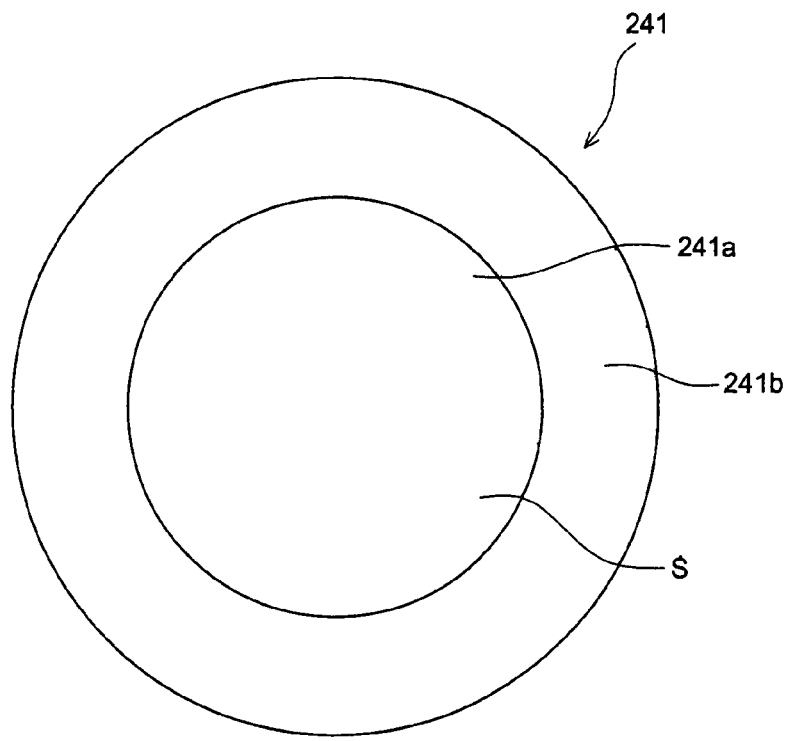
FIG. 16 is a plane view of an incident surface 241 of the objective lens 14.

As shown in FIGS. 14-16, surface of incidence 241 of objective lens 214 is an optical functional area in a shape of concentric circles whose centers are on optical axis L. FIG. 16 is a top view of the surface of incidence 241 in objective lens 214. The surface of incidence 241 has therein common area portion 241a through which light fluxes pass commonly when converging the light fluxes respectively on DVD 221 and CD 222, and DVD-exclusive area 241b through which a light flux passes only when converging a light flux on DVD 221. On the common area portion 241a, there is formed serrated diffractive structure portion S composed of ring-shaped zones in a shape of concentric circles. The diffractive structure portion S has a function to diffract the light flux that enters the diffractive structure portion.

Figure 17:
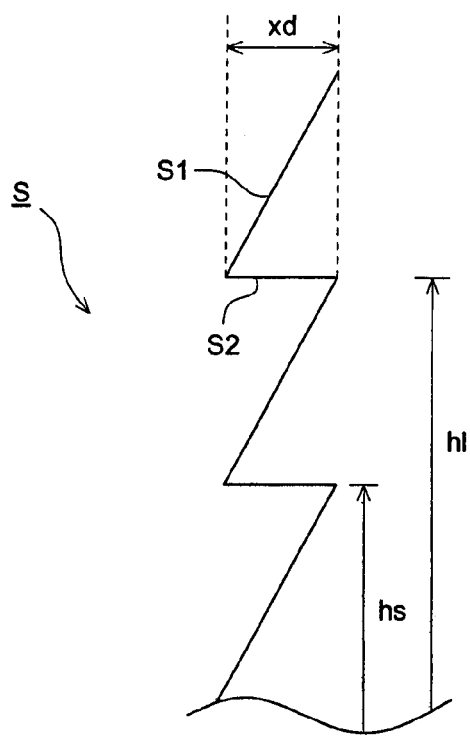

FIG. 17 is a sectional view of the diffractive structure portion S in the common area portion 241a. As shown in FIG. 17, the diffractive structure portion S that diffracts an incident light flux has therein ring-shaped zonal optical functional surface S1 and step surface S2 that is provided between ring-shaped zonal optical functional surfaces S1.

Further, on the objective lens 214, there is formed a base aspheric surface expressed by the aforementioned Numeral 5 for the expression of an aspheric surface form.

$$Z = \frac{h^2/R_0}{1 + \sqrt{1-(1+\kappa)(h/R_0)^2}} + \sum_{i=1}^{\infty} A_i h^{P_i} \qquad \text{Numeral 5}$$

In this case, Z represents a displacement (direction of advancement of incident light flux entering surface of incidence 241 is assumed to be positive) in the direction of an optical axis. Further, h represents a value (height from the optical axis) of axis in the direction perpendicular to the optical axis. $R_0$ represents a paraxial radius of curvature. The symbol κ represents a conic constant. $A_i$ represents a coefficient of aspheric surface. Pi represents an exponent of the aspheric surface.

In general, a pitch of ring-shaped zones is defined by using optical path difference function Φ. To be concrete, the optical path difference function Φ is expressed by the aforementioned Numeral 6 in a unit of mm.

$$\Phi = \left(\frac{\lambda_0 \cdot K}{\lambda_B}\right)\sum_{i=1}^{\infty} C_{2i}h^{2i} \qquad \text{Numeral 6}$$

The symbol $\lambda_0$ represents a working standard wavelength, and examples thereof are $\lambda_{O1}$ and $\lambda_{O2}$. The symbol $\lambda_B$ represents a manufacture wavelength (blazed wavelength). K represents the diffraction order that makes a diffraction efficiency to be maximum among all diffraction orders. The manufacture wavelength is a wavelength that makes a diffraction efficiency to be 100% at the diffraction order K. The diffraction efficiency is a rate of an amount of emerging light in the diffracted light at the prescribed order to an amount of emerging light in the diffracted light at all orders diffracted by the diffractive structure portion.

Number of ring-shaped zones n can be obtained by the expression of $\Phi/\lambda_0$. With regard to the order of the diffracted light, the order of the diffracted light in the direction toward the optical axis is positive. $C_{2i}$ represents a coefficient of an optical path difference function.

Further, lens data of objective lens 216 are shown in the following Table 3-1.

TABLE 3-1

| $j^{th}$ surface | rj | dj (655 mm) | nj (655 nm) | dj (785 mm) | nj (785 nm) |
|---|---|---|---|---|---|
| 0 |  | 23.27 |  | 23.27 |  |
| 1 (Aperture diameter) | ∞ | 0.0 (Φ4.674 mm) |  | 0.0 (Φ4.674 mm) |  |
| 2 | 4.51893 | 2.90000 | 1.52915 | 2.90000 | 1.52541 |
| 2' | 3.62857 | −0.01111 | 1.52915 | −0.01111 | 1.52541 |
| 3 | −6.37280 | 1.97 | 1.0 | 1.69 | 1.0 |
| 4 | ∞ | 0.6 | 1.57752 | 1.2 | 1.57063 |
| 5 | ∞ |  |  |  |  |

In Table 3-1, rj mm represents a paraxial radius of curvature, dj mm represents a displacement on the optical axis and nj represents a refractive index. Further, j represents a surface number. With respect to the surface number j, 0 shows an object point and 1 shows an aperture surface of diaphragm 213. Further, with respect to the surface number j, each of 2 and 2' shows incident surface 241 of objective lens 214 and areas for j=2 and 2' are assumed respectively to be second surface and $(2')^{th}$ surface. The second surface shows common area portion 241a of the incident surface 241. The common area portion 241a is assumed, in this case, to be an area where height h from the optical axis shown in FIG. 14 satisfies 0<h≦1.763 mm. The $(2')^{th}$ surface shows DVD-exclusive area portion 241b of the incident surface 241. The DVD-exclusive area portion 241b is assumed, in this case, to be an area where height from the optical axis satisfies 1.763 mm<h.

With respect to the surface number j, 3 shows emerging surface 242 of the objective lens 214, 4 shows a protective base board (protective base boards 221a and 22a respectively of DVD 221 and CD 222) of an optical information recording medium and 5 shows an information recording surface (information recording surfaces 221b and 22b respectively of DVD 221 and CD 222) of an optical information recording medium. Displacement dj on the optical axis shows a displacement from $j^{th}$ surface to $(j+1)^{th}$ surface. In particular, displacement d2' shows a displacement from the second surface to $(2')^{th}$ surface.

The paraxial radius of curvature rj, displacement on the optical axis dj and refractive index nj respectively show values on the surfaces corresponding to respective surface numbers j. In particular, values corresponding to working standard wavelength $\lambda_{11}$ (=655 nm) and working standard wavelength $\lambda_{12}$ (=785 nm) which also correspond respectively to DVD 221 and CD 222 are shown for each of the optical axis dj and refractive index nj. Focal length f1 on optical axis L1 from a principal point of objective lens 214 to focal point L1a on information recording surface 221a for the moment when a light flux with working standard wavelength $\lambda_{11}$ enters objective lens 214 is 3.40 mm. Further, numerical aperture NA1 on the image side of objective lens 214 for the moment when a light flux with working standard wavelength $\lambda_{11}$ enters is 0.60. Further, optical system magnification m1 for the moment when a light flux with working standard wavelength $\lambda_{01}$ enters is −1/6. A thickness of protective base board 221b is 0.6 mm.

Further, focal length f2 on optical axis L1 from a principal point of objective lens 214 to focal point L2a on information recording surface 222a for the moment when a light flux with working standard wavelength $\lambda_{12}$ enters objective lens 214 is 3.47 mm. Further, numerical aperture NA2 on the image side of objective lens 214 for the moment when a light flux with working standard wavelength $\lambda_{12}$ enters objective lens 214 is 0.44. Further, optical system magnification m2 for the moment when a light flux with working standard wavelength $\lambda_{02}$ enters is −1/5.9. A thickness of protective base board 221b is 1.2 mm.

Next, Table 3-2 shows conic constant κ, aspheric surface coefficient $A_i$ and exponent Pi of the second surface, the $(2')^{th}$ surface and the third surface of the objective lens 214 which are to be substituted in expression Z of the base aspheric surface of the aforementioned Numeral 5. Table 3-2 further shows optical path difference function coefficient $C_i$ to be substituted in the optical path difference function Φ of the aforementioned Numeral 6.

TABLE 3-2

| Second surface (0 ≦ h < 1.763 mm: DVD/CD common area) | | | | |
|---|---|---|---|---|
| Aspheric surface coefficient | κ = 1.6560 × E−0 | | | |
| | A1 = 2.9133 × E−3 | P1 | 4.0 | |
| | A2 = 9.0124 × E−4 | P2 | 6.0 | |
| | A3 = −5.2721 × E−4 | P3 | 8.0 | |
| | A4 = 3.2835 × E−5 | P4 | 10.0 | |
| | A5 = 1.0713 × E−5 | P5 | 12.0 | |
| | A6 = −9.3059 × E−7 | P6 | 14.0 | |
| Optical path difference function (manufacture wavelength $\lambda_B$ = 1 mm) | C2 = −4.0745 × E−0 | | | |
| | C4 = 1.7303 × E−1 | | | |
| | C6 = 4.6687 × E−2 | | | |
| | C8 = −1.9946 × E−2 | | | |
| | C10 = 2.7347 × E−3 | | | |
| $(2')^{th}$ surface (h > 1.763 mm: DVD exclusive area) | | | | |
| Aspheric surface coefficient | κ = −1.8190 × E−0 | | | |
| | A1 = 7.4752 × E−3 | P1 | 4.0 | |
| | A2 = −6.8159 × E−3 | P2 | 6.0 | |
| | A3 = 2.0970 × E−3 | P3 | 8.0 | |
| | A4 = −2.7108 × E−4 | P4 | 10.0 | |
| | A5 = 1.6262 × E−5 | P5 | 12.0 | |
| | A6 = 1.3867 × E−7 | P6 | 14.0 | |
| Optical path difference function (manufacture wavelength $\lambda_B$ = 1 mm) | C2 = −7.2021 × E+1 | | | |
| | C4 = −6.4664 × E−0 | | | |
| | C6 = 1.5091 × E−0 | | | |
| | C8 = −2.1705 × E−1 | | | |
| | C10 = 3.4868 × E−2 | | | |
| Third surface | | | | |
| Aspheric surface coefficient | κ = 4.8233 × E−0 | | | |
| | A1 = 1.7272 × E−2 | P1 | 4.0 | |
| | A2 = −1.0292 × E−2 | P2 | 6.0 | |
| | A3 = 4.9860 × E−3 | P3 | 8.0 | |
| | A4 = −1.4772 × E−3 | P4 | 10.0 | |
| | A5 = 2.4514 × E−4 | P5 | 12.0 | |
| | A6 = −1.6118 × E−5 | P6 | 14.0 | |

Incidentally, manufacture wavelength $\lambda_B$ is shown together with optical path difference function coefficient $C_i$. The manufacture wavelength $\lambda_B$ in Table 3-2 is a tentative value which is 1 mm. In addition, "E−t (t is an integer)" shows "$10^{-t}$".

Next, step amount x d of step surface S2 of diffractive structure portion S on the second surface (common area portion 241a) of the objective lens 214 is shown in the following Table 3-3.

TABLE 3-3

| Ring-shaped zone number | Ring-shaped zone starting height hs | Ring-shaped zone ending height hl | step amount × d at height hl |
|---|---|---|---|
| 1 | 0.000 | 0.222 | 0.00620 |
| 2 | 0.222 | 0.314 | 0.00620 |
| 3 | 0.314 | 0.385 | 0.00621 |
| 4 | 0.385 | 0.445 | 0.00622 |
| 5 | 0.445 | 0.498 | 0.00623 |
| 6 | 0.498 | 0.546 | 0.00624 |
| 7 | 0.546 | 0.591 | 0.00624 |
| 8 | 0.591 | 0.633 | 0.00625 |
| 9 | 0.633 | 0.672 | 0.00626 |
| 10 | 0.672 | 0.709 | 0.00627 |
| 11 | 0.709 | 0.745 | 0.00628 |
| 12 | 0.745 | 0.779 | 0.00628 |
| 13 | 0.779 | 0.812 | 0.00629 |
| 14 | 0.812 | 0.844 | 0.00630 |
| 15 | 0.844 | 0.874 | 0.00631 |
| 16 | 0.874 | 0.904 | 0.00632 |
| 17 | 0.904 | 0.934 | 0.00633 |
| 18 | 0.934 | 0.962 | 0.00633 |
| 19 | 0.962 | 0.990 | 0.00634 |
| 20 | 0.990 | 1.017 | 0.00635 |
| 21 | 1.017 | 1.044 | 0.00636 |

TABLE 3-3-continued

| Ring-shaped zone number | Ring-shaped zone starting height hs | Ring-shaped zone ending height hl | step amount x d at height hl |
|---|---|---|---|
| 22 | 1.044 | 1.070 | 0.00637 |
| 23 | 1.070 | 1.096 | 0.00638 |
| 24 | 1.096 | 1.122 | 0.00639 |
| 25 | 1.122 | 1.147 | 0.00640 |
| 26 | 1.147 | 1.171 | 0.00640 |
| 27 | 1.171 | 1.195 | 0.00641 |
| 28 | 1.195 | 1.219 | 0.00642 |
| 29 | 1.219 | 1.243 | 0.00643 |
| 30 | 1.243 | 1.266 | 0.00644 |
| 31 | 1.266 | 1.290 | 0.00645 |
| 32 | 1.290 | 1.312 | 0.00646 |
| 33 | 1.312 | 1.335 | 0.00647 |
| 34 | 1.335 | 1.357 | 0.00648 |
| 35 | 1.357 | 1.380 | 0.00649 |
| 36 | 1.380 | 1.402 | 0.00650 |
| 37 | 1.402 | 1.423 | 0.00651 |
| 38 | 1.423 | 1.445 | 0.00652 |
| 39 | 1.445 | 1.467 | 0.00653 |
| 40 | 1.467 | 1.488 | 0.00653 |
| 41 | 1.488 | 1.509 | 0.00654 |
| 42 | 1.509 | 1.530 | 0.00655 |
| 43 | 1.530 | 1.551 | 0.00656 |
| 44 | 1.551 | 1.572 | 0.00657 |
| 45 | 1.572 | 1.593 | 0.00658 |
| 46 | 1.593 | 1.613 | 0.00659 |
| 47 | 1.613 | 1.634 | 0.00660 |
| 48 | 1.634 | 1.655 | 0.00661 |
| 49 | 1.655 | 1.675 | 0.00662 |
| 50 | 1.675 | 1.696 | 0.00663 |
| 51 | 1.696 | 1.716 | 0.00664 |
| 52 | 1.716 | 1.736 | 0.00665 |
| 53 | 1.736 | 1.757 | 0.00666 |
| 54 | 1.757 | 1.777 | 0.00667 |
| 55 | 1.777 | 1.783 | |

Data in Table 3-3 are values of the second surface (common area portion 241a) wherein manufacture wavelength $\lambda_B$ is made to be 655 nm representing working standard wavelength $\lambda_{01}$ corresponding to DVD, diffraction order K1 that makes a diffraction efficiency to be maximum is made to be 5 and the diffraction efficiency is made to be 100% in the objective lens 214 shown in Tables 3-1 and 3-2. Table 3-3 shows the ring-shaped zone number of each diffracting ring-shaped zone, each diffracting ring-shaped zone starting height hs mm, each diffracting ring-shaped zone ending height hl mm and step amount x d mm at ending height hl. The ring-shaped zone number grows greater as each ring-shaped zone is positioned to be farther from the optical axis. The starting height hs, ending height hi and step amount x d are shown in FIG. 17. Starting points for the starting height hs and for the ending height hi are assumed to be on optical axis L.

Objective lens 214 having diffractive structure portion S that is designed based on starting height hs, ending height hl and step amount x d for each diffracting ring-shaped zone in Table 3-3 diffracts a light flux with working standard wavelength $\lambda_{01}$ to make the fifth diffracted light to emerge, and its diffraction efficiency becomes 100%. From a ratio of working standard wavelength $\lambda_{01}$ to working standard wavelength $\lambda_{02}$, the diffraction order K2 that makes a diffraction efficiency for the light flux with working standard wavelength $\lambda_{02}$ corresponding to CD to be maximum is made to be 4, in diffractive structure portion S satisfying data in Table 3-3. Therefore, objective lens 214 diffracts a light flux with working standard wavelength $\lambda_{02}$ corresponding to CD to make the fourth diffracted light to emerge, and its diffraction efficiency becomes 93%.

The diffraction efficiency of a light flux with a wavelength corresponding to CD in the case of providing a step corresponding to the first order of a light flux with a wavelength corresponding to DVD as in the past substantially becomes 91%. Compared with the structure of the step corresponding to the first order of a light flux with a wavelength corresponding to DVD, therefore, the structure of the step corresponding to fifth diffraction of the present embodiment has higher diffraction efficiency for the light flux with a wavelength corresponding to CD, and therefore, its light utilization efficiency also becomes higher. Actually, working wavelengths $\lambda_{11}$ and $\lambda_{12}$ enter the objective lens 214.

When providing a step corresponding to the fifth order diffraction on step surface S2, it is preferable that step amount x d nm satisfies 5.5 µm≦xd≦7 µm. The reason is as follows. When the step amount x d nm is smaller than 5.5 µm, a deviation from the step amount that is five times that of the light flux with working wavelength $\lambda_{01}$ grows greater, and light utilization efficiency for light fluxes respectively with working wavelength $\lambda_{01}$ and working wavelength $\lambda_{02}$ which are converged on information recording surfaces respectively of DVD and 221 and CD 222 is lowered accordingly. Step amount x d shown in Table 3-3 satisfies the condition of 5.5 µm≦x≦7 µm.

Owing to the foregoing, the objective lens 214 is provided with diffractive structure portion S having step amount x d shown in Table 3-3, and diffracts so that the diffraction order 5 may make,the diffraction efficiency to be maximum for the incident light flux with working wavelength $\lambda_{11}$. It is therefore possible to converge, on DVD 221, the fifth order diffracted light that makes a diffraction efficiency to be maximum for working wavelength $\lambda_{11}$, and thereby to enhance its light utilization efficiency. Together with this, it is possible to converge, on CD 222, the fourth order diffracted light that makes a diffraction efficiency to be maximum for working wavelength $\lambda_{12}$, and thereby to enhance its light utilization efficiency.

Further, the diffracting function of the diffractive structure portion S can reduce light aberration of light to be converged on DVD 221 or CD 222. Therefore, positions of focal points on an optical axis can be made to be on one point substantially.

Further, an incident light flux of a finite system is used to be converged on an optical information recording medium, so that optical system magnifications m1 and m2 respectively for working wavelengths $\lambda_{11}$ and $\lambda_{12}$ may satisfy m1≠0 and m1≠0 respectively. Therefore, it is not necessary to provide an optical element for collimating a light flux such as a collimator lens, and it is possible to reduce the number of parts, and to downsize optical pickup device 1 and to lower its cost.

It is preferable that optical system magnifications m1 and m2 satisfy respectively −1/3≦m1<0 and −1/3≦m2<0. When each of the optical system magnifications m1 and m2 is smaller than −1/3, wavefront aberration of a light flux to be converged on an optical information recording medium is made to be greater by error characteristics caused by a light source deviated from an optical axis. When each of the optical system magnifications m1 and m2 is a positive value, objective lens 214 is made to be greater. The optical system magnifications m1 and m2 in the present embodiment are within this preferable range.

Further, common area portion 241a having diffractive structure portion S is provided on surface of incidence 241 of objective lens 214. Due to this, compared with the structure to provide diffractive structure portion S separately from objective lens 214, it is possible to reduce the number of parts of a light-converging optical system and thereby to realize downsizing and low cost.

Since Table 3-3 shows that the number of ring-shaped zones of the diffractive structure portion S is 55, the number of ring-shaped zones is within a range of 4-60. Therefore, the diffractive structure portion S can be made easily, and sufficient light utilization efficiency can be obtained. The reason for the foregoing is that when the number of ring-shaped zones is smaller than 4, it is difficult to realize sufficient diffracting function of the diffractive structure portion S for DVD 221 having a thin protective base board, and when the number of ring-shaped zones is greater than 60, its pitch is small and it is difficult to make the diffractive structure portion S. In addition, when the number of ring-shaped zones is greater than 60, a rate of area for step surface S2 where no diffraction is conducted on the diffractive structure portion S grows greater, and a diffraction efficiency is lowered.

Light source portions 211 and 221 each having a different working standard wavelength are integrated solidly to result in semiconductor laser light source 250. Therefore, it is possible to downsize the semiconductor laser light source and thereby to downsize optical pickup device 1.

Focal length f1 and focal length f2 respectively for working wavelength $\lambda_{11}$ and working wavelength $\lambda_{12}$ satisfy respectively f1≦4 nm and f2≦4 nm. Therefore, it is possible to make focal length f1 and focal length f2 to be small and thereby to downsize optical pickup device 1.

Further, numerical aperture NA1 on the image side for working wavelength $\lambda_{11}$ satisfies 0.55≦NA1≦0.67. Therefore, it is possible to converge a light flux properly, corresponding to recording density for information of DVD 221 and to record and reproduce information of DVD 221 properly.

Further, numerical aperture NA2 on the image side for working wavelength $\lambda_{12}$ satisfies 0.44≦NA2≦0.55. Therefore, it is possible to converge a light flux properly, corresponding to recording density for information of CD 222 and to record and reproduce information of CD 222 properly.

It is also possible to employ the structure to provide a structure portion by which the direction of advancement of emerging light is determined only by refraction, in place of diffractive structure portion S on common area portion 241a of objective lens 214. An example of the foregoing is a structure to provide a phase shift structure portion described in "Patent Document 1". In this case, adjoining ring-shaped zonal concave portions or ring-shaped zonal convex portions have an amount of step corresponding to fifth order diffraction for working standard wavelength $\lambda_{01}$ corresponding to DVD. In other words, a light flux with working standard wavelength $\lambda_{01}$ that passes through the adjoining ring-shaped zonal concave portions or ring-shaped zonal convex portions has an amount of step that is given an optical path difference in quantity of almost 5 times to emerge, which results in the structure to provide ring-shaped zonal concave portions or ring-shaped zonal convex portions having this amount of step on the common area. If a light flux with working standard wavelength $\lambda_{02}$ corresponding to CD enters the common area when ring-shaped zonal concave portions or ring-shaped zonal convex portions having that amount of step are provided, a light flux with working standard wavelength $\lambda_{02}$ that passes through the adjoining ring-shaped zonal concave portions or ring-shaped zonal convex portions is given an optical path difference in quantity of almost 4 times to emerge.

Therefore, a light flux with working wavelength $\lambda_{11}$ that has passed through adjoining ring-shaped zonal optical functional surfaces has an optical path difference of 5×$\lambda_{12}$, but its light utilization efficiency-can be enhanced because phases agree with each other on the light-converged spot of DVD 221. Further, a light flux with working wavelength $\lambda_{12}$ that has passed through adjoining ring-shaped zonal optical functional surfaces has an optical path difference of 4×$\lambda_{12}$, but its light utilization efficiency can be enhanced because phases agree with each other on the light-converged spot of CD 222.

The light utilization efficiency of the light flux with working wavelength $\lambda_{12}$ to be converged on CD 222 in the occasion where ring-shaped zonal concave portions or ring-shaped zonal convex portions having an amount of step that generates a light flux having an optical path difference in quantity of about 5 times that of the working standard wavelength $\lambda_{01}$ are provided is greater than that of the light flux to be converged on CD 222 in the occasion where ring-shaped zonal concave portions or ring-shaped zonal convex portions having an amount of step that generates a light flux having an optical path difference in quantity of about 1 time that of the conventional working standard wavelength $\lambda_{01}$ are provided. Namely, with respect to the light utilization efficiency, that in the structure to generate a light flux having an optical path difference in quantity of about 5 times that of working standard wavelength $\lambda_{01}$ is greater than that in the structure to generate a light flux having an optical path difference in quantity of about 1 time that of working standard wavelength $\lambda_{01}$. Further, when providing ring-shaped zonal concave portions or ring-shaped zonal convex portions, it is possible to make the number of ring-shaped zonal concave portions or of ring-shaped zonal convex portions to be less than the number of ring-shaped zonal optical functional surfaces S1 in the case of providing diffractive structure portion S, and thereby to make a light-converging optical system to be easy.

Incidentally, common area portion 241a is provided on objective lens 214 in the structure of the present embodiment, to which, however, the invention is not limited. For example, it is also possible to employ the structure wherein an objective lens having no common area portion and a separate coupling lens having a common area portion are provided. In this case, it is possible to make objective lens 214 to have another correction effect by providing, on the objective lens 214, ring-shaped zonal optical functional surfaces and a step surface which are different respectively from the ring-shaped zonal optical functional surfaces S1 and the step surface S2. Further, an ordinary and inexpensive objective lens having neither ring-shaped zonal optical functional surfaces nor step surfaces can be used. It is also possible to employ the structure that uses a light-converging optical system wherein an objective lens having no common area portion and a coupling lens having a common area portion are integrated solidly.

The embodiments of the invention have been explained above. However, the invention is not always limited only to the aforementioned means and methods in the embodiments, and modifications may be made according to circumstances within a range that objects of the invention are attained and effects of the invention are exhibited.

Fourth Embodiment

To solve the problems mentioned above, the invention described in Item (4-1) is an optical pickup device that conducts reproducing and/or recording of various pieces of information by converging a light flux with first wavelength $\lambda_1$ (630 nm≦$\lambda_1$≦680 nm) emitted from the first light source on the first optical information recording medium with protective base board thickness t1 and by converging a light flux with second wavelength $\lambda_2$ (760 nm≦$\lambda_2$≦810 nm) emitted from the second light source on the second optical information recording medium with protective base board thickness t2 (t2>t1), with a light-converging optical system having plural optical elements including an objective optical element, wherein optical system magnifications m1 and m2 respectively for the light flux with first wavelength λ1 and the light flux with second wavelength λ2 of the objective optical element satisfy respectively m1≠0 and m2≠0, a plurality of ring-shaped zonal optical functional surfaces having centers on the optical axis are formed continuously through step surfaces on at least an optical surface on one side of at least one of the optical elements, a common area where a refracted light of the light flux with the first wavelength λ1 and a refracted light of the light flux with second wavelength λ2 both generated by the plural ring-shaped zonal optical functional surfaces are converged on an information recording surface of a prescribed optical information recording medium is provided, and $0.8 \times COMA_2 \leq COMA_1 \leq 1.2 \times COMA_2$ is satisfied under the assumption that $COMA_1$ (λ1 rms) represents coma of wave-front aberration of a light-converged spot formed on an information recording surface of the first optical information recording medium by the light flux with first wavelength λ1 that enters the light-converging optical system obliquely at an angle of view of 1°, and $COMA_2$ (λ2 rms) represents coma of wave-front aberration of a light-converged spot formed on an information recording surface of the second optical information recording medium by the light flux with second wavelength λ2 that enters the light-converging optical system obliquely at an angle of view of 10°.

On at least one optical surface of at least one optical element among plural optical elements constituting the light-converging optical system, there is formed a common area for emitting a light flux with first wavelength λ1 and a light flux with second wavelength λ2 as refracted light and converging them on an information recording surface of the prescribed optical information recording medium, and a ring-shaped optical functional surface is formed on the common area.

The ring-shaped optical functional surface is represented by ring-shaped zones which are substantially concentric circles on a surface of the optical element having centers on the optical axis. Adjoining ring-shaped optical functional surfaces are formed, continuously through step surfaces in the radial direction.

Though a phase difference corresponding to the dimension of the step surface is given to the light flux passing through each ring-shaped optical functional surface, the ring-shaped optical functional surface in the present invention has no function to diffract an incident light flux although it has a function to refract the incident light flux.

The ring-shaped optical functional surface has only to be formed on at least a common area, and it may also be formed on a portion other than the common area on one optical surface. Ring-shaped optical functional surfaces may further be formed on plural optical functional surfaces of a plurality of optical elements.

Therefore, for example, the ring-shaped optical functional surface may be formed on an optical surface closer to the light source or on an optical surface closer to the optical information recording medium provided on an objective lens representing an optical element, and it is further possible to form a ring-shaped optical functional surface on each of plural optical surfaces of the optical element constituting the optical pickup device, such as forming a ring-shaped optical functional surface on each optical surface.

In the invention described in Item (4-1), optical system magnifications m1 and m2 respectively for the light flux with first wavelength λ1 used mainly for DVD and the light flux with second wavelength λ2 used mainly for CD for the objective optical element satisfy respectively m1≠0 and m2≠0, namely, in the optical pickup device of a finite type where a light flux with each wavelength enters as a divergent light or a convergent light for the objective optical element, the light flux with each wavelength passing through a common area of the optical element is emitted to the optical information recording medium as refracted light.

Further, the light-converging optical system is established so that coma $COMA_1$ of wave-front aberration of a light-converged spot formed on an information recording surface of the first optical information recording medium by the light flux with first wavelength λ1 that enters the light-converging optical system obliquely at an angle of view of 1° may be within a range of $0.8 \times COMA_2 \leq COMA_1 \leq 1.2 \times COMA_2$ for coma $COMA_2$ (λ2 rms) of wave-front aberration of a light-converged spot formed on an information recording surface of the second optical information recording medium by the light flux with second wavelength λ2 that enters the light-converging optical system obliquely at an angle of view of 1°.

In the optical pickup device of a finite type, therefore, off-axis coma in reproducing and/or recording for both CD and DVD can be corrected properly, and deterioration of optical performances in tracking, for example, can be prevented in advance. Further, positioning of an objective lens in the course of incorporating an optical pickup device is easy, thus, productivity can be improved and deterioration of optical performances on an aging change basis caused by wear of the mechanism for moving various types of lenses and a light source can be prevented.

Further, an optical element such as a collimator lens which has been used in a conventional infinite type optical pickup device to collimate a light flux emitted from the light source into parallel light so that the light flux may enter the objective optical element, turns out to be unnecessary, and downsizing and low cost of the device can be attained.

The optical pickup device described in Item (4-2) is the optical pickup device described in Item (4-1), wherein the number of ring-shaped zonal optical functional surfaces formed on at least one optical surface of the optical element is either one of 4-30.

In the optical pickup device described in Item (4-2), the same effects as those in Item (4-1) can be obtained and the number of the ring-shaped zonal optical functional surfaces and step surfaces can be restricted to a certain number or less, and therefore, an amount of light entering the portion other than the ring-shaped zonal optical functional surface (step surface and-others) among divergent or convergent light entering the optical surface can be controlled, which prevents a decline of an amount of light.

The optical pickup device described in Item (4-3) is the optical pickup device described in Item (4-1) or Item (4-2), wherein the optical element provided with the common area is a coupling lens.

In the optical pickup device described in Item (4-3), the same effects as those in Item (4-1) or Item (4-2) can be obtained, and it is not necessary to arrange an optical element for providing a common area, by providing a common area on the coupling lens constituting a light-converging optical system, which makes it possible to reduce the number of parts of the optical pickup device.

The optical pickup device described in Item (4-4) is the optical pickup device described in either one of Items (4-1)-(4-3), wherein the optical element provided with the common area is the objective optical element.

In the optical pickup device described in Item (4-4), the same effects as those in either one of Items' (4-1)-(4-3) can be obtained, and it is not necessary to arrange an optical element for providing a common area, by providing a common area on the objective optical element constituting a light-converging optical system, which makes it possible to reduce the number of parts of the optical pickup device.

The optical pickup device described in Item (4-5) is the optical pickup device described in either one of Items (4-1)-(4-4), wherein the first light source and the second light source are united integrally.

In the optical pickup device described in Item (4-5), the same effects as those in either one of Items (4-1)-(4-4) can be obtained, and it is possible to make the optical elements to be common by making an optical path for the light flux with first wavelength λ1 and an optical path for the light flux with second wavelength λ2 to be the same by uniting the first light source and the second light source integrally, which makes it possible to reduce the number of parts of the optical pickup device.

The optical pickup device described in Item (4-6) is the optical pickup device described in either one of Items (4-1)-(4-5), wherein the optical system magnification m1 satisfies $-1/3 \leq m1 \leq 0$.

In the optical pickup device described in Item (4-6), the same effects as those in either one of Items (4-1)-(4-5) can be obtained, and a negative value of the optical system magnification is restricted to a certain number or more, namely, a distance from the light source to an information recording surface is restricted. In general, the smaller the magnification is, the more compact the optical pickup device is, but, the greater an absolute value of the magnification is, the greater the coma in tracking is, and the greater the deterioration of a light-converged spot is. Therefore, when a balance between them is considered, it is preferable that the optical system magnification m1 satisfies $-1/3 \leq m1 \leq 0$.

The optical pickup device described in Item (4-7) is the optical pickup device described in either one of Items (4-1)-(4-6), wherein the optical system magnification m2 satisfies $-1/3 \leq m2 \leq 0$.

In the optical pickup device described in Item (4-7), the same effects as those in either one of Items (4-1)-(4-6) can be obtained, and downsizing of the optical pickup device and prevention of deterioration of a light-converted spot are attained simultaneously.

The optical pickup device described in Item (4-8) is the optical pickup device described in either one of Items (4-1)-(4-7), wherein focal length f1 of the objective optical element for a light flux with first wavelength λ1 satisfies $f1 \leq 4$ mm.

In the optical pickup device described in Item (4-8), the same effects as those in either one of Items (4-1)-(4-7) can be obtained, and a distance from the objective optical element to the information recording surface is restricted, which makes it possible attain downsizing of the optical pickup device.

The optical pickup device described in Item (4-9) is the optical pickup device described in either one of Items (4-1)-(4-8), wherein focal length f2 of the objective optical element for a light flux with second wavelength λ2 satisfies $f2 \leq 4$ mm.

In the optical pickup device described in Item (4-9), the same effects as those in either one of Items (4-1)-(4-8) can be obtained, and a distance from the objective optical element to the information recording surface is restricted, which makes it possible attain downsizing of the optical pickup device.

The optical pickup device described in Item (4-10) is the optical pickup device described in either one of Items (4-1)-(4-9), wherein numerical aperture NA1 of a light-converged spot by a light flux with first wavelength λ1 satisfies $0.55 \leq NA1 \leq 0.67$.

The optical pickup device described in Item (4-11) is the optical pickup device described in either one of Items (4-1)-(4-10), wherein numerical aperture NA2 of a light-converged spot by a light flux with second wavelength λ2 satisfies $0.44 \leq NA2 \leq 0.55$.

The optical pickup device described in Item (4-12) is the optical pickup device described in either one of Items (4-1)-(4-11), wherein $COMA_1$ satisfies $COMA_1 \leq 0.040$ (λ1 rms).

The optical pickup device described in Item (4-13) is the optical pickup device described in either one of Items (4-1)-(4-12), wherein $COMA_2$ satisfies $COMA_2 \leq 0.040$ (λ2 rms).

The optical pickup device described in Item (4-14) is the optical pickup device described in either one of Items (4-1)-(4-13), wherein phase difference P1 that is caused when a light flux with first wavelength λ1 passes through the ring-shaped zonal optical functional surface satisfies $0.2 \times 2\pi \leq P1$, and phase difference P2 that is caused when a light flux with second wavelength λ2 passes through the ring-shaped zonal optical functional surface satisfies $0.2 \times 2\pi \leq P2$.

The light converging system described in Item (4-15) is a light-converging optical system of the optical pickup device having a plurality of optical elements including an objective optical element and conducting reproducing and/or recording of various pieces of information by converging a light flux with first wavelength λ1 (630 nm $\leq$ λ1 $\leq$ 680 nm) emitted from the first light source on the first optical information recording medium with protective base board thickness t1 and by converging a light flux with second wavelength λ2 (760 nm $\leq$ λ2 $\leq$ 81.0 nm) emitted from the second light source on the second optical information recording medium with protective base board thickness t2 (t2>t1), wherein optical system magnifications m1 and m2 respectively *for the light flux with first wavelength λ1 and the light flux with second wavelength λ2 of the objective optical element satisfy respectively m1≠0 and m2≠0, a plurality of ring-shaped zonal optical functional surfaces having centers on the optical axis are formed continuously through step surfaces on at least an optical surface on one side of at least one of the optical elements, a common area where a refracted light of the light flux with the first wavelength λ1 and a refracted light of the light flux with second wavelength λ2 both generated by the plural ring-shaped zonal optical functional surfaces are converged on an information recording surface of a prescribed optical information recording medium is provided, and $0.8 \times COMA_2 \leq COMA_1 1.2 \times \leq COMA_2$ is satisfied under the assumption that $COMA_1$ (λ1 rms) represents coma of wave-front aberration of a light-converged spot formed on an information recording surface of the first optical information recording medium by the light flux with first wavelength λ1 that enters obliquely at an angle of view of 1°, and $COMA_2$ (λ2 rms) represents coma of wave-front aberration of a light-converged spot formed on an information recording surface of the second optical information recording medium by the light flux with second wavelength λ2 that enters the light-converging optical system obliquely at an angle of view of 1°.

In the light converging system described in Item (4-15), optical system magnifications m1 and m2 respectively for the light flux with first wavelength λ1 used mainly for DVD and the light flux with second wavelength λ2 used mainly for CD for the objective optical element satisfy respectively m1≠0 and m2≠0, namely, in the optical pickup device of a finite type where a light flux with each wavelength enters as a divergent light or a convergent light for the objective optical element, the light flux with each wavelength passing through a common area of the optical element is emitted to the optical information recording medium as refracted light.

Further, the light-converging optical system is established so that coma $COMA_1$ of wave-front aberration of a light-converged spot formed on an information recording surface of the first optical information recording medium by the light flux with first wavelength λ1 that enters the light-converging optical system obliquely at an angle of view of 1° may be within a range of $0.8 \times COMA_2 \leq COMA_1 1.2 \times \leq COMA_2$ for coma $COMA_2$ (λ2 rms) of wave-front aberration of a light-converged spot formed on an information recording surface of the second optical information recording medium by the light flux with second wavelength λ2 that enters the light-converging optical system obliquely at an angle of view of 1°.

In the optical pickup device of a finite type, therefore, off-axis coma in reproducing and/or recording for both CD and DVD can be corrected properly, and deterioration of optical performances in tracking, for example, can be prevented in advance. Further, positioning of an objective lens in the course of incorporating an optical pickup device is easy, thus, productivity can be improved and deterioration of optical performances on an aging change basis caused by wear of the mechanism for moving various types of lenses and a light source can be prevented.

Further, an optical element such as a collimator lens which has been used in a conventional infinite type optical pickup device to collimate a light flux emitted from the light source into parallel light so that the light flux may enter the objective optical element, turns out to be unnecessary, and downsizing and low cost of the device can be attained.

The light converging system described in Item (4-16) is the light-converging optical system described in Item (4-15), wherein the number of ring-shaped zonal optical functional surfaces formed on at least one optical surface of the optical element is either one of 4-30.

In the light converging system described in Item (4-16), the same effects as those in Item (4-15) can be obtained and the number of the ring-shaped zonal optical functional surfaces and step surfaces can be restricted to a certain number or less, and therefore, an amount of light entering the portion other than the ring-shaped zonal optical functional surface (step surface and others) among divergent or convergent light entering the optical surface can be controlled, which prevents a decline of an amount of light.

The light converging system described in Item (4-17) is the light-converging optical system described in Item (4-15) or Item (4-16), wherein the optical element provided with the common area is a coupling lens.

In the light converging system described in Item (4-17), the same effects as those in Item (4-15) or Item (4-16) can be obtained, and it is not necessary to arrange an optical element for providing a common area, by providing a common area on the coupling lens constituting a light-converging optical system, which makes it possible to reduce the number of parts of the optical pickup device.

The light converging system described in Item (4-18) is the light-converging optical system described in either one of Items (4-15)-(4-17), wherein the optical element provided with the common area is the objective optical element.

In the light converging system described in Item (4-18), the same effects as those in either one of Items 14-15)-(4-17) can be obtained, and it is not necessary to arrange newly an optical element for providing thereon a common area, by providing a common area on the objective optical element constituting a light-converging optical system, which makes it possible to reduce the number of parts of the optical pickup device.

The light converging system described in Item (4-19) is the light-converging optical system described in either one of Items (4-15)-(4-18), wherein the first light source and the second light source are united integrally.

In the light converging system described in Item (4-19), the same effects as those in either one of Items (4-15)-(4-18) can be obtained, and it is possible to make the optical elements to be common by making an optical path for the light flux with first wavelength λ1 and an optical path for the light flux with second wavelength λ2 to be the same by uniting the first light source and the second light source integrally, which makes it possible to reduce the number of parts of the optical pickup device.

The light converging system described in Item (4-20) is the light-converging optical system described in either one of Items (4-15)-(4-19), wherein the optical system magnification m1 satisfies $-1/3 \leq m1 \leq 0$.

In the light converging system described in Item (4-20), the same effects as those in either one of Items (4-15)-(4-19) can be obtained, and a negative value of the optical system magnification is restricted to a certain number or more, namely, a distance from the light source to an information recording surface is restricted. In general, the smaller the magnification is, the more compact the optical pickup device is, but, the greater an absolute value of the magnification is, the greater the coma in tracking is, and the greater the deterioration of a light-converged spot is. Therefore, when a balance between them is considered, it is preferable that the optical system magnification m1 satisfies $-1/3 \leq m1 \leq 0$.

The light converging system described in Item (4-21) is the light-converging optical system described in either one of Items (4-15)-(4-20), wherein the optical system magnification m2 satisfies $-1/3 \leq m2 \leq 0$.

In the light converging system described in Item (4-21), the same effects as those in either one of Items (4-15)-(4-20) can be obtained, and downsizing of the optical pickup device and prevention of deterioration of a light-converted spot are attained simultaneously.

The light converging system described in Item (4-22) is the light-converging optical system described in either one of Items (4-15)-(4-21), wherein focal length f1 of the objective optical element for a light flux with first wavelength λ1 satisfies $f1 \leq 4$ mm.

In the light converging system described in Item (4-22), the same effects as those in either one of Items (4-15)-(4-21) can be obtained, and a distance from the objective optical element to the information recording surface is restricted, which makes it possible attain downsizing of the optical pickup device.

The light converging system described in Item (4-23) is the light-converging optical system described in either one of Items (4-15)-(4-22), wherein focal length f2 of the objective optical element for a light flux with second wavelength λ2 satisfies $f2 \leq 4$ mm.

In the light converging system described in Item (4-23), the same effects as those in either one of Items (4-15)-(4-22) can be obtained, and a distance from the objective optical element to the information recording surface is restricted, which makes it possible attain downsizing of the optical pickup device.

The light converging system described in Item (4-24) is the light-converging optical system described in either one of Items (4-15)-(4-23), wherein numerical aperture NA1 of a light-converged spot by a light flux with first wavelength λ1 satisfies $0.55 \leq NA1 \leq 0.67$.

The light converging system described in Item (4-25) is the light-converging optical system described in either one of Items (4-15)-(4-24), wherein numerical aperture NA2 of a light-converged spot by a light flux with second wavelength λ2 satisfies $0.44 \leq NA2 \leq 0.55$.

The light converging system described in Item (4-26) is the light-converging optical system described in either one of Items (4-15)-(4-25), wherein $COMA_1$ satisfies $COMA_1 \leq 0.040$ ($\lambda 1$ rms).

The light converging system described in Item (4-27) is the light-converging optical system described in either one of Items (4-15)-(4-26), wherein $COMA_2$ satisfies $COMA_2 \leq 0.040$ ($\lambda 2$ rms).

The light converging system described in Item (4-28) is the light-converging optical system described in either one of Items (4-15)-(4-27), wherein phase difference P1 that is caused when a light flux with first wavelength $\lambda 1$ passes through the ring-shaped zonal optical functional surface satisfies $0.2 \times 2\pi \leq P1$, and phase difference P2 that is caused when a light flux with second wavelength $\lambda 2$ passes through the ring-shaped zonal optical functional surface satisfies $0.2 \times 2\pi \leq P2$.

The objective optical element described in Item (4-29) is an objective optical element of the optical pickup device conducting, by means of a light-converging optical system having plural optical elements, reproducing and/or recording of various pieces of information by converging a light flux with first wavelength $\lambda 1$ (630 nm$\leq \lambda 1 \leq$680 nm) emitted from the first light source on the first optical information recording medium with protective base board thickness t1 and by converging a light flux with second wavelength $\lambda 2$ (760 nm$\leq \lambda 2 \leq$810 nm) emitted from the second light source on the second optical information recording medium with protective base board thickness t2 (t2>t1), wherein optical system magnifications m1 and m2 respectively for the light flux with first wavelength $\lambda 1$ and for the light flux with second wavelength $\lambda 2$ satisfy respectively m1≠0 and m2≠0, a plurality of ring-shaped zonal optical functional surfaces having centers on the optical axis are formed continuously through step surfaces on at least an optical surface on one side, a common area where a refracted light of the light flux with the first wavelength $\lambda 1$ and a refracted light of the light flux with second wavelength $\lambda 2$ both generated by the plural ring-shaped zonal optical functional surfaces are converged on an information recording surface of a prescribed optical information recording medium ]] is provided, and $0.8 \times COMA_2 \leq COMA_1 \leq 1.2 \times COMA_2$ is satisfied under the assumption that $COMA_1$ ($\lambda 1$ rms) represents coma of wave-front aberration of a light-converged spot formed on an information recording surface of the first optical information recording medium by the light flux with first wavelength $\lambda 1$ that enters the light-converging optical system obliquely at an angle of view of 1°, and $COMA_2$ ($\lambda 2$ rms) represents coma of wave-front aberration of a light-converged spot formed on an information recording surface of the second optical information recording medium by the light flux with second wavelength $\lambda 2$ that enters the light-converging optical system obliquely at an angle of view of 1°.

In the objective optical element described in Item (4-29), optical system magnifications m1 and m2 respectively for the light flux with first wavelength $\lambda 1$ used mainly for DVD and the light flux with second wavelength $\lambda 2$ used mainly for CD for the objective optical element satisfy respectively m1≠0 and m2≠0, namely, in the optical pickup device of a finite type where a light flux with each wavelength enters as a divergent light or a convergent light for the objective optical element, the light flux with each wavelength passing through a common area of the optical element is emitted to the optical information recording medium as refracted light.

Further, the light-converging optical system is established so that coma $COMA_1$ of wave-front aberration of a light-converged spot formed on an information recording surface of the first optical information recording medium by the light flux with first wavelength $\lambda 1$ that enters the light-converging optical system obliquely at an angle of view of 1° may be within a range of $0.8 \times COMA_2 \leq COMA_1 \leq 1.2 \times COMA_2$ for coma $COMA_2$ ($\lambda 2$ rms) of wave-front aberration of a light-converged spot formed on an information recording surface of the second optical information recording medium by the light flux with second wavelength $\lambda 2$ that enters the light-converging optical system obliquely at an angle of view of 1°.

In the optical pickup device of a finite type, therefore, off-axis coma in reproducing and/or recording for both CD and DVD can be corrected properly, and deterioration of optical performances in tracking, for example, can be prevented in advance. Further, positioning of an objective lens in the course of incorporating an optical pickup device is easy, thus, productivity can be improved and deterioration of optical performances on an aging change basis caused by wear of the mechanism for moving various types of lenses and a light source can be prevented.

Further, an optical element such as a collimator lens which has been used in a conventional infinite type optical pickup device to collimate a light flux emitted from the light source into parallel light so that the light flux may enter the objective optical element, turns out to be unnecessary, and downsizing and low cost of the device can be attained.

The objective optical element described in Item (4-30) is the objective optical element described in Item (4-29), wherein the number of ring-shaped zonal optical functional surfaces is either one of 4-30.

In the objective optical element described in Item (4-30), the same effects as those in Item (4-29) can be obtained and the number of the ring-shaped zonal optical functional surfaces and step surfaces can be restricted to a certain number or less, and therefore, an amount of light entering the portion other than the ring-shaped zonal optical functional surface (step surface and others) among divergent or convergent light entering the optical surface can be controlled, which prevents a decline of an amount of light.

The objective optical element described in Item (4-31) is the objective optical element described in Item (4-29) or Item (4-30), wherein the first light source and the second light source are united integrally.

In the objective optical element described in Item (4-31), the same effects as those in Item (4-29) or Item (4-30) can be obtained, and it is possible to make the optical elements to be common by making an optical path for the light flux with first wavelength $\lambda 1$ and an optical path for the light flux with second wavelength $\lambda 2$ to be the same by uniting the first light source and the second light source integrally, which makes it possible to reduce the number of parts of the optical pickup device.

The objective optical element described in Item (4-32) is the objective optical element described in either one of Items (4-29)-(4-31), wherein the optical system magnification m1 satisfies $-1/3 \leq m1 \leq 0$.

In the objective optical element described in Item (4-32), the same effects as those in either one of Items (4-29)-(4-31) can be obtained, and a negative value of the optical system magnification is restricted to a certain number or more, namely, a distance from the light source to an information recording surface is restricted. In general, the smaller the magnification is, the more compact the optical pickup device is, but, the greater an absolute value of the magnification is, the greater the coma in tracking is, and the greater the deterioration of a light-converged spot is. Therefore, when a balance between them is considered, it is preferable that the optical system magnification m1 satisfies $-1/3 \leq m1 \leq 0$.

The objective optical element described in Item (4-32) is the objective optical element described in either one of Items (4-29)-(4-32), wherein the optical system magnification m2 satisfies $-1/3 \leq m2 \leq 0$.

In the objective optical element described in Item (4-33), the same effects as those in either one of Items (4-29)-(4-32) can be obtained, and downsizing of the optical pickup device and prevention of deterioration of a light-converted spot are attained simultaneously.

The objective optical element described in Item (4-34) is the objective optical element described in either one of Items (4-29)-(4-33), wherein focal length f1 for the light flux with first wavelength $\lambda 1$ satisfies $f1 \leq 4$ mm.

In the objective optical element described in Item (4-34), the same effects as those in either one of Items (4-29)-(4-33) can be obtained, and a distance from the objective optical element to the information recording surface is restricted, which makes it possible attain downsizing of the optical pickup device.

The objective optical element described in Item (4-35) is the objective optical element described in either one of Items (4-29)-(4-34), wherein focal length f2 for the light flux with second wavelength $\lambda 2$ satisfies $f2 \leq 4$ mm.

In the objective optical element described in Item (4-35), the same effects as those in either one of Items (4-29)-(4-34) can be obtained, and a distance from the objective optical element to the information recording surface is restricted, which makes it possible attain downsizing of the optical pickup device.

The objective optical element described in Item (4-36) is the objective optical element described in either one of Items (4-29)-(4-35), wherein numerical aperture NA1 of a light-converged spot by a light flux with first wavelength $\lambda 1$ satisfies $0.55 \leq NA1 \leq 0.67$.

The objective optical element described in Item (4-37) is the objective optical element described in either one of Items (4-29)-(4-36), wherein numerical aperture NA2 of a light-converged spot by a light flux with second wavelength $\lambda 2$ satisfies $0.44 \leq NA2 \leq 0.55$.

The objective optical element described in Item (4-38) is the objective optical element described in either one of Items (4-29)-(4-37), wherein $COMA_1$ satisfies $COMA_1 \leq 0.040$ ($\lambda 1$ rms).

The objective optical element described in Item (4-39) is the objective optical element described in either one of Items (4-29)-(4-38), wherein $COMA_2$ satisfies $COMA_2 \leq 0.040$ ($\lambda 2$ rms).

The objective optical element described in Item (4-40) is the objective optical element described in either one of Items (4-29)-(4-39), wherein phase difference P1 that is caused when a light flux with first wavelength $\lambda 1$ passes through the ring-shaped zonal optical functional surface satisfies $0.2 \times 2\pi \leq P1$, and phase difference P2 that is caused when a light flux with second wavelength $\lambda 2$ passes through the ring-shaped zonal optical functional surface satisfies $0.2 \times 2\pi \leq P2$.

The fourth embodiment of an optical pickup device, a light-converging optical system and an objective optical element of the invention will be explained as follows, referring to the drawings.

Figure 18:
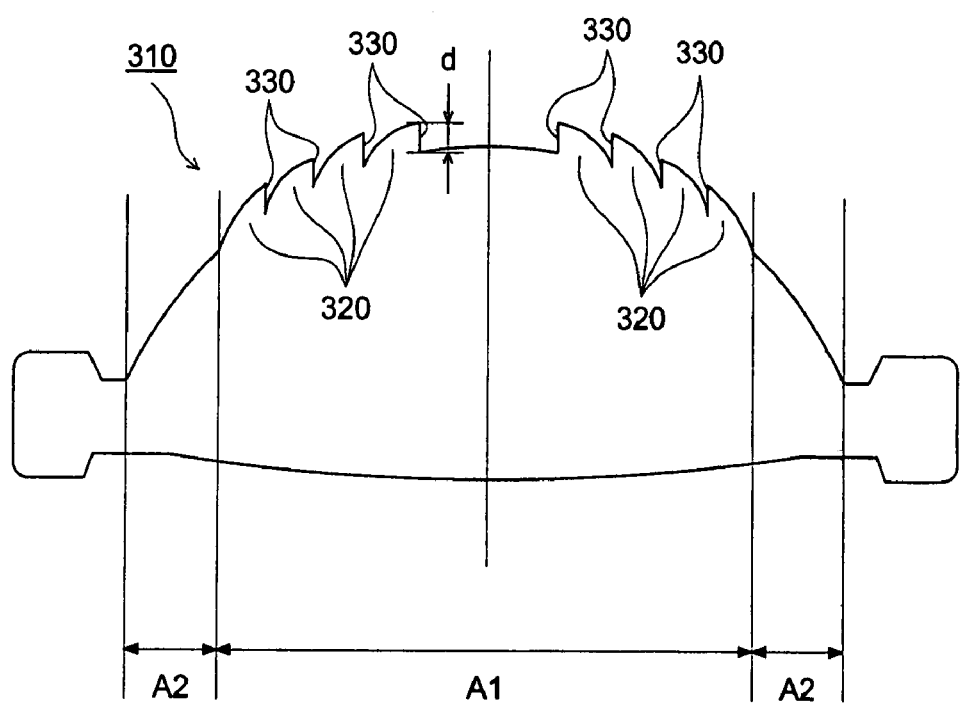
FIG. 18 is a side view of primary portions showing an example of the objective optical element relating to the fourth embodiment.
Figure 19:
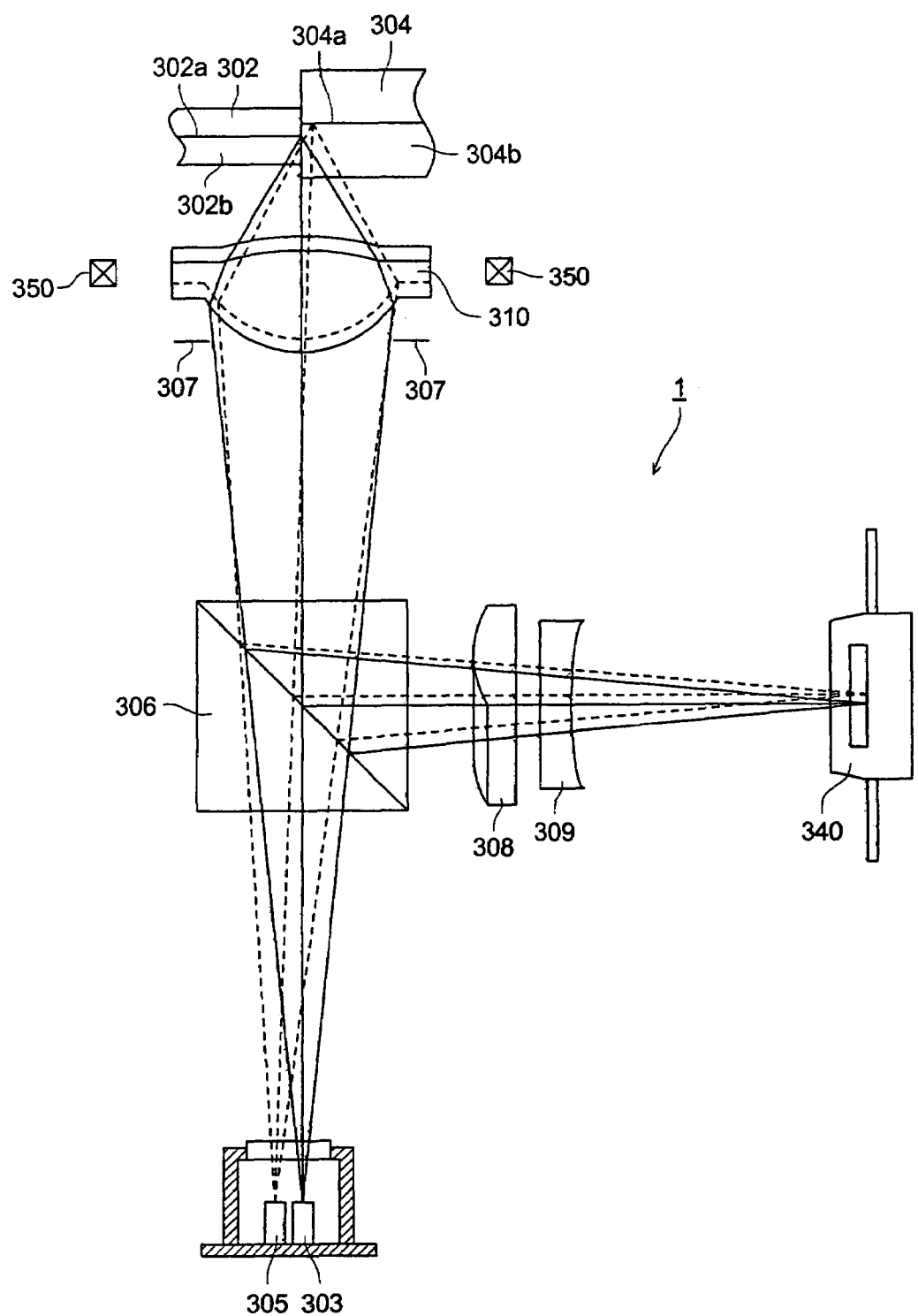
FIG. 19 is a top view showing the light-converging optical system and the optical pickup device.

As shown in FIG. 18 and FIG. 19, objective lens 310 representing an objective optical element is a single lens that constitutes a light-converging optical system of optical pickup device 1 and has on its both sides an aspheric surface. On an optical surface of the objective lens 310 on one side (closer to the light source), there is provided ring-shaped zonal optical functional surface 320 in a range with a certain height from optical axis L (hereinafter referred to as "common area A1"). Incidentally, a form of a range other than the common area A1 (hereinafter referred to as "peripheral area A2") is not restricted in particular.

To be concrete, ring-shaped zonal optical functional surfaces 320 having centers on optical axis L are formed on central area A1 continuously in the radial direction through step surfaces 330.

The number of the ring-shaped zonal optical functional surfaces 320 formed on the common area A1 is not limited in particular, and it can be modified properly in accordance with a thickness of protective base board 302b or 304b. However, it is preferable that the number is within a range of 4-30, from the viewpoint of prevention of a decline of an amount of emerging light and from the viewpoint of easy manufacture of objective lens 310.

Dimension d (a depth in the direction of optical axis L) of step surface 330 that is present between two ring-shaped zonal optical functional surfaces 320 adjoining each other in the radial direction is established so that a light flux with wavelength $\lambda 1$ or a light flux with wavelength $\lambda 2$, or both of them may emerge respectively to optical information recording media 302 and 304 as refracted light under the condition that a prescribed phase difference is given to each of them, when they pass through each ring-shaped zonal optical functional surface 320.

Optical pickup device 1 is one to record information on information recording surface 302a of the first optical information recording medium 302 or on information recording surface 304a of the second optical information recording medium 304, or to read information recorded, through a light-converging optical system, by emitting a light flux with wavelength $\lambda 1$ (=655 nm) from the first semiconductor laser 303 (light source) to the first optical information recording medium 302 (DVD in the present embodiment) representing an optical information recording medium, and by emitting a light flux with wavelength $\lambda 2$ (=785 nm) from the second semiconductor laser 305 (light source) to the second optical information recording medium 304 (CD in the present embodiment).

In the present embodiment, the light-converging optical system is composed of objective lens 310, beam splitter 306 and diaphragm 307.

Incidentally, the first semiconductor laser 303 and the second semiconductor laser 305 are unitized (integrally) as a light source.

When recording or reproducing information for DVD, divergent light with wavelength $\lambda 1$ emitted from the first semiconductor laser 303 passes through beam splitter 306 to be stopped down by diaphragm 307, and passes through common area A1 and peripheral area A2 of objective lens 310, as shown with solid lines in FIG. 19. Then, the light flux with wavelength $\lambda 1$ which has passed through the common area A1 and the peripheral area A2 is converged as refracted light on information recording surface 302a through protective base board 302b of DVD.

Then, the light flux modulated by information pits and reflected on the information recording surface 302a passes again through objective lens 310 and diaphragm 307 to be reflected by mean splitter 306, and then; is given astigmatism by cylindrical lens 308, to enter photodetector 340 through concave lens 309, thus, signals outputted from photodetector 340 are used to obtain signals for reading information recorded on DVD.

When recording or reproducing information for CD, divergent light with wavelength $\lambda 2$ emitted from the second semiconductor laser 305 passes through beam splitter 306 to be stopped down by diaphragm 307, and passes through common area A1 and peripheral area A2 of objective lens 310, as shown with broken lines in FIG. 19. In this case, the light flux with wavelength λ2 which has passed through the common area A1 is converged as refracted light on information recording surface 304a through protective base board 304b of CD. However, the light flux with wavelength λ2 which has passed through the peripheral area A2 arrives at a portion other than the information recording surface 304a through protective base board 304b of CD, and does not contribute to reproducing and/or recording of information.

Then, the light flux modulated by information pits and reflected on the information recording surface 304a passes again through objective lens 310 and diaphragm 307 to be reflected by mean splitter 306, and then, is given astigmatism by cylindrical lens 308, to enter photodetector 340 through concave lens 309, thus, signals outputted from photodetector 340 are used to obtain signals for reading information recorded on CD.

Further, changes in an amount of light caused by changes in a form of a spot and changes in a position on photodetector 340 are detected to conduct focusing detection and tracking detection. Based on the results of the detection, two-dimensional actuator 350 moves objective lens 310 so that a light flux emitted from the first semiconductor laser 303 or a light flux emitted from the second semiconductor laser 305 may form an image on information recording surface 302a of DVD or on information recording surface 304a of CD, and moves objective lens 310 so that an image may be formed on a prescribed track.

Forms and dimensions of each optical element constituting a light-converging optical system are designed so that a condition of $0.8 \times COMA_2 \leq COMA_1 \leq 1.2 \times COMA_2$ may be satisfied when $COMA_1$ (λ1 rms) represents coma of wave-front aberration of a light-converged spot that is formed on information recording surface 302a of the first optical information recording medium 302 when the light flux with first wavelength λ1 enters the light-converging optical system obliquely at an angle of view of 1°, and $COMA_2$ (λ2 rms) represents coma of wave-front aberration of a light-converged spot formed on information recording surface 304a of the second optical information recording medium 304 when the light flux with second wavelength λ2 enters the light-converging optical system obliquely at an angle of view of 1°.

Incidentally, $COMA_i$ equals to ((third order coma in the case of expressing wavefront aberration of a light flux with $i^{th}$ wavelength λi with Zernike polynomial expression)$^2$+(fifth order coma in the case of expressing wavefront aberration of a light flux with $i^{th}$ wavelength λI with Zernike polynomial expression)$^2$)$^{1/2}$ wherein i is 1 or 2.

Incidentally, a design method for a light-converging optical system satisfying the aforementioned condition is well-known, and an explanation thereof will be omitted.

For example, when the aforementioned coma $COMA_2$ of wavefront aberration of a light-converged spot formed on information recording surface 304a of CD has proved to be 0.030 (λ2 rms), when a light flux with wavelength λ2 (785 nm) is caused to enter a light-converging optical system for CD, the light-converging optical system is designed so that a light flux with wavelength λ1 (655 nm) for DVD is made to enter the light-converging optical system at an angle of view of 1°, and the aforesaid coma $COMA_1$ of wavefront aberration on a light-converged spot formed on information recording surface 302a of DVD may be within a range of 0.8×0.030 (λ2 rms)–1.2×0.030 (λ2 rms).

In the optical pickup device of a finite type having compatibility for DVD and CD in the invention, a light flux with each wavelength passing through a common area of an optical element is projected on an optical information recording medium as refracted light.

Further, the light-converging optical system is designed so that coma $COMA_1$ of wave-front aberration of a light-converged spot formed on an information recording surface of the first optical information recording medium by the light flux with first wavelength λ1 that enters the light-converging optical system obliquely at an angle of view of 1° may be within a range of $0.8 \times COMA_2 \leq COMA_1 \leq 1.2 \times COMA_2$ for coma $COMA_2$ (λ2 rms) of wave-front aberration of a light-converged spot formed on an information recording surface of the second optical information recording medium by the light flux with second wavelength λ2 that enters the light-converging optical system obliquely at an angle of view of 1°.

In the optical pickup device of a finite type, therefore, off-axis coma in reproducing and/or recording for both CD and DVD can be corrected properly, and deterioration of optical performances in tracking, for example, can be prevented in advance. Further, positioning of an objective lens in the course of incorporating an optical pickup device is easy, thus, productivity can be improved and deterioration of optical performances on an aging change basis caused by wear of the mechanism for moving various types of lenses and a light source can be prevented.

What is claimed is:
1. An objective optical element for use in an optical pickup apparatus which is provided with a first light source of a wavelength λ1, a second light source of a wavelength λ2 (λ1<λ2) and a light converging optical system including a magnification changing element and the objective optical element,
wherein the light converging optical system converges a light flux from the first light source onto an information recording plane of a first optical information recording medium through a protective substrate having a thickness t1 so that recording and/or reproducing information is conducted for the first optical information recording medium and the light converging optical system converges a light flux from the second light source onto an information recording plane of a second optical information recording medium through a protective substrate having a thickness t2 (t1 ≦t2) so that recording and/or reproducing information is conducted for the second optical information recording medium,
wherein the objective optical element has an optical magnification m1 (m1≠0) for a light flux having the first wavelength λ1 and an optical magnification m2 (m2≠0) for a light flux having the second wavelength λ2,
wherein the objective optical element comprises on at least one surface:
a common region through which the light flux having the first wavelength λ1 and the light flux having the second wavelength λ2 pass in common so as to form a converged light spot on the information recording plane of the first optical information recording medium and on the information recording plane of the second optical information recording medium, respectively;
an exclusive region through which the light flux having the first wavelength λ1 passes so as to form a converged light spot on the information recording plane of the first optical information recording medium and the light flux having the second wavelength λ2 passes so as not to form a converged light spot on the information recording plane of the second optical information recording medium, wherein the exclusive region includes an exclusive diffractive structure having a function to suppress an increase of spherical aberration due to a raise of atmospheric temperature in accordance with a wavelength fluctuation of the light flux having the first wavelength λ1 when the light flux having the first wavelength λ1 having passed through the exclusive diffractive structure is converged on the information recording plane of the first optical information recording medium, wherein the light flux having the second wavelength λ2 having passed through the exclusive diffractive structure intersects with the optical axis at a position different from the position of the converged light spot formed on the information recording plane of the second optical information recording medium, and wherein the optical magnifications m1 and m2 satisfy the following formula:

$$|m1-m2|<0.5.$$

2. The objective optical element of claim 1, wherein the common region includes a common diffractive structure having a correcting function to reduce a difference between a first spherical aberration when the light flux of the first wavelength λ1 having passed trough the common diffractive structure is converged on the information recording plane of the first optical information recording medium through the protective substrate having the thickness ti and a second spherical aberration when the light flux of the second wavelength λ2 passing through the common diffractive structure is converged on the information recording plane of the second optical information recording medium through the protective substrate having the thickness t2 by the change of the diffractive function caused in accordance with a wavelength difference between the first wavelength λ1 and the second wavelength λ2.

3. The objective optical element of claim 2, wherein the common region is divided by a stepped portion stepped in the optical axis direction into a first ring-shaped region and a second ring-shaped region around the center on the optical axis, and wherein the first ring-shaped region located closer to the optical axis includes a refractive surface and the second region located farther from the optical axis includes the common diffractive structure.

4. The objective optical element of claim 3, wherein an edge of the first ring-shaped region contacting the second ring-shaped region is located closer to the light source side than an edge of the second ring-shaped region contacting the first ring-shaped region.

5. The objective optical element of claim 3, wherein a third ring-shaped region having a refractive surface is provided so as to adjoin the second ring-shaped region at a farther side from the optical axis, and an edge of the second ring-shaped region contacting the third ring-shaped region is located closer to the optical information recording medium side than an edge of the third ring-shaped region contacting the second ring-shaped region.

6. The objective optical element of claim 5, wherein at the best image position, an optical path length between the light flux of the first wavelength λ1 having passed through the second ring-shaped region and the light flux of the first wavelength λ1 having passed through the third ring-shaped region is different by λ1xi (i is an integer).

7. The objective optical element of claim 3, wherein at the best image position, an optical path length between the light flux of the first wavelength λ1 having passed through the first ring-shaped region and the light flux of the first wavelength λ1 having passed through the second ring-shaped region is different by λ1xi (i is an integer).

8. The objective optical element of claim 2, wherein the common diffractive structure has an optical characteristic to make a spherical aberration of a light flux having passed through the common diffractive structure to become more under when the wavelength of the light source changes to become longer.

9. The objective optical element of claim 2, wherein the diffractive structure is provided on the entire surface of the common region.

10. The objective optical element of claim 1, wherein the common region is divided into a plurality of ring-shaped refractive zones of first, second, . . . k-th ring-shaped refractive zones (k is a natural number larger than 2) arranged in this order from the optical axis, wherein at least n-th ring-shaped refractive zone (n is a natural number, 2<n≦k) has a first edge closer to the optical axis and a second edge farther from the optical axis arranged such that the first edge is positioned at the optical information recording medium side along the optical axis than the second edge and the second edge is positioned at the optical information recording medium side along the optical axis than a first edge of (n+1)-th ring-shaped refractive zone closer to the optical axis, provided that in the case of k=n, the first edge of (n+1)-th ring-shaped refractive zone is an edge of the exclusive region, and wherein the first light flux of the first wavelength λ1 having passed through the n-th ring-shaped refractive zone is converged at a position different from the best image forming position in the optical axis direction.

11. The objective optical element of claim 10, wherein at the best image position, an optical path length between the light flux of the first wavelength λ1 having passed through the n-th ring-shaped refractive zone and the light flux of the wavelength λ1 having passed through the (n−1)-th ring-shaped refractive zone is different by λ1xi (i is an integer).

12. The objective optical element of claim 10, wherein the diffractive structure of the exclusive region has a function of temperature correction.

13. The objective optical element of claim 1, wherein at least a part of the common region has a correcting function to reduce a difference between a spherical aberration when the light flux of the first wavelength λ1 having passed trough the common region is converged on the information recording plane of the first optical information recording medium through the protective substrate having the thickness t1 and a spherical aberration when the light flux of the second wavelength λ2 having passed trough the common region is converged on an information recording plane of the second optical information recording medium through the protective substrate having the thickness t2 in accordance with a wavelength difference between the wavelength λ1and the wavelength λ2.

14. The objective optical element of claim 1, wherein the magnification changing element is a coupling lens.

15. The objective optical element of claim 1, wherein the objective optical element is an objective lens.

16. The objective optical element of claim 1, wherein the objective optical element is made of a plastic.

17. The objective optical element of claim 1, wherein the first light source and the second light source are arranged on the same base plate.

18. The objective optical element of claim 1, wherein the first light source and the second light source are arranged to have an equal distance along the optical axis from the magnification changing element.

19. An objective optical element for use in an optical pickup apparatus which is provided with a first light source of a wavelength λ1, a second light source of a wavelength λ2 (λ1<λ2) and a light converging optical system including a magnification changing element and the objective optical element, wherein the light converging optical system converges a light flux from the first light source onto an information recording plane of a first optical information recording medium through a protective substrate having a thickness t1 so that recording and/or reproducing information is conducted for the first optical information recording medium and the light converging optical system converges a light flux from the second light source onto an information recording plane of a second optical information recording medium through a protective substrate having a thickness t2 (t1≦t2) so that recording and/or reproducing information is conducted for the second optical information recording medium, wherein the objective optical element has an optical magnification m1 (m1≠0) for a light flux having the first wavelength λ1 and an optical magnification m2 (m2≠0) for a light flux having the second wavelength λ2, wherein the objective optical element comprises on at least one surface:

a common region through which the light flux having the first wavelength λ1 and the light flux having the second wavelength λ2 pass in common so as to form a converged light spot on the information recording plane of the first optical information recording medium and on the information recording plane of the second optical information recording medium, respectively:

an exclusive region through which the light flux having the first wavelength λ1 passes so as to form a converged light spot on the information recording plane of the first optical information recording medium and the light flux having the second wavelength λ2 passes so as not to form a converged light spot on the information recording plane of the second optical information recording medium.

wherein the exclusive region includes an exclusive diffractive structure having a function to suppress an increase of spherical aberration due to a raise of atmospheric temperature in accordance with a wavelength fluctuation of the light flux having the first wavelength λ1 when the light flux having the first wavelength λ1 having passed through the exclusive diffractive structure is converged on the information recording plane of the first optical information recording medium, wherein the light flux having the second wavelength λ2 having passed through the exclusive diffractive structure intersects with the optical axis at a position different from the position of the converged light spot formed on the information recording plane of the second optical information recording medium, and wherein the optical magnification m1 satisfies the following formulas:

$$-1/7 \leq m1 \leq -1/25$$

$$|m1| < |M1|$$

where M1 is an optical system magnification from the first light source to the first optical information recording medium for the light flux having the first wavelength λ1 in the optical pickup apparatus.

20. An optical pickup apparatus, comprising:
a first light source of a wavelength λ1;
a second light source of a wavelength λ2 (λ1<λ2); and
a light converging optical system including a magnification changing element and an objective optical element, wherein the light converging optical system converges a light flux from the first light source onto an information recording plane of a first optical information recording medium through a protective substrate having a thickness t1 so that recording and/or reproducing information is conducted for the first optical information recording medium and the light converging optical system converges a light flux from the second light source onto an information recording plane of a second optical information recording medium through a protective substrate having a thickness t2 (t1≦t2) so that recording and/or reproducing information is conducted for the second optical information recording medium, wherein the objective optical element has an optical magnification m1 (m1≠0) for a light flux having the first wavelength λ1 and an optical magnification m2 (m2≠0) for a light flux having the second wavelength λ2, wherein the objective optical element comprises on at least one surface:

a common region through which the light flux having the first wavelength λ1 and the light flux having the second wavelength λ2 pass in common so as to form a converged light spot on the information recording plane of the first optical information recording medium and on the information recording plane of the second optical information recording medium, respectively;

an exclusive region through which the light flux having the first wavelength λ1 passes so as to form a converged light spot on the information recording plane of the first optical information recording medium and the light flux having the second wavelength λ2 passes so as not to form a converged light spot on the information recording plane of the second optical information recording medium, wherein the exclusive region includes an exclusive diffractive structure having a function to suppress an increase of spherical aberration due to a raise of atmospheric temperature in accordance with a wavelength fluctuation of the light flux having the first wavelength λ1 when the light flux having the first wavelength λ1 having passed through the exclusive diffractive structure is converged on the information recording plane of the first optical information recording medium, wherein the light flux having the second wavelength λ2 having passed through the exclusive diffractive structure intersects with the optical axis at a position different from the position of the converged light spot formed on the information recording plane of the second optical information recording medium, and wherein the optical magnifications m1 and m2 satisfy the following formula:

$$|m1-m2|<0.5.$$

21. The optical pickup apparatus of claim 20, wherein the common region includes a common diffractive structure having a correcting function to reduce a difference between a first spherical aberration when the light flux of the first wavelength λ1 having passed trough the common diffractive structure is converged on the information recording plane of the first optical information recording medium through the protective substrate having the thickness t1 and a second spherical aberration when the light flux of the second wavelength λ2 passing through the common diffractive structure is converged on the information recording plane of the second optical information recording medium through the protective substrate having the thickness t2 by the change of the diffractive function caused in accordance with a wavelength difference between the first wavelength λ1 and the second wavelength λ2.

22. The optical pickup apparatus of claim 21, wherein the common region is divided by a stepped portion stepped in the optical axis direction into a first ring-shaped region and a second ring-shaped region around the center on the optical axis, and wherein the first ring-shaped region located closer to the optical axis includes a refractive surface and the second region located farther from the optical axis includes the common diffractive structure.

23. The optical pickup apparatus of claim 22, wherein an edge of the first ring-shaped region contacting the second ring-shaped region is located closer to the light source side than an edge of the second ring-shaped region contacting the first ring-shaped region.

24. The optical pickup apparatus of claim 22, wherein a third ring-shaped region having a refractive surface is provided so as to adjoin the second ring-shaped region at a farther side from the optical axis, and an edge of the second ring-shaped region contacting the third ring-shaped region is located closer to the optical information recording medium side than an edge of the third ring-shaped region contacting the second ring-shaped region.

25. The optical pickup apparatus of claim 24, wherein at the best image position, an optical path length between the light flux of the first wavelength λ1 having passed through the second ring-shaped region and the light flux of the first wavelength λ1 having passed through the third ring-shaped region is different by λ1xi (i is an integer).

26. The optical pickup apparatus of claim 22, wherein at the best image position, an optical path length between the light flux of the first wavelength λ1 having passed through the first ring-shaped region and the light flux of the first wavelength λ1 having passed through the second ring-shaped region is different by λ1xi (i is an integer).

27. The optical pickup apparatus of claim 21, wherein the common diffractive structure has an optical characteristic to make a spherical aberration of a light flux having passed through the common diffractive structure to become more under when the wavelength of the light source changes to become longer.

28. The optical pickup apparatus of claim 21, wherein the diffractive structure is provided on the entire surface of the common region.

29. The optical pickup apparatus of claim 20, wherein the common region is divided into a plurality of ring-shaped refractive zones of first, second, . . . k-th ring-shaped refractive zones (k is a natural number larger than 2) arranged in this order from the optical axis, wherein at least n-th ring-shaped refractive zone (n is a natural number, 2<n<k) has a first edge closer to the optical axis and a second edge farther from the optical axis arranged such that the first edge is positioned at the optical information recording medium side along the optical axis than the second edge and the second edge is positioned at the optical information recording medium side along the optical axis than a first edge of (n+1)-th ring-shaped refractive zone closer to the optical axis, provided that in the case of k=n, the first edge of (n+1)-th ring-shaped refractive zone is an edge of the exclusive region, and wherein the first light flux of the first wavelength λ1 having passed through the n-th ring-shaped refractive zone is converged at a position different from the best image forming position in the optical axis direction.

30. The optical pickup apparatus of claim 29, wherein at the best image position, an optical path length between the light flux of the first wavelength λ1 having passed through the n-th ring-shaped refractive zone and the light flux of the wavelength λ1 having passed through the (n−1)-th ring-shaped refractive zone is different by λ1xi (i is an integer).

31. The optical pickup apparatus of claim 29, wherein the diffractive structure of the exclusive region has a function of temperature correction.

32. The optical pickup apparatus of claim 20, wherein at least a part of the common region has a correcting function to reduce a difference between a spherical aberration when the light flux of the first wavelength λ1 having passed trough the common region is converged on the information recording plane of the first optical information recording medium through the protective substrate having the thickness t1 and a spherical aberration when the light flux of the second wavelength λ2 having passed trough the common region is converged on an information recording plane of the second optical information recording medium through the protective substrate having the thickness t2 in accordance with a wavelength difference between the wavelength λ1 and the wavelength λ2.

33. The optical pickup apparatus of claim 20, wherein the magnification changing element is a coupling lens.

34. The optical pickup apparatus of claim 20, wherein the objective optical element is an objective lens.

35. The optical pickup apparatus of claim 20, wherein the objective optical element is made of a plastic.

36. The optical pickup apparatus of claim 20, wherein the first light source and the second light source are arranged on the same base plate.

37. The optical pickup apparatus of claim 20, wherein the first light source and the second light source are arranged to have an equal distance along the optical axis from the magnification changing element 38. An optical pickup apparatus, comprising:
a first light source of a wavelength λ1;
a second light source of a wavelength λ2 (λ1<λ2); and
a light converging optical system including a magnification changing element and an objective optical element, wherein the light converging optical system converges a light flux from the first light source onto an information recording plane of a first optical information recording medium through a protective substrate having a thickness t1 so that recording and/or reproducing information is conducted for the first optical information recording medium and the light converging optical system converges a light flux from the second light source onto an information recording plane of a second optical information recording medium through a protective substrate having a thickness t2 (t1≦t2) so that recording and/or reproducing information is conducted for the second optical information recording medium,
wherein the objective optical element has an optical magnification m1 (m1≠0) for a light flux having the first wavelength λ1 and an optical magnification m2 (m2≠0) for a light flux having the second wavelength λ2,
wherein the objective optical element comprises on at least one surface:
a common region through which the light flux having the first wavelength λ1 and the light flux having the second wavelength λ2 pass in common so as to form a converged light spot on the information recording plane of the first optical information recording medium and on the information recording plane of the second optical information recording medium, respectively;

an exclusive region through which the light flux having the first wavelength λ1 passes so as to form a converged light spot on the information recording plane of the first optical information recording medium and the light flux having the second wavelength λ2 passes so as not to form a converged light spot on the information recording plane of the second optical information recording medium, wherein the exclusive region includes an exclusive diffractive structure having a function to suppress an increase of spherical aberration due to a raise of atmospheric temperature in accordance with a wavelength fluctuation of the light flux having the first wavelength λ1 when the light flux having the first wavelength λ1 having passed through the exclusive diffractive structure is converged on the information recording plane of the first optical information recording medium, wherein the light flux having the second wavelength λ2 having passed through the exclusive diffractive structure intersects with the optical axis at a position different p1 wherein the optical magnification m1 satisfies the following formulas:

$-1/7 \leq m1 \leq -1/25$ $|m1| < |M1|$ where M1 is an optical system magnification from the first light source to the first optical information recording medium for the light flux having the first wavelength λ1 in the optical pickup apparatus.

* * * * *